United States Patent
Kurauchi et al.

(10) Patent No.: US 6,704,489 B1
(45) Date of Patent: Mar. 9, 2004

(54) RESOURCE MANAGEMENT SYSTEM AND DIGITAL VIDEO REPRODUCING/RECORDING APPARATUS

(75) Inventors: Nobukazu Kurauchi, Nagoya (JP); Narutoshi Ageishi, Ichinomiya (JP); Motoshi Suzuki, Aichi-ken (JP); Kazuo Kajimoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/558,119

(22) Filed: Apr. 25, 2000

(30) Foreign Application Priority Data

May 6, 1999 (JP) .......................................... 11-126158
May 26, 1999 (JP) .......................................... 11-147244

(51) Int. Cl.⁷ ................................................ H04N 5/93
(52) U.S. Cl. ........................... 386/46; 386/109; 386/125
(58) Field of Search ............................... 386/52, 55, 46, 386/109, 112, 125–126; H04N 5/93

(56) References Cited

U.S. PATENT DOCUMENTS

| | | | | |
|---|---|---|---|---|
| 5,371,551 A | * | 12/1994 | Logan et al. | 386/112 |
| 5,539,478 A | * | 7/1996 | Bertram et al. | 348/734 |
| 5,557,724 A | * | 9/1996 | Sampat et al. | 345/723 |
| 5,565,910 A | * | 10/1996 | Rowse et al. | 348/14.1 |
| 5,642,497 A | * | 6/1997 | Crary et al. | 710/1 |

FOREIGN PATENT DOCUMENTS

JP 8289246 11/1996

* cited by examiner

Primary Examiner—Vincent Boccio

(57) ABSTRACT

A resource management system is composed of a plurality of application programs, a resource management information database, and a resource manager. Each application program executes data transfer using resources. The resource management database stores resource management information and key information for each resource. Upon receipt of a resource use request from an application program, the resource manager judges whether the requested resource can be allocated to the application program by referring to the resource capacity and the currently-allocated volume of the resource that are included in the information database. If judging that the requested resource can be allocated, the resource manager gives authorization to the application program to use the resource. The resource manager also controls resource allocation by restricting a data transfer bandwidth used by an application program and requesting a resource release on expiration of the valid time period.

10 Claims, 44 Drawing Sheets

SIGNAL FLOW IN THE RECORDING PROCESS

Fig. 6

| | | |
|---|---|---|
| | 2500 | |
| 2501 | CLIENT ID | CLIPEDITOR |
| 2502 | OBJECT RESOURCE ID | 0x01 |
| 2503 | VALID PERIOD | 9800ms |
| 2504 | MAXIMUM VOLUME | 100MB/s |
| 2505 | MINIMUM VOLUME | 70MB/s |
| 2506 | ACQUISITION PRIORITY | Level3 |
| 2507 | USE CONTINUATION PRIORITY | Level4 |

Fig. 21

201 HARDWARE RESOURCE MANAGEMENT TABLE

| HARDWARE TYPE | HARDWARE RESOURCE | FLAG | PROCESS NAME |
|---|---|---|---|
| HARD DISK | ONE CHANNEL | UNALLOCATED | |
| | ONE CHANNEL | UNALLOCATED | |
| CODEC(REPRODUCE/RECORD) | ONE(CODECI) | UNALLOCATED | |
| CODEC(REPRODUCE ONLY) | ONE(CODECII) | UNALLOCATED | |

Fig. 22A

| HARDWARE TYPE | MAXIMUM NUMBER OF RESOURCES | MINIMUM NUMBER OF RESOURCES |
|---|---|---|
| HARD DISK | TWO CHANNELS | ONE CHANNEL |
| CODEC(REPRODUCE/RECORD) | ONE(CODECI) | ZERO(CODECI) |
| CODEC(REPRODUCE ONLY) | ONE(CODECII) | ONE(CODECII) |

Fig. 22B

| | DESCRIPTION FOR THE MAXIMUM NUMBER | DESCRIPTION FOR THE MINIMUM NUMBER |
|---|---|---|
| HARD DISK | TWO CHANNELS ARE SET FOR REPRODUCTION | ONE CHANNEL IS SET FOR REPRODUCTION |
| CODECI | SET AS DECODER | DON'T CARE |
| CODECII | SET AS DECODER | SET AS DECODER |
| SW | SET TO ESTABLISH CONNECTION BETWEEN CODEC I AND MIX CIRCUIT | DON'T CARE |
| MIX | SET TO PASS DATA FROM CODEC I AND II | SET TO PASS DATA ONLY FROM CODEC II |
| D/A | SET TO BE OPERATIONAL | SET TO BE OPERATIONAL |
| A/D | DON'T CARE | DON'T CARE |

Fig. 23A

| HARDWARE TYPE | MAXIMUM NUMBER OF RESOURCES | MINIMUM NUMBER OF RESOURCES |
|---|---|---|
| HARD DISK | ONE CHANNEL | ONE CHANNEL |
| CODEC(REPRODUCE/RECORD) | ONE(CODECI) | ONE(CODECI) |
| CODEC(REPRODUCE ONLY) | ZERO(CODECII) | ZERO(CODECII) |

| | DESCRIPTION FOR THE MAXIMUM NUMBER | DESCRIPTION FOR THE MINIMUM NUMBER |
|---|---|---|
| HARD DISK | ONE CHANNEL IS SET FOR RECORDING | ONE CHANNEL IS SET FOR RECORDING |
| CODECI | SET AS ENCORDER | SET AS ENCORDER |
| CODECII | Don't Care | Don't Care |
| SW | SET TO ESTABLISH CONNECTION BETWEEN CODEC I AND A/D CONVERTER | SET TO ESTABLISH CONNECTION BETWEEN CODEC I AND A/D CONVERTER |
| MIX | Don't Care | Don't Care |
| D/A | Don't Care | Don't Care |
| A/D | SET TO BE OPERATIONAL | SET TO BE OPERATIONAL |

| HARDWARE TYPE | HARDWARE RESOURCE | FLAG | PROCESS NAME |
|---|---|---|---|
| HARD DISK | ONE CHANNEL | ALLOCATED | TWO-CHANNEL REPRODUCING PROCESS |
| HARD DISK | ONE CHANNEL | ALLOCATED | TWO-CHANNEL REPRODUCING PROCESS |
| CODEC(REPRODUCE/RECORD) | ONE(CODECI) | ALLOCATED | TWO-CHANNEL REPRODUCING PROCESS |
| CODEC(REPRODUCE ONLY) | ONE(CODECII) | ALLOCATED | TWO-CHANNEL REPRODUCING PROCESS |

| HARDWARE TYPE | HARDWARE RESOURCE | FLAG | PROCESS NAME |
|---|---|---|---|
| HARD DISK | ONE CHANNEL | UNALLOCATED | |
| | ONE CHANNEL | ALLOCATED | ONE-CHANNEL REPRODUCING PROCESS |
| CODEC(REPRODUCE/RECORD) | ONE(CODECI) | UNALLOCATED | |
| CODEC(REPRODUCE ONLY) | ONE(CODECII) | ALLOCATED | ONE-CHANNEL REPRODUCING PROCESS |

| HARDWARE TYPE | HARDWARE RESOURCE | FLAG | PROCESS NAME |
|---|---|---|---|
| HARD DISK | ONE CHANNEL | ALLOCATED | RECORDING PROCESS |
| | ONE CHANNEL | ALLOCATED | ONE-CHANNEL REPRODUCING PROCESS |
| CODEC(REPRODUCE/RECORD) | ONE(CODECI) | ALLOCATED | RECORDING PROCESS |
| CODEC(REPRODUCE ONLY) | ONE(CODECII) | ALLOCATED | ONE-CHANNEL REPRODUCING PROCESS |

| HARDWARE TYPE 1301 | HARDWARE RESOURCE 1302 |
|---|---|
| HARD DISK | ONE CHANNEL |
|  | ONE CHANNEL |
| CODEC(REPRODUCE/RECORD) | ONE(CODECI) |
| CODEC(REPRODUCE ONLY) | ONE(CODECII) |

Fig. 33A

| HARDWARE TYPE | HARDWARE RESOURCE | PROCESS NAME |
|---|---|---|
| HARD DISK | ONE-CHANNEL | ONE-CHANNEL REPRODUCING PROCESS |
| CODEC (REPRODUCE ONLY) | ONE(CODECII) | ONE-CHANNEL REPRODUCING PROCESS |

Fig. 33B

| HARDWARE TYPE | HARDWARE RESOURCE |
|---|---|
| HARD DISK | ONE-CHANNEL |
| CODEC (REPRODUCE/RECORD) | ONE(CODECI) |

Fig. 34A

| HARDWARE TYPE | HARDWARE RESOURCE | PROCESS NAME |
|---|---|---|
| HARD DISK | ONE CHANNEL | RECORDING PROCESS |
| | ONE CHANNEL | ONE-CHANNEL REPRODUCING PROCESS |
| CODEC(REPRODUCE/RECORD) | ONE(CODECI) | RECORDING PROCESS |
| CODEC(REPRODUCE ONLY) | ONE(CODECII) | ONE-CHANNEL REPRODUCING PROCESS |

Fig. 34B

| HARDWARE TYPE | HARDWARE RESOURCE |
|---|---|

Fig. 40

| CLIENT ID | | | | | | |
|---|---|---|---|---|---|---|
| OBJECT RESOURCE ID | CODEC | SW | MIX | D/A | A/D | |
| | | | DIGITIZER | | | |
| RESOURCE VOLUME | 1 | 1 | 1 | 1 | 1 | |
| ACQUISITION PRIORITY | Level 3 | Level 3 | Level 3 | Level 3 | Level 3 | |
| USE CONTINUATION PRIORITY | Level 4 | Level 4 | Level 4 | Level 4 | Level 4 | |

6500
6501 CLIENT ID
6502 OBJECT RESOURCE ID
6503 RESOURCE VOLUME
6504 ACQUISITION PRIORITY
6505 USE CONTINUATION PRIORITY

Fig. 42

| | | | |
|---|---|---|---|
| 6501 — | CLIENT ID | DIGITIZER | |
| 6502 — | KEY ID | 1 | |
| 6503 — | OBJECT RESOURCE ID | MIX | D/A |
| 6504 — | NUMBER OF RELEASED RESOURCES | 1 | 1 |

(table labeled 6700)

Fig. 44

| | DIGITIZER | |
|---|---|---|
| 6801 — CLIENT ID | | |
| 6802 — KEY ID | 1 | |
| 6803 — OBJECT RESOURCE ID | MIX | D/A |
| 6804 — NUMBER OF REQUESTED RESOURCES | 1 | 1 |

6800

RESOURCE MANAGEMENT SYSTEM AND DIGITAL VIDEO REPRODUCING/RECORDING APPARATUS

BACKGROUND OF THE INVENTION (1) Field of the Invention

The present invention relates to a technique for managing hardware and software resources (simply referred to as the "resources") used by an application program that a computer executes, and also relates to a digital video reproducing/recording apparatus that reproduces and records digitized video data.

(2) Description of the Prior Art

There are various application programs that are executed by a computer. During the execution of an application program, data is inputted, outputted, and transferred using resources, such as a hard disk drive, bus, and memory.

Each resource has a use tolerance limit. For example, a hard disk drive and a PCI (Peripheral Component Interconnect) bus have respective limits to a speed at which data is transferred through them. To be more specific, each of them has a limit to a data transfer bandwidth. When an application program performs synchronous processes in which data needs to be transferred at certain timings, a predetermined data transfer bandwidth should be secured for the associated resources so that the application program can normally work.

For a system under which application programs simultaneously run, if an application program ignores the other application programs and uses resources without limitation, an application program performing synchronous processes may fail to work normally.

There have been techniques suggested in order to prevent such a fail from occurring during the execution of the program. As one example of such techniques, for a system under which application programs run according to the control of a multitask OS (Operating System), each application program is programmed beforehand so that two tasks that execute synchronous processes using the same resources will not be executed in parallel and that each application program can be exclusively executed.

An explanation is given below for a case of a conventional non-linear editing system that is composed of a CPU, a memory, a hard disk drive, a bus, a monitor, and a VTR, and performs video editing. According to, for example, a control program for receiving instructions from a user, this conventional non-linear editing system is controlled so as not to allow the user to simultaneously execute a recording process and an editing process. In the recording process, video inputted by means of a VTR or the like serving as an inputting device is recorded onto a hard disk at a constant transfer speed. In the editing process, meanwhile, the video that has been recorded onto the hard disk is edited while being reproduced at a constant speed. The conventional non-linear editing system is controlled with the aim of guaranteeing a data transfer bandwidth for each of the recording and editing processes. However, there may be a case where the data transfer bandwidth is adequately broad as the limit for a resource. In this case, the system cannot make effective use of the resource.

In order to effectively use the resources on the system that executes a plurality of application programs, each application program needs to be specially programmed beforehand so as to work in cooperation with the other application programs in terms of the uses of the resources. The application programs also need to be programmed in consideration of a case where a task performing synchronous processes and a task performing asynchronous processes are simultaneously executed. To be more specific, the application program associated with the asynchronous processes needs to be programmed so that the data transfer band to be used is reduced in width. With the reduced transfer bandwidth, this application program will not interfere with the execution of the synchronous processes.

It is difficult, however, to specially program the application programs so that they will work in cooperation with each other. This is because the special programming depends on the respective limits of the resources, and in addition to this, there may be a case where the combination of the application programs to be simultaneously executed is unknown. Also, the special programming is not desirable in view of effects caused by variations in the resource environment and the program organization for the system. Such variations are ascribable to changes and additions of resources and additions of application programs.

The following is a description of a conventional digital video reproducing/recording apparatus that is used as a non-linear editing system.

FIG. 1 is a schematic block diagram of the conventional digital video reproducing/recording apparatus. The digital video reproducing/recording apparatus is composed of a hard disk 1801, CODECs 1802 and 1803, a switch 1804, a MIX circuit 1805, a D/A converter 1806, and an A/D converter 1807. The hard disk 1801 records video data that is encoded in the digital format while the CODECS 1802 and 1803 encode and decode the video data. The switch 1804 switches the direction in which signals are transferred, depending on whether the video data is currently encoded or decoded. The MIX circuit 1805 mixes two sets of video data that are respectively decoded by the CODECs 1802 and 1803. The D/A converter 1806 converts the video data mixed by the MIX circuit 1805 into analog video data and outputs the analog video data to an external television monitor or the like so that the video images are reproduced. The A/D converter 1807 converts the analog video data that is inputted by an external VTR or the like into digital video data.

FIG. 2 shows a flow of video signals (i.e., video data) in a video reproducing process performed by the conventional digital video reproducing/recording apparatus. The direction of the data flow is set by the switch 1804 so that the data is transferred from the CODEC 1802 to the MIX circuit 1805. This video reproducing process executes two-channel reproduction whereby a spatial composition is performed on two sets of video data.

FIG. 3 shows a data flow in a video recording process performed by the conventional digital video reproducing/recording apparatus. The direction of the data flow is set by the switch 1804 so that the data is transferred from the A/D converter 1807 to the CODEC 1802. Specifically, the data flows in the following order: the external VTR or the like→the A/D converter 1807→the switch 1804→the CODEC 1802→the hard disk 1801.

It should be noted here that the details of a conventional digital video reproducing/recording apparatus used as a non-linear editing system is described in the Journal of the Institute of Television Engineers (renamed the Journal of the Institute of Image Information and Television Engineers), August issue, 1996, pages 26–29.

In such conventional digital video reproducing/recording apparatus, each of the video reproducing and recording processes is exclusively executed.

The video reproducing process does not always have to perform the two-channel reproduction. Specifically, when reproduction is performed for editing news video, one-channel reproduction, whereby the video data is cut and paste regardless of the course of time, is often executed. For this case, the setting may be made beforehand so that the decoded video data received by the MIX circuit 1805 will be only from the CODEC 1803. Thus, the video data flows in the following order: the hard disk 1801→the CODEC 1803 the MIX circuit 1805→the D/A converter 1806. Therefore, there is no video data flow in the following order: the hard disk 1801→the CODEC 1802→the switch 1804→the MIX circuit 1805. This is to say, it does not matter how the CODEC 1802 and the switch 1804 are used during the one-channel reproduction.

However, the two-channel reproduction and the one-channel reproduction are not distinguished in the video reproducing process. For this reason, when using the conventional digital video reproducing/recording apparatus, the video recording process cannot be executed while the video reproducing process is being executed.

SUMMARY OF THE INVENTION

It is therefore a first object of the present invention to provide a resource management system that dynamically allocates various types of resources to various processes executed under the control of a multitask OS so that each resource is effectively used and that each application program is smoothly executed without having to include a process that is dependent on the respective usage limits of the resources and respective levels at which the other application programs need the resources.

It is a second object of the present invention to provide an efficient digital video reproducing/recording apparatus, as one example application for the resource management system of the present invention, that allows a video recording process to be executed in response to a request even when a video reproducing process is being currently executed.

The first object of the present invention can be achieved by a resource management system for managing use of at least one resource by a plurality of application programs by authorizing application programs to use at least part of a capacity of a resource over an authorization period, the resource management system made up of: a resource management information database for storing limit information and authorization information for each resource, the limit information for a resource showing a capacity of the resource and the authorization information for a resource showing how much capacity is currently allocated to application programs; a request receiving unit for receiving a resource use request from an application program together with period information that indicates a time period for which the application program wishes to use the resource; and a resource use managing unit for making a judgement, when the request receiving unit has received the resource use request, as to whether the requested resource is available to the application program by referring to the limit information and the authorization information, wherein when the requested resource is available, the resource use managing unit determines the authorization period based on the period information, gives authorization to the application program to use the resource for the authorization period, and updates the authorization information in accordance with the capacity allocated to the application program.

With the stated construction, the resource use managing unit centralizes the management of the usage limit and the allocated volume for each resource using the resource management information database. With the centralized management by the resource use managing unit, each application program can obtain authorization to use a resource when it is available, only by sending a resource use request to the resource use managing unit. Therefore, the application program does not have to include a process that is dependent on the respective usage limits of the resources and respective levels at which the other application programs need the resources. After obtaining authorization to use the resource, the application program appropriately executes a process, such as data transfer, using the resource. In a case where the usage limit is changed due to resource additions to the resource management system, the contents of the resource management information database may be updated in accordance with the resource additions. By this updating, all the resources can be effectively used. In particular, the authorization period (referred to as the "valid time period" in the specification) for which the resource is authorized to be allocated is determined in accordance with the time period requested by the application program. Thus, the resource is released on the expiration of the valid time period and becomes available to another application program. Accordingly, the application program sends the resource use request together with information indicating a time period required for the process, thereby preventing the resource from being unavailable to another application program for an unnecessarily long period of time.

Using the stated resource management system, the resource use managing unit may include a timer for measuring a time that has elapsed since the application program was given authorization to use the resource, and request the application program to release the resource when reference to the timer indicates that the authorization period has expired.

Also, when receiving the request from the resource use managing unit to release the resource, the application program may stop using the resource and notify the resource use managing unit that the resource has been released, and in response to the notification from the application program that the resource has been released, the resource use managing unit may update the authorization information stored in the resource management information database.

This construction can avoid a case where an application program cannot use a resource since another application program uses the resource for unnecessarily long period of time for some reason.

Using the resource management system, the resource use managing unit may receive minimum capacity information from the application program when the request receiving unit receives the resource use request, and store the minimum capacity information in the resource management information database, the minimum capacity information showing a minimum resource capacity required by the application program. When the request receiving unit has received the resource use request and the resource use managing unit judges that a first capacity that is equal to or greater than the capacity shown by the minimum capacity information is available, the resource use managing unit may give authorization to the application program to use the resource and update the authorization information to show that the application program has obtained authorization to use a part of the resource capacity amounting to the first capacity.

With the stated construction, if judging that the volume equal to or greater than the minimum volume requested by the application program can be allocated, the resource use managing unit gives authorization to the application program to use the resource by that volume. Accordingly, using the resource management system of the present invention, a control operation is realized so that, for example, an application program that reproduces video data in real time can reliably acquire necessary resources with authorization.

The resource use managing unit may receive priority information from the application program when the request receiving unit receives the resource use request, the priority information showing a level at which the resource is required by the application program, and may store the priority information in the resource management information database. The resource use managing unit may make the judgement as to whether the requested resource is available to the application program by comparing the priority information for the application program with priority information already stored in the resource management information database for another application program that has already requested the resource.

With this construction, when an application program requests for a resource while another application program is using the resource, the resource is appropriately allocated in accordance with priority that is set for each application program. The priority is set according to the level at which the application program needs the resource to execute its own process.

The priority information may include acquisition priority information and use continuation information, the acquisition priority information showing a level at which the application program needs to acquire the resource and the use continuation information showing a level at which the application program needs to continue to use the resource after obtaining authorization to use the resource. The resource use managing unit may make the judgement as to whether the requested resource is available to the application program by comparing the acquisition priority information for the application program with use continuation priority information already stored in the resource management information database for another application program that has already requested the resource and is currently using the resource.

The application program can set the acquisition priority and the use continuation priority separately according to its own process. As such, a full execution is ensured for the application program that performs a process, such as data transfer, that cannot be interrupted after the application program has acquired the resource for the process. Accordingly, using the resource management system of the present invention, the resource allocation can be controlled in accordance with the processes executed by the application programs.

Using the stated resource management system, the resource may be used as a data transfer path and the resource use managing unit may give authorization to the application program by transferring an ID that specifies current capacity information included in the authorization information, the current capacity information showing a part of the resource capacity which the application program has been given authorization to use by the resource use request. The application program may be a client program that notifies a server program of the ID transferred by the resource use managing unit so that a data transfer is executed via the server program using the resource. The server program may specify the current capacity information using the ID notified by the application program and executes the data transfer in accordance with the current capacity information.

The application program is authorized to use the resource by the specified volume. Thus, a server program may be set so as to execute data transfer directly using the resource in accordance with a volume authorized by the resource manager. The application program requests for the resource by a volume necessary for the process, and is then given authorization by the resource manager to use the resource by the necessary volume. Although the respective conditions, such as data transfer bandwidth, are different, a plurality of application programs can respectively execute processes in parallel using the same resource. To be more specific, an application program for executing asynchronous processes and an application program for executing synchronous processes can share the resource in accordance with the respective necessary conditions.

The resource may be a local bus used for transferring data, and the capacity of the resource and the amount of the capacity having been allocated to application programs each may be expressed as a data transfer bandwidth. The server program may execute the data transfer using the data transfer bandwidth shown by the current capacity information.

With the stated construction, each of a plurality of application programs that execute data transfer using a local bus, such as a PCI bus, can given a data transfer bandwidth within the limit of the data transfer bandwidth of the local bus. Therefore, the application program reliably acquires a necessary data transfer bandwidth.

The plurality of application programs may include first and second application programs. When the resource use managing unit has already given authorization to the first application to use a resource in response to a first resource use request and receives a second resource use request from the second application program to use the resource, the resource use managing unit may compare the priority information for the second application program with the priority information for the first application program. If the second application program has priority over the first application program, the resource use managing unit may reduce the capacity shown by the current capacity information for the first application program and extend the authorization period for the first application program so that the second application program is also authorized to use the resource.

As a result of the adjustment based on the priority assigned to each application program, the volume allocated to the application program that needs the resource less than the other application program is reduced and its valid time period is extended. This enables the application program that needs the resource less to complete the data transfer eventually.

When the resource use managing unit has reduced the capacity shown by the current capacity information related to the first application program and has given authorization to the second application program to use the resource in response to the second resource use request, the resource use managing unit may increase the capacity allocated to the first application program on completion of the second application program executed using the resource.

After the volume allocated to the application program that needs the resource less than the other application program is reduced as a result of the adjustment based on the priority assigned to each application program, the reduced volume is increased when the resource becomes available. This is to say, the resource allocation is dynamically controlled in accordance with the currently-allocated volume of the resource so that the resource can be effectively used.

When the request receiving unit receives the resource use request from the application program and the resource use managing unit judges that the requested resource is unavailable to the application program, the resource use managing unit may give authorization to the application program to use the resource when the resource becomes available.

With this construction, when the resource is currently unavailable, the application program can wait for the resource to be released and then uses the resource when it becomes available. This unit that the application program can reserve the resource when it is currently unavailable.

When the request receiving unit receives the resource use request from the application program and the resource use managing unit judges that the requested resource is unavailable to the application program since another application program has obtained authorization to use the resource, the resource use managing unit may notify the application program of information regarding a time to be taken before an expiration of the authorization period given to the other application program.

With the stated construction, the application program can comprehend when the resource will become available. Then, a time at which the resource will become available may be displayed on a screen for the user.

When the request receiving unit receives a resource use request from an application program to use a plurality of resources, the resource use managing unit may judge whether the requested resources are available to the application program. When the requested resources are available to the application program, the resource use managing unit may give authorization to the application program to use the resources and so updates the authorization information stored in the resource management information database.

With this centralized management of the resources, deadlock, where the application program has to wait for another application to finish using the resources, can be prevented.

When receiving a notification from the application program that a part of at least one of the resources has been released, the resource use managing unit may update the capacity shown by the authorization information in accordance with the released capacity.

With this construction, the application program can release a part of the resources that have been acquired at one time, so that another application program can use the released part.

A resource management system may manages use of at least one resource by a plurality of application programs by authorizing application programs to use at least part of a capacity of a resource over an authorization period, the resource management system made up of: a request receiving unit for receiving a reservation request from an application program together with period information specifying use start and stop times; a resource management information database for storing limit information, authorization information, and the period information, the limit information for a resource showing a capacity of the resource, and the authorization information for a resource showing how much capacity is currently allocated to application programs; a resource use managing unit for making a judgement, when the request receiving unit has received the reservation request, as to whether the requested resource will be available to the application program for the time period specified by the start and stop times by referring to the limit information, the authorization information, and the period information, wherein when the requested resource will be available for the specified time period, the resource use managing unit determines the authorization period based on the period information, gives authorization to the application program, upon the use start time, to use the requested resource for the authorization period, and updates the authorization information and the period information.

With the stated construction, each application program can reliably secure necessary resources for future use. This is to say, the application program is given a guarantee that the resources will be allocated to the application program.

The second object of the present invention can be achieved by a digital video reproducing/recording apparatus that is capable of executing a digital video reproducing process and a digital video recording process, the digital video reproducing/recording apparatus made up of: a storing unit for storing encoded digital video data; a first CODEC for performing one of (1) encoding digital video data and storing the encoded digital video data into the storing unit and (2) reading the encoded digital video data from the storing unit and decoding the read encoded digital video data; a second CODEC for reading the encoded digital video data from the storing unit and decoding the read encoded digital video data; a retaining unit for retaining information that specifies a process that is currently being executed; a request receiving unit for receiving a request for an execution of a process from a user; a judging unit for judging whether the first and second CODECs are available to both the process requested by the user and the process currently being executed, by referring to the information retained in the retaining unit; and an execution controlling unit for controlling, if the judging unit has judged that the first and second CODECs are available to both of the processes, the execution of the process requested by the user.

With the stated construction, the digital video reproducing and recording processes can be executed in parallel without any conflict.

In the digital video reproducing process, the encoded video data stored in the storing unit may be decoded either by the first and second CODECs or only by the second CODEC, the decoded video data may be mixed by a mixing circuit, and the mixed data may be converted into analog video by a D/A converter. In the digital video recording process, analog video may be converted into digital video data by an A/D converter, the digital video data may be encoded by the first CODEC, and the encoded digital video may be stored in the storing unit. The retaining unit may retain information showing a current use state for each CODEC, each current use state showing whether the corresponding CODEC is being used. The judging unit may include: a selecting unit for selecting at least one CODEC from the first and second CODECs in accordance with the process requested by the user; and an allocation judging unit for judging whether each CODEC selected by the selecting unit is available to the requested process, by referring to the information retained in the retaining unit.

With this construction, the current use state is comprehended for each of the first and second CODECs. Consequently, the digital video reproducing and recording processes can be executed in parallel, without any conflict, respectively using the first CODEC and/or the second CODEC with the least wasted volume.

Using the stated digital video reproducing/recording apparatus, the retaining unit may retain a process name of either the digital video reproducing process or the digital video recording process, for each CODEC that is currently being used. The request receiving unit may further receive maximum and minimum numbers of CODECs to be used in the requested process, the maximum number indicating a preferred number of CODECs required for the requested process and the minimum number indicating a lowest number of CODECs required for the requested process. The allocation judging unit may include: a first notifying unit for notifying, when a number of CODECs equal to the maximum are indicates as being "unallocated" by the retaining unit, the execution controlling unit that the maximum number of CODECs are available for allocation to the requested process; and a second notifying unit for notifying, when the number of CODECs indicated as being "unallocated" is below the maximum number but at least equal to the minimum number, the execution controlling unit that the minimum number of CODECs are available for allocation to the requested process.

When the maximum and minimum numbers of CODECs to be used in the requested process are received, each unallocated CODEC counted in the maximum or minimum number can be used in the requested process. Accordingly, the reproducing process and/or the recording process can be executed using the first CODEC and/or the second CODEC with efficiency.

The allocation judging unit may include: a release requesting unit for requesting the execution controlling unit, when a number of CODECs equal to the minimum are indicated as being "allocated" and this minimum number of CODECs are judged to be available to the requested process if a number of CODECs used in a currently-executed process is changed to the minimum number for the currently-executed process, to release the minimum number of CODECs for the requested process; and a third notifying unit for notifying, when the execution controlling unit has released the minimum number of CODECs for the requested process, the execution controlling unit that the minimum number of CODECs for the requested process is available for allocation to the requested process.

With this construction, when not every CODEC cannot be allocated to the requested process and the number of CODECs used in the currently-executed process can be changed, at least one of the CODECs currently having been used may be released so as to be allocated to the requested process. For example, when the recording process is requested during the execution of the two-channel reproduction process, the two-channel reproduction process is changed to the one-channel reproduction process so that the recording process can be executed.

The retaining unit may include: an unallocated hardware resource retaining unit for retaining information about each CODEC that is currently unallocated; an allocated hardware resource retaining unit for retaining information about each CODEC that is currently allocated; a first moving unit for moving the information about each CODEC that is judged by the allocation judging unit to be allocated to the requested process, from the unallocated hardware resource retaining unit into the allocated hardware resource retaining unit; and a second moving unit for moving, when receiving a notification that at least one of the first and second CODECs has been released, the CODEC from the allocated hardware resource retaining unit into the unallocated hardware resource retaining unit. The allocation judging unit may authorize allocation of each CODEC selected by the selecting unit when the information about the CODEC is retained in the unallocated hardware resource retaining unit.

With the stated construction, each CODEC can be easily judged to be allocated or unallocated. When the first CODEC is currently unallocated, the recording process can be executed using the first CODEC even when the recording process is currently being executed. Thus, the recording process can be effectively executed in parallel with the reproducing process.

The request receiving unit may further receive maximum and minimum numbers of CODECs to be used in the requested process, the maximum number indicating a preferred number of CODECs required for the requested process and the minimum number indicating a lowest number of CODECs required for the requested process. The allocation judging unit may include: a first notifying unit for notifying, when a number of CODECs equal to the maximum are retained in the unallocated hardware resource retaining unit, the execution controlling unit that the maximum number of CODECs are available for allocation to the requested process; and a second notifying unit for notifying, when the number of CODECs retained in the unallocated hardware resource retaining unit is below the maximum number but a number of CODECs retained in the unallocated hardware resource retaining unit is at least equal to the minimum number, the execution controlling unit that the minimum number of CODECs for the requested process are available for allocation.

With this construction, in accordance with the current use state for each CODEC, the requested process is authorized to be executed using the first CODEC and/or the second CODEC counted as the maximum or minimum number. Accordingly, the first and second CODECs can be effectively used.

The first moving unit may write a name of the requested process into the allocated hardware resource retaining unit when moving each CODEC allocated to the requested process from the unallocated hardware resource retaining unit into the allocated hardware resource retaining unit. The allocation judging unit may include: a release requesting unit for requesting the execution controlling unit, when a number of CODECs equal to the minimum required for the requested process is retained in the allocated hardware resource retaining unit and this minimum number of CODECs are judged to be available for allocation to the requested process if a number of CODECs used in a currently-executed process is changed to the minimum number for the currently-executed process, to release the minimum number for the requested process; and a third notifying unit for notifying, when the execution controlling unit has released the minimum number of CODECs for the requested process and the second moving unit moves each released CODEC from the allocated hardware resource retaining unit into the unallocated hardware resource retaining unit, the execution controlling unit that the minimum number of CODECs for the requested process are available for allocation to the requested process.

With this construction, when not every CODEC cannot be allocated to the requested process and the number of CODECs used in the currently-executed process can be changed, at least one of the CODECs currently having been used may be released so to as to be allocated to the requested process. Accordingly, the first and second CODECs can be more effectively used.

The retaining unit may include: an unallocated hardware resource retaining unit for retaining information for each CODEC that is currently unallocated; a deleting unit for deleting the information about each CODEC that is judged by the allocation judging unit to be available to the requested process, from the unallocated hardware resource retaining unit; a writing unit for writing, when receiving a notification that each allocated CODEC has been released, the CODEC into the unallocated hardware resource retaining unit. The allocation judging unit may authorize allocation of each CODEC to the requested process when the CODEC is retained in the unallocated hardware resource retaining unit.

With this construction, each CODEC that is currently unallocated can be always comprehended, and the reproducing and recording processes can be executed in parallel using the first and second CODECs without any conflict.

The second object of the present invention can be also achieved by a digital video reproducing/recording apparatus that is capable of executing a digital video reproducing process and a digital video recording process, the digital video reproducing/recording apparatus made up of: a storing unit for storing encoded digital video data; a plurality of first CODECs that each perform one of (1) encoding digital video data and storing the encoded digital video data into the storing unit and (2) reading the encoded digital video data from the storing unit and decoding the read encoded digital video data; a plurality of second CODECs that each read the encoded digital video data from the storing unit and decode the read encoded digital video data; a retaining unit for retaining information that specifies a process that is currently being executed; a request receiving unit for receiving a request for an execution of a process from a user; a judging unit for judging whether the first and second CODECs are available to both the process requested by the user and the process currently being executed, by referring to the information retained in the retaining unit; and an execution controlling unit for controlling, if the judging unit has judged that the first and second CODECs are available to both of the processes, the execution of the process requested by the user.

With this construction, two or more number of reproducing or recording processes, or varying combinations of both the reproducing and recording processes can be executed in parallel using the plurality of CODECs.

The second object of the present invention can be also achieved by a computer readable record medium used in a digital video reproducing/recording apparatus that is made up of: a storing unit for storing encoded digital video data; a first CODEC for performing one of (1) encoding digital video data and storing the encoded digital video data into the storing unit and (2) reading the encoded digital video data from the storing unit and decoding the read encoded digital video data; and a second CODEC for reading the encoded digital video data from the storing unit and decoding the read encoded digital video data, the computer readable record medium including a program that has a computer perform functions of the following unit: a retaining unit for retaining information that specifies a process that is currently being executed; a request receiving unit for receiving a request for an execution of a process from a user; a judging unit for judging whether the first and second CODECs are available to both the process requested by the user and the process currently being executed, by referring to the information retained in the retaining unit; and an execution controlling unit for controlling, if the judging unit has judged that the first and second CODECs are available to both of the processes, the execution of the process requested by the user.

A digital video reproducing/recording apparatus that cannot execute the reproducing and recording processes in parallel can do it using this construction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows the contents of resource request information 2500;

FIG. 21 shows an initial state of a hardware resource management table 201 stored in a hardware resource storing unit 121;

FIG. 22A shows a list example of a necessary hardware resource 133 of a reproducing process 131;

FIG. 22B shows a list example of a hardware control process description 134 of the reproducing process 131;

FIG. 23A shows a list example of a necessary hardware resource 135 of a recording process 132;

FIG. 23B shows a list example of a hardware control process description 136 of the recording process 132;

FIG. 24 shows a content example of a hardware resource management table;

FIG. 25 shows a content example of a hardware resource management table;

FIG. 26 shows a content example of a hardware resource management table;

FIG. 32 shows contents stored in an all-resource storing unit;

FIG. 33A shows an example of contents stored in an allocated hardware resource storing unit;

FIG. 33B shows an example of contents stored in an unallocated hardware resource storing unit;

FIG. 34A shows an example of contents stored in the allocated hardware resource storing unit;

FIG. 34B shows an example of contents stored in the unallocated hardware resource storing unit;

FIG. 38 shows data flow when a function of supporting the video editing by the user is executed by outputting the digital video data recorded on the hard disk drive 111 to the to external television monitor or the like;

FIG. 39 shows an example of a message sequence followed when the digitizer AP is first activated before the editor AP;

FIG. 40 shows an example of a data construction and contents of the resource request information 6500 that is referred to when a plurality of resources are requested at one time;

FIG. 42 shows an example of a data construction and contents of the some-resources release information 6700 that is referred to when some of the resources having been acquired at one time are to be released;

FIG. 44 shows an example of a data construction and contents of the resource repeat request information 6800 that is referred to when some resources are needed in addition to the resources having been acquired at one time.

DESCRIPTION OF THE PREFERRED EMBODIMENTS

First Embodiment

The following is a description of a resource management system of a first embodiment of the present invention, with reference to FIG. 4 to FIG. 15.

Construction

Figure 1:
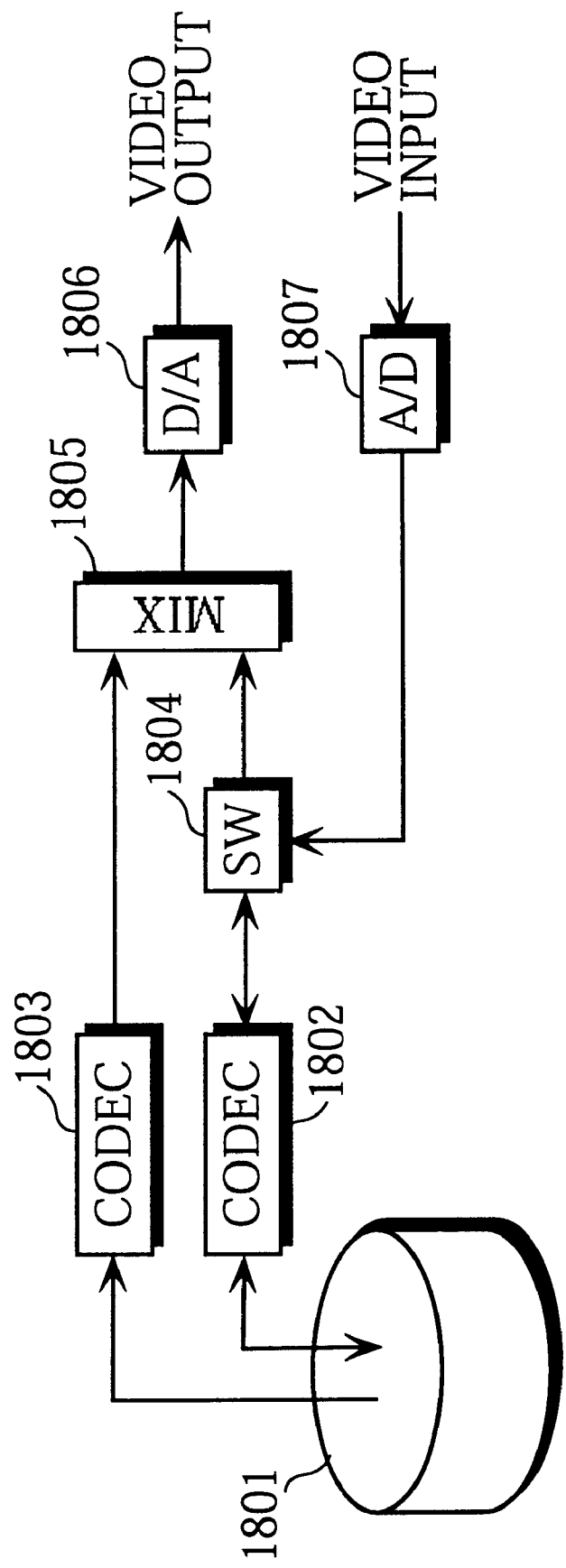
FIG. 1 is a schematic block diagram of a conventional digital video reproducing/recording apparatus.
Figure 2:
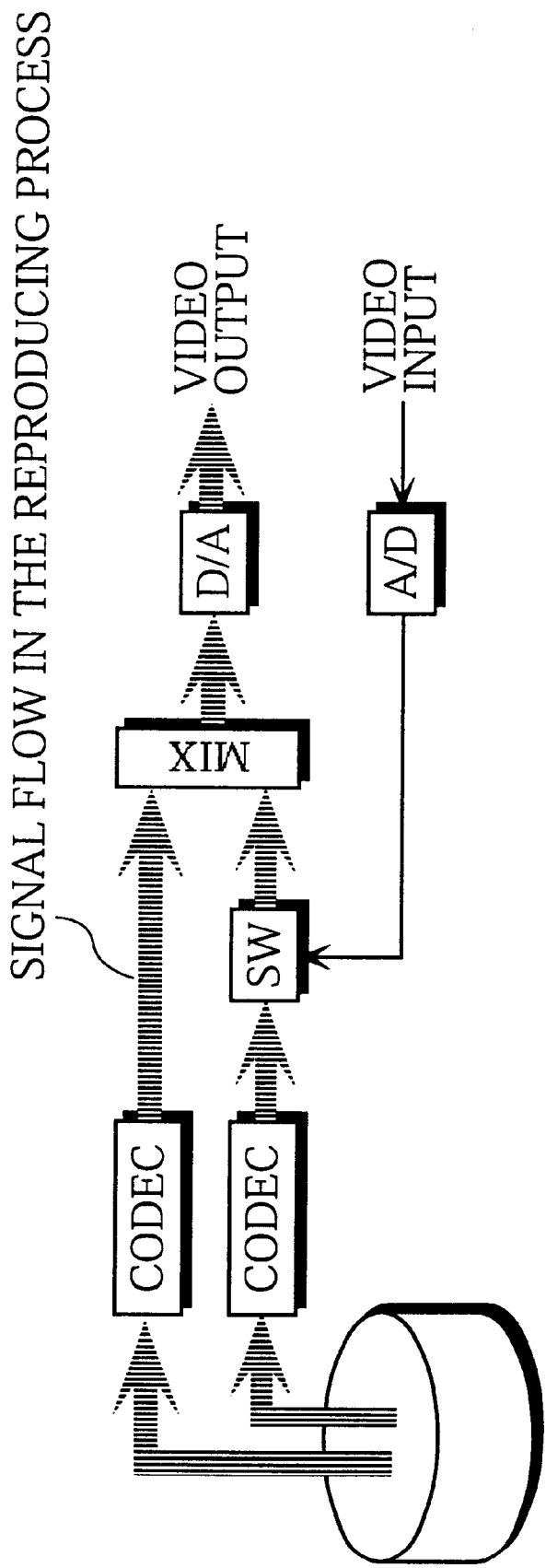
FIG. 2 is a view to help explain a flow of video signals (i.e., data) in the two-channel reproduction process.
Figure 3:
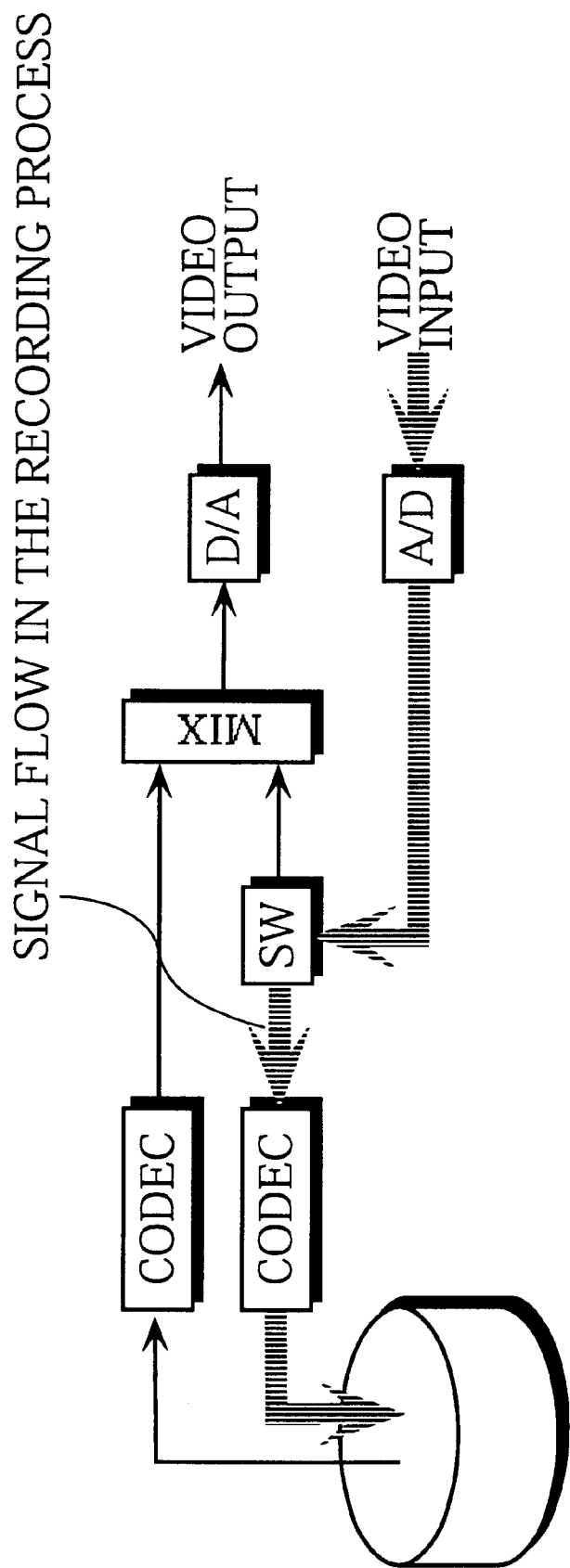
FIG. 3 is a view to help explain a flow of video signals in the recording process.
Figure 4:
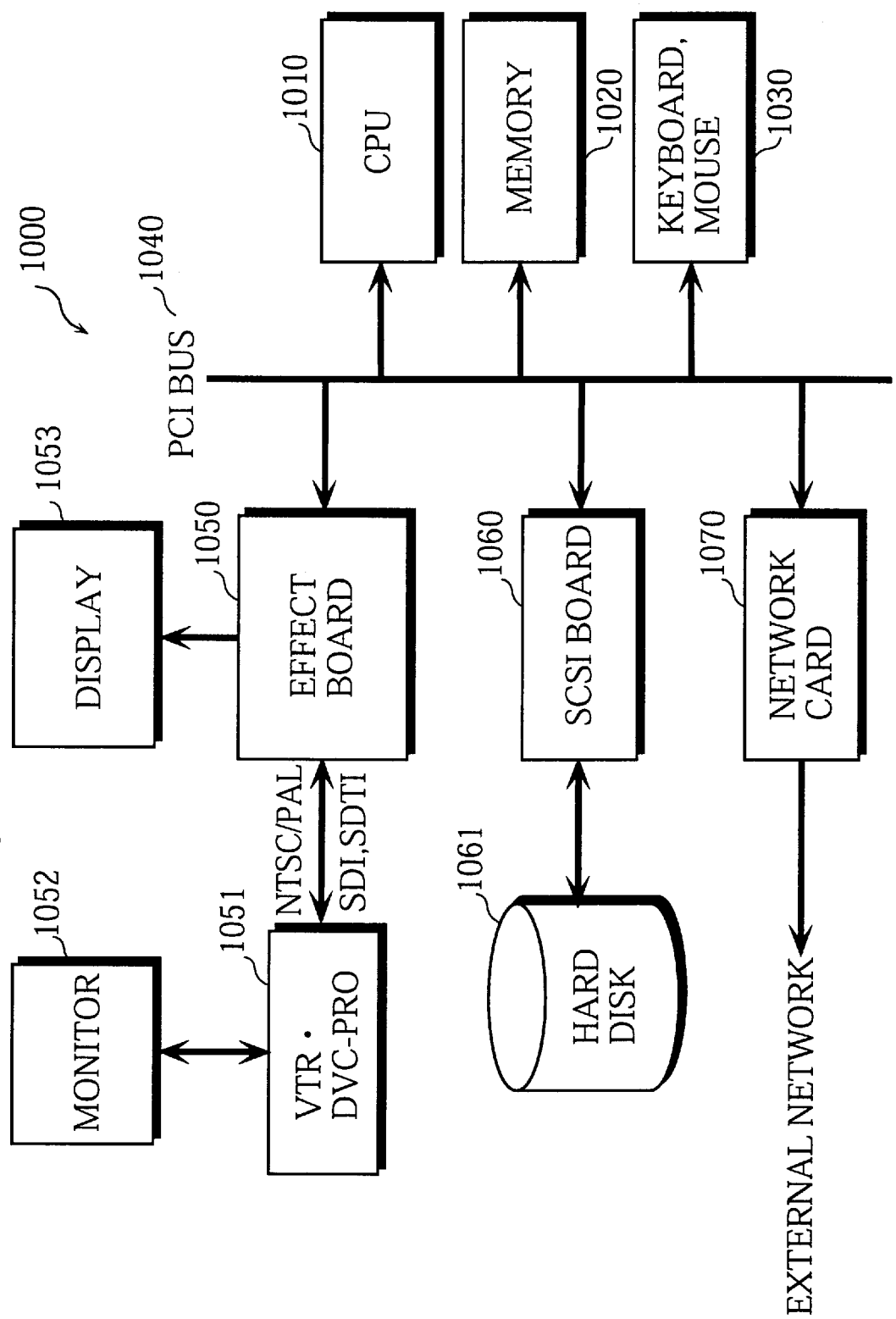
FIG. 4 is a block diagram showing the hardware construction of a non-linear editing system 1000 of a first embodiment of the present invention.

FIG. 4 is a block diagram showing the hardware construction of a non-linear editing system 1000 of the first embodiment of the present invention.

The non-linear editing system 1000 is composed of a CPU 1010, a memory 1020, a user input receiving device 1030, a PCI bus 1040, an effect board 1050, a video input/output device 1051, a monitor 1052, a display 1053, an SCSI board 1060, a hard disk drive 1061, and a network card 1070. Examples of the user input receiving device 1030 include a keyboard and a mouse. Examples of the video input/output device 1051 include a VTR and a DVC-PRO serving as a digital video recording/reproducing apparatus.

Various video images are inputted from the video input/output device 1051 and stored into the hard disk drive 1061. The non-linear editing system 1000 is used for freely editing these stored video images in accordance with instructions received from the user.

The CPU 1010, the memory 1020, the user input receiving device 1030, the effect board 1050, the SCSI board 1060, and the network card 1070 are provided in a personal computer (referred to as the "PC" hereinafter). These components are connected to one another via the PCI bus 1040. The PCI bus 1040, the hard disk drive 1061, and the memory 1020 used as resources for transferring data have respective limits to their data transfer bandwidths. The PCI bus 1040 is a synchronous bus whose maximum clock frequency is 33 MHz and whose maximum data transfer speed, that is, the usage limit, is 133 megabytes per second (hereinafter "MB/s").

The effect board 1050 sends or receives NTSC/PAL signals in between the PC and the video input/output device 1051 after encoding or decoding the NTSC/PAL signals. The effect board 1050 is also an interface board which has the function of sending and receiving video digital signals via, for example, an SDI (Serial Digital Interface).

The SCSI board 1060 is an interface board for connecting the PC to peripheral equipments, such as the hard disk drive 1061, which require data transfer at a high speed. The network card 1070 serves as an interface for connecting the PC to the external network.

Figure 5:
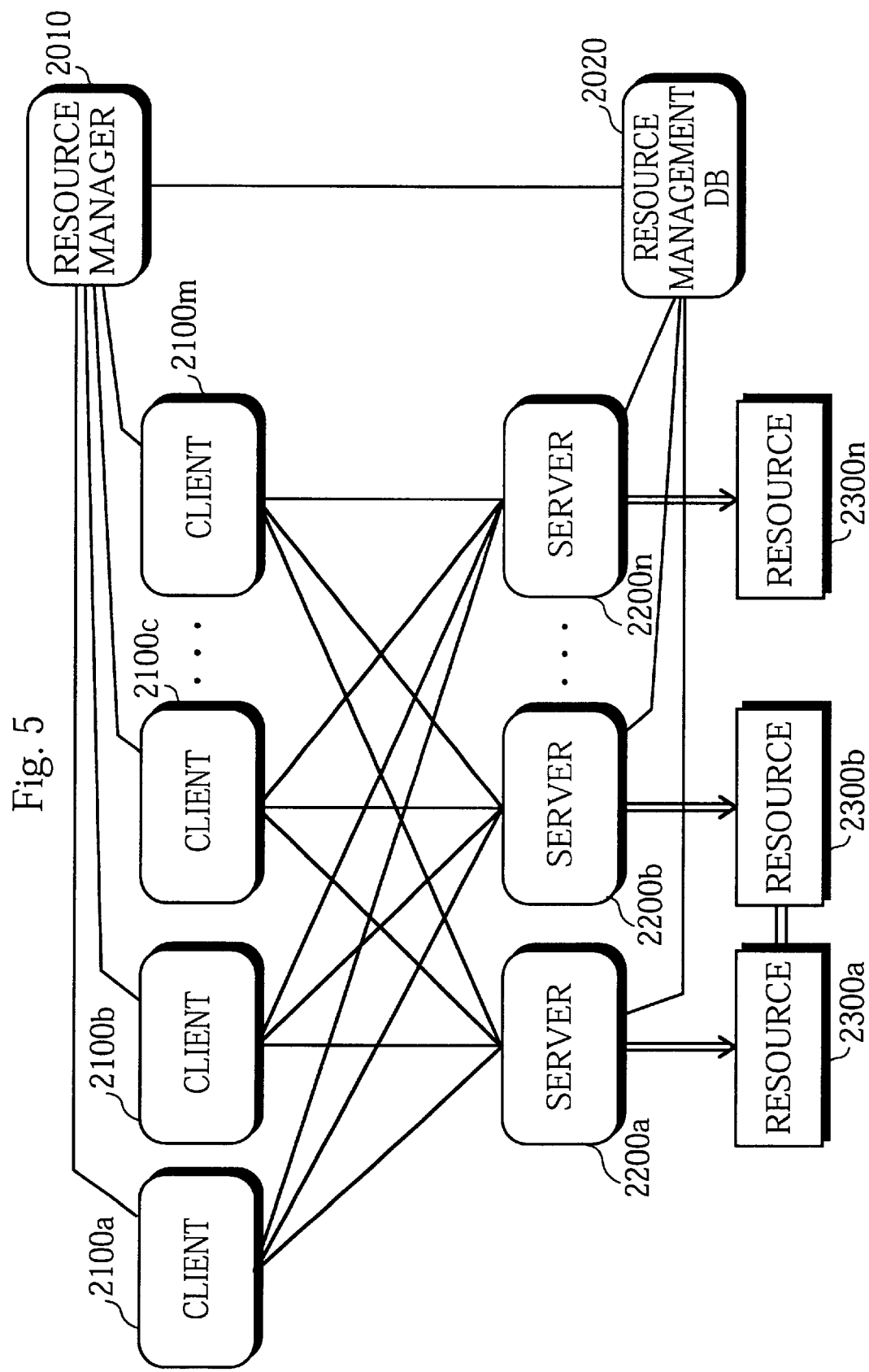
FIG. 5 shows a software construction of the non-linear editing system 1000.

FIG. 5 shows a software construction of the non-linear editing system 1000. As shown in FIG. 5, the non-linear editing system 1000 is composed, in terms of software, of a resource manager 2010, a resource management database (DB) 2020, clients 2100a to 2100m, and servers 2200a to 2200n. FIG. 5 also shows resources 2300a to 2300n that are respectively used by the servers 2200a to 2200n. The resources 2300a to 2300n correspond to the PCI bus 1040, the hard disk drive 1061, etc.

The resource management DB 2020 includes a data set used for managing the resources, the data set being stored in a file of the hard disk or an area of the memory 1020.

The resource manager 2010 performs various kinds of control operations associated with the resource management. For doing so, the resource manager 2010 comprehends the capacity for each resource type and the state of each resource as to whether it is used or not, by referring to and updating the resource management DB 2020. As one example of the control operations, the resource manager 2010 receives a resource use request from a client and generates key information in the resource management DB 2020, and then informs the client of a key ID as an ID of the key information. As another example, the resource manager 2010 sends an instruction to the client to release the resource when the valid period (or, the authorization period) of the key information has been expired. The contents of the resource management DB 2020, such as the key information, will be explained later in this specification.

Each client 2100a to 2100m sends a resource use request to the resource manager 2010 and then receives a key ID from the resource manager 2010. The client 2100a to 2100m then informs the corresponding server of the key ID so as to be allowed to use the resource. To be more specific, the client 2100a to 2100m transfers, input, and outputs data using the resource via the server. The clients 2100a to 2100m are application programs executed for the non-linear editing. For example, the clients 2100a to 2100m correspond to a digitizer for fetch-editing the video data or the like, a clip editor for editing the video data or the like in units of data sections, and a sequence editor for editing in regard to a time series arrangement of the video data or the like. It should be noted here that each client 2100a to 2100m cannot use the resource unless receiving the key ID from the resource manager 2010. This is to say, the resource manager 2010 gives a key ID to the client as authorization to use of the resource.

The servers 2200a to 2200n are service programs corresponding to, for example, device drivers. Each server 2200a to 2200n refers to the key information specified by the key ID that has been received from the client and uses the corresponding resource 2300a to 2300n in accordance with the key information. The server 2200a to 2200n accordingly controls executions of data transfer, data input, and data output using the resource 2300a to 2300n.

The functions of the resource manager 2010, the servers 2200a to 2200n, and the clients 2100a to 2100m are implemented by the CPU 1010 that executes the associated programs stored in the memory 1020. The resource manager 2010 and the clients 2100a to 2100m are application programs that run under the control of the multitask OS. The resource manager 2010 is activated on the activation of the multitask OS.

The following is an explanation of resource use request detailed information (simply referred to as the "resource request information" hereinafter) that is issued together with the resource used request by a client to the resource manager 2010.

FIG. 6 shows the contents of resource request information 2500. As shown in this figure, the resource request information 2500 includes a client ID 2501, an object resource ID 2502, a valid period 2503, a maximum volume 2504, a minimum volume 2505, an acquisition priority 2506, and a use continuation priority 2507. In the right-hand columns, a value example is shown for each piece of information. It should be noted here that "volume" referred to in the present specification means the "capacity."

The client ID 2501 is an ID specifying a client that issued the resource use request. The object resource ID 2502 is an ID specifying a resource that the client has requested for. The valid period 2503 refers to a time period that the client has requested to use the resource. The maximum volume 2504 and the minimum volume 2505 respectively indicate the maximum and minimum volumes by which the client has requested for the resource. More specifically, the maximum volume 2504 indicates a desirable volume for executing a process using the resource while the minimum volume 2505 indicates the volume that is required at the minimum.

The acquisition priority 2506 indicates the priority of the client as to acquisition of the resource, and is represented by one of Levels 1 to 4 in accordance with the level at which the client needs the resource. More specifically, Level 4 is the highest level indicating a case where the client needs the resource most, such as when the client is in urgent need of the resource and so definitely uses the resource. Level 3 indicates a case where the current client is given priority to use the resource over another client if the volume used by the other client can be reduced or the other client can suspend the current use of the resource and, if not, the current client will use the resource after the other client has finished using the resource. Level 2 indicates that if another client is currently using the resource, the client uses the resource after the other client has finished using the resource. Level 1 indicates that the client does not use the resource if the resource is not available since another client is currently using the resource.

The use continuation priority 2507 indicates the priority of the client as to the continuation of using the resource. The use continuation priority 2507 is referred to when another client has requested for the same resource as is being used by the current client. As in the case of the acquisition priority 2506, the use continuation priority 2507 is represented by one of Levels 1 to 4 in accordance with the level at which the current client needs to continue to use the resource. Level 4 is the highest level indicating a case where the client needs to continue to use the resource most. Level 3 indicates a case where the current volume being used may be reduced within the volume shown as the minimum volume 2505. Level 2 indicates that the use of the resource by the current client may be suspended when another client has requested for the resource. Level 1 indicates that the client may release the resource if another client has requested for the resource.

Figure 7:
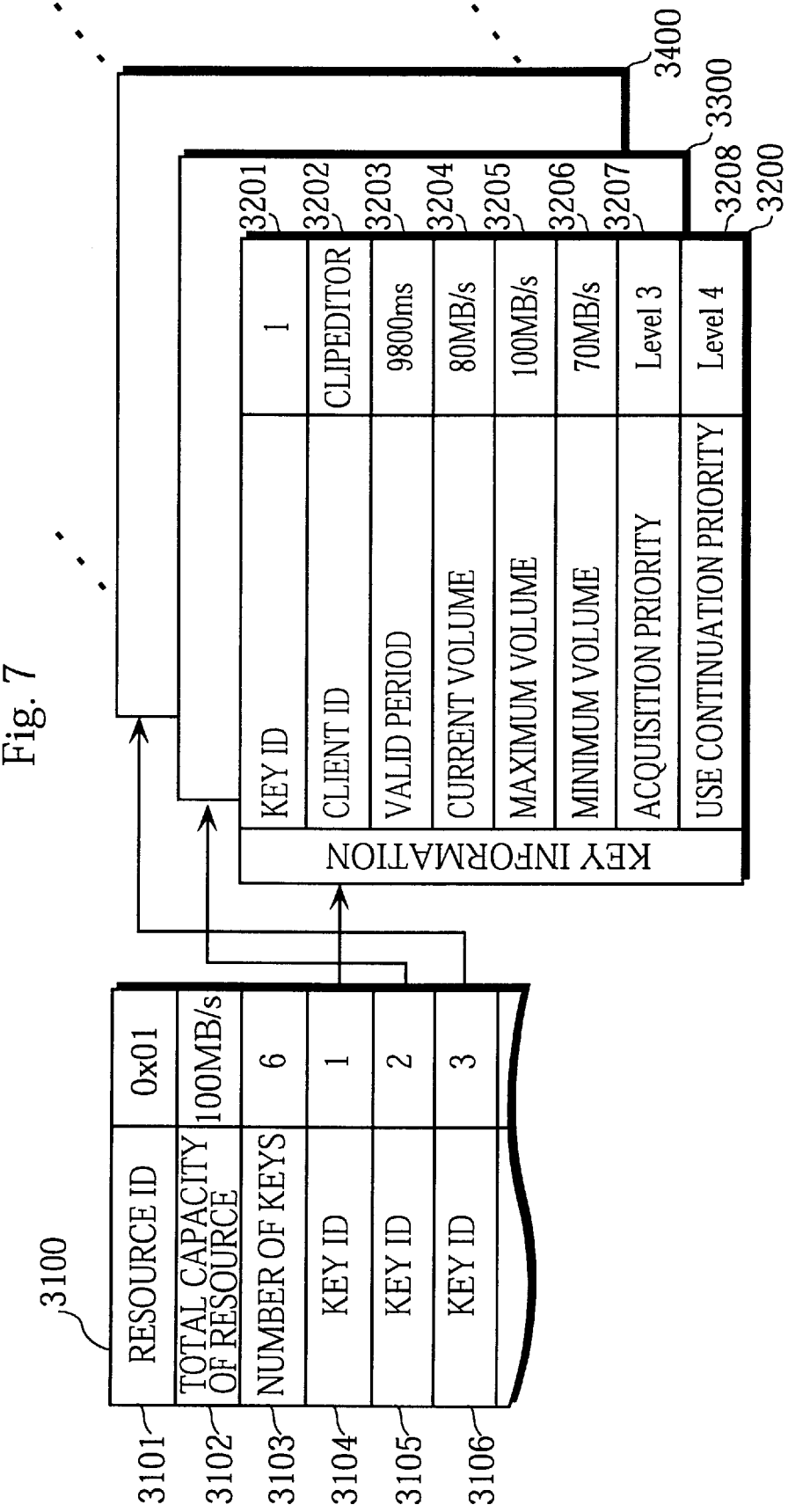
FIG. 7 shows the contents of a resource management DB 2020.

The contents of the resource management DB 2020 are explained. FIG. 7 shows the contents of the resource management DB 2020. The resource management DB 2020 has resource management information for each resource. FIG. 7 shows an example of the information related to the resource whose resource ID is 0x01. Suppose here that the present resource is the PCI bus 1040. The resource management DB 2020 has resource management information 3100 associated with the PCI bus 1040 and three sets of key information 3200, 3300, and 3400 associated in turn with the resource management information 3100. In the right-hand columns, value examples are shown for each piece of information.

As shown in FIG. 7, the resource management information 3100 includes a resource ID 3101, a total capacity of resource 3102, a number of keys 3103, and key IDs 3104, 3105, and 3106.

The total capacity of resource 3102 indicates the usage limit of the resource. To take the PCI bus 1040 as an example in this case, the total volume (or, the limit for the data transfer bandwidth) that enables each client to execute a process is set at 100 MB/s. Note that the data transfer bandwidth is expressed as the data transfer speed. The total capacity of resource 3102 is set below the actual usage limit inherent in the resource, such as the PCI bus 1040. The number of keys 3103 indicates the number of sets of key information respectively corresponding to the clients. In other words, the number of keys 3103 indicates the number of clients that are currently using the resource. The key IDs 3104, 3105, and 3106 each indicate an ID to specify the key information. The number of such key IDs is equivalent to the number indicated by the number of keys 3103.

The key information 3200 is used for managing the state of a specific resource used by a client. As shown in FIG. 7, the key information 3200 includes a key ID 3201, a client ID 3202, a valid period 3203, a current volume 3204, a maximum volume 3205, a minimum volume 3206, an acquisition priority 3207, and a use continuation priority 3208. The key information 3200 is generated when one of the clients has issued a request to use the resource to the resource manager 2010. Values representing the valid period 3203, the maximum volume 3205, the minimum volume 3206, the acquisition priority 3207, and the use continuation priority 3208 are respectively set based on the corresponding sets of information found in the resource request information 2500. To be more specific, the values are set respectively in accordance with the values of the valid period 2503, the maximum volume 2504, the minimum volume 2505, the acquisition priority 2506, and the use continuation priority 2507.

The key ID 3201 is an ID specifying the key information 3200. The key information 3200 and the resource management information 3100 correspond with each other by the key ID 3201 and the key ID in the resource management information 3100. The client ID 3202 is an ID specifying the application program that has issued the request resulting in the generation of the key information.

The valid period 3203 refers to a valid time period of the key information itself, and is used for restricting the time period for which the resource will have been available to the client via the server. This is to say, the valid period 3203 indicates a valid time period for which the resource manager 2010 gives the client authorization to use the resource. It should be noted here that the resource manager 2010 updates the valid period 3203 with the passage of time or updates it as required.

The current volume 3204 is the volume that has been determined by the resource manager 2010 for the client to use. The current volume 3204 is referred to by a server when the data transfer or the like is to be performed by the server using the resource. By referring to the current volume 3204, the server can see the available volume of the resource, such as the data transfer bandwidth. Therefore, the current volume 3204 indicates the volume by which the client has been given authorization to use the resource, that is, the resource volume that can be used by the client via the server.

The maximum volume 3205 and the minimum volume 3206 respectively indicate the maximum and minimum volumes by which the client has requested for the resource. More specifically, the maximum volume 3205 indicates a desirable volume for executing a process using the resource while the minimum volume 3206 indicates the volume that is required at the minimum.

The acquisition priority 3207 indicates the priority of the client as to the acquisition of the resource, and is represented by one of Levels 1 to 4 in accordance with the level at which the client needs the resource. Note that even when the acquisition priority 3207 of the current client indicates Level 4, the resource cannot be used by the current client when another client is using the resource and the use continuation priority 3208 of the key information 3200 related to the other client indicates Level 4.

The use continuation priority 3208 indicates the priority of the client as to the continuation of using the resource. The use continuation priority 3208 is referred to when another client has requested for the same resource as is being used by the current client. As in the case of the acquisition priority 3207, the use continuation priority 3208 is represented by one of Levels 1 to 4 in accordance with the level at which the client needs to continue to use the resource.

Operations

The following is a description of operations performed by the non-linear editing system 1000 having the stated construction for the use of the resources.

Figure 8:
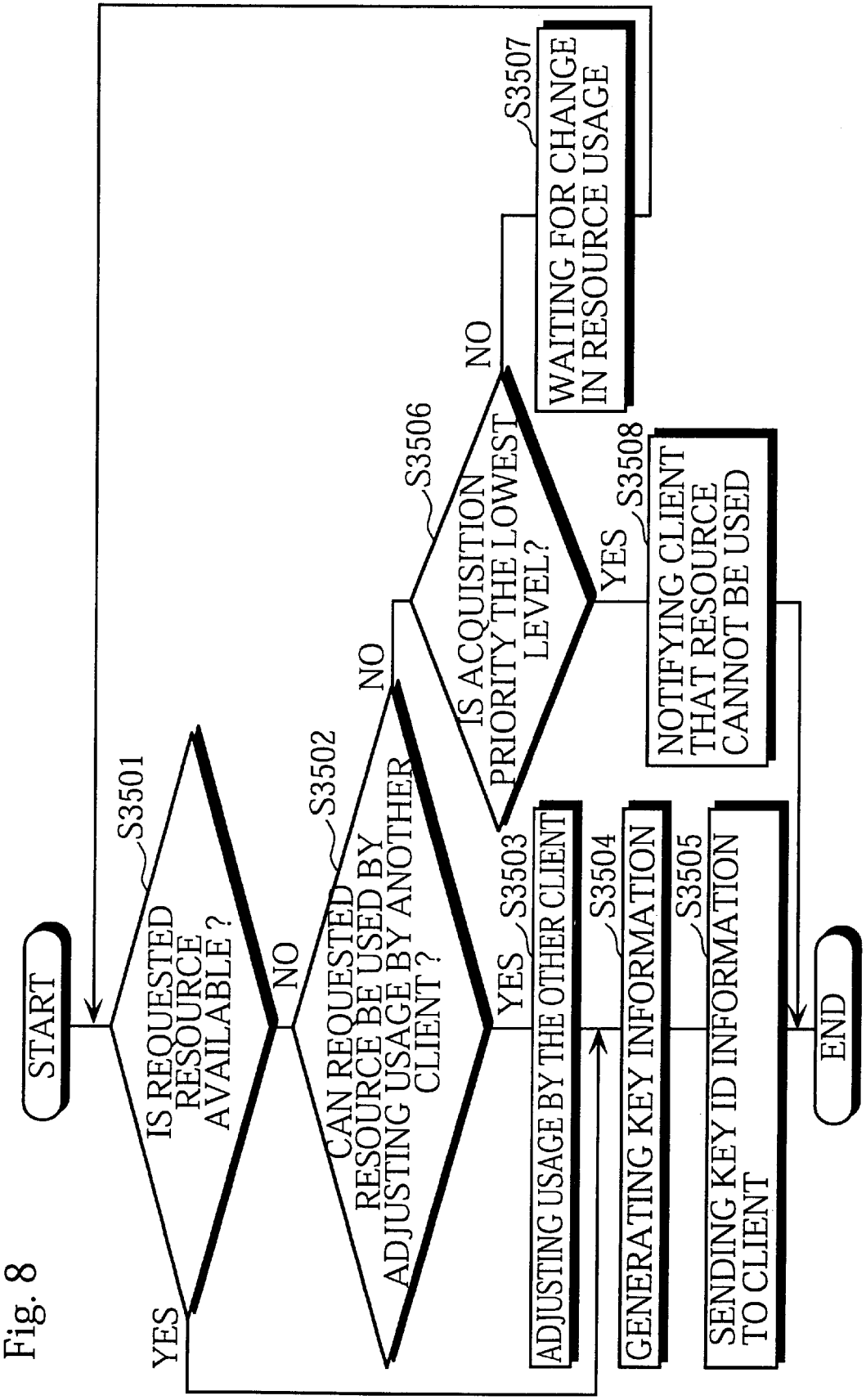
FIG. 8 is a flowchart showing a resource use request receiving process performed by the resource manager 2010 when receiving a request from a client to use a resource.
Figure 9:
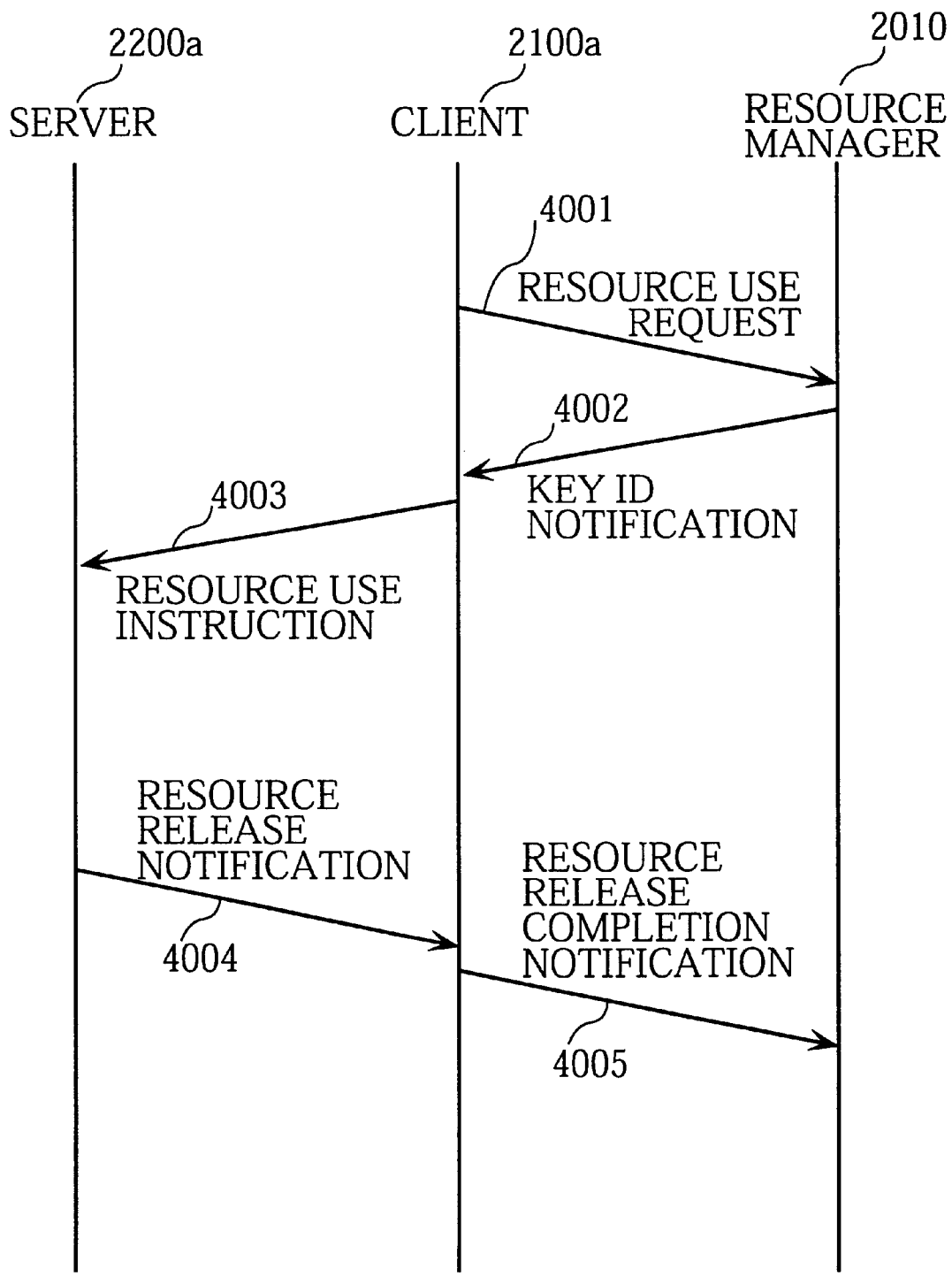
FIG. 9 shows an example of a message sequence followed when the client use the resource.

First, a basic operation that is performed when a client uses a resource is explained with reference to FIG. 8 and FIG. 9. FIG. 8 is a flowchart showing a resource use request receiving process performed by the resource manager 2010 when receiving a resource use request from a client. FIG. 9 shows an example of a message sequence followed when the client use the resource.

As shown in FIG. 9, the client 2100a sends a resource use request 4001 to the resource manager 2010 so as to use a resource that is required for the execution of its own process.

Messages are sent/received using addresses, handles, or the like that are previously obtained from each other. For example, a client previously obtains an address of the resource manager 2010 as the destination of a message while the resource use request 4001 includes an address of the client as the destination of a response message from the resource manager 2010.

Suppose that the client 2100a is an application program used as a clip editor. This clip editor executes the data transfer at a high speed to some extent using the PCI bus 1040 via a server so as to enable the video data editing while keeping the video reproduction in real time. Also suppose that the resource use request 4001 includes the resource request information 2500 having the values shown in FIG. 6.

Upon receipt of the resource use request 4001 from the client 2100a, the resource manager 2010 performs the resource use request receiving process shown in FIG. 8 by referring to the resource request information 2500 and the resource management DB 2020.

As shown in the flowchart of FIG. 8, the resource manager 2010 first judges whether the resource requested by the client 2100a is available (step S3501). This judgement is made as follows. The resource manager 2010 refers to the resource management information 3100 associated with the resource whose ID is 0x01 indicated by the object resource ID 2502. The resource manager 2010 calculates the volume that is currently available by subtracting the total of the current volume 3204 included in all of the sets of the key information linked with the resource management information 3100 from the total capacity of resource 3102. Then, the resource manager 2010 judges whether the calculated volume is equal to or more than the minimum volume requested by the client 2100a.

When judging that the resource can be used by the client 2100a ("yes" in step S3501), the resource manager 2010 generates the key information based on the resource request information 2500 and links the generated key information with the resource management information 3100 by adding a key ID of the key information to the resource management information 3100 (step S3504). Following this, the resource manager 2010 sends a key ID notification 4002 (see FIG. 9) including the key ID to the client 2100a (step S3505). The key information is generated based on the values indicated in the corresponding sets of information in the resource request information 2500. Also, the currently available volume calculated as described above is indicated as the current volume 3204 in the key information. Accordingly, the key information 3200 is generated.

When judging that the resource cannot be used by the client 2100a ("no" in step S3501), the resource manager 2010 next makes a judgement by referring to the acquisition priority 2506 in the resource request information 2500 that is included in the resource use request 4001 and to the use continuation priority 3208 in each set of key information that has been generated for the current resource (step S3502). Specifically, the resource manager 2010 judges whether the use of the resource by another client can be suspended or whether the volume used by the other client can be reduced. If possible ("yes" in step S3502), the resource manager 2010 adjusts the use of the resource by the other client (step S3503). After this, the resource manager 2010 generates key information (step S3504) and sends a key ID notification 4002 to the client 2100a (step S3505).

When judging once again that the resource cannot be used ("no" in step S3502), the resource manager 2010 next judges whether the acquisition priority 2506 of the resource request information 2500 of the client 2100a indicates Level 1 (step S3506). If so ("yes" in step S3506), the resource manager 2010 sends a message to the client 2100a that the resource cannot be used (step S3508). If not ("no" in step S3506), the resource manager 2010 waits for the resource management DB 2020 to be updated according to the changes in the resource volume (step S3507) and returns to step S3501. More specifically, when the client 2100a has requested with the acquisition priority of Level 2, the resource manager 2010 has the client 2100a wait until the resource becomes available. After confirming the availability of the resource, the resource manager 2010 sends the key ID notification 4002 to the client 2100a. In step S3507, the resource manager 2010 sends the client 2100a a message to wait for the resource to become available.

After receiving the key ID notification 4002 from the resource manager 2010 during the resource use request receiving process, the client 2100a sends a resource use instruction 4003 (see FIG. 9) including the key ID to the server 2200a. Although not shown in FIG. 5, the non-linear editing system 1000 may have a construction where each client has access to the resource management DB 2020. In this case, the client 2100a can refer to the key information 3200 in the resource management DB 2020 according to the key ID.

Upon receipt of the resource use instruction 4003 from the client 2100a, the server 2200a refers to the key information 3200 in the resource management DB 2020 according to the key ID. With reference to the key information 3200, the server 2200a adjusts, for example, the transfer timing so that the data transfer is executed by means of the data transfer bandwidth indicated by the current volume 3204. After the data transfer, the server 2200a sends a resource release notification 4004 (see FIG. 9) to the client 2100a. During the data transfer, the data is sent/received between the client 2100a and the server 2200a.

Upon receiving the resource release notification 4004 from the server 2200a, the client 2100a sends a resource release completion notification 4005 (see FIG. 9) including the key ID to the resource manager 2010.

In response to the resource release completion notification 4005 from the client 2100a, the resource manager 2010 updates the resource management DB 2020, meaning that the associated sets of key information are deleted from the resource management DB 2020. Accordingly, a series of operations performed when the client uses the resource is terminated.

Figure 10:
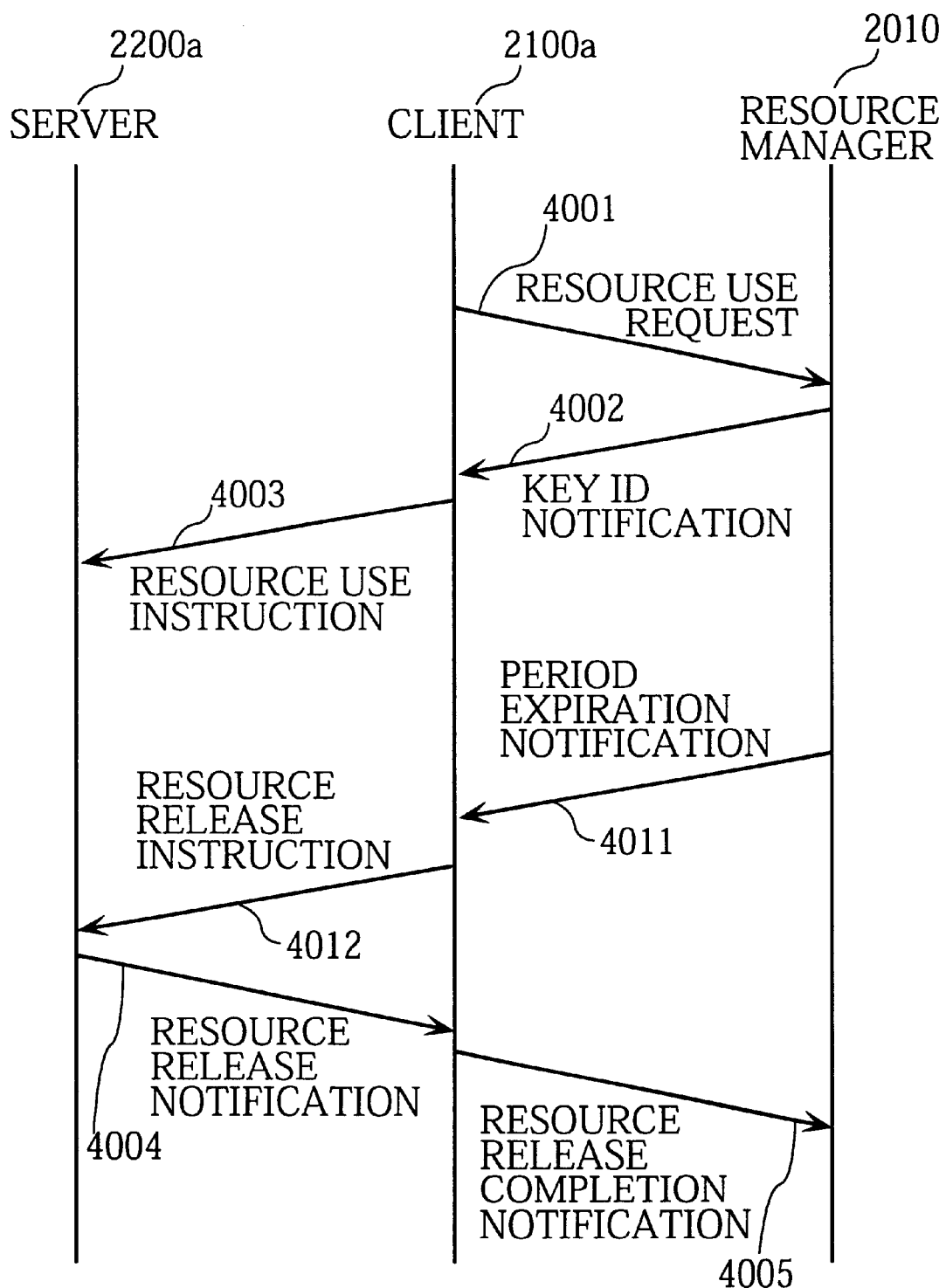
FIG. 10 shows an example of a message sequence followed when the valid period of the key information is expired while the client is using the resource.

Next, an explanation is given for a case where the valid period of the key information has been expired. FIG. 10 shows an example of a message sequence followed when the valid period of the key information is expired while the client is using the resource.

As shown in FIG. 10, this message sequence is the same as the one shown in FIG. 9 up to the point where the server 2200a executes the data transfer after receiving the resource use instruction 4003 from the client 2100a.

When the valid period indicated by the valid period 3203 in the key information 3200 included in the resource management DB 2020 has been expired during the data transfer executed by the server 2200a, the resource manager 2010 sends a period expiration notification 4011 to the client 2100a. It should be noted here that, in order to judge whether the valid period has been expired, the resource manager 2010 reduces the value indicated by the valid period 3203 after sending the key ID notification 4002 to the client 2100a. For doing so, the resource manager 2010 uses a timer or the like that is realized by software of the multitask OS.

Upon receipt of the period expiration notification 4011, the client 2100a sends a resource release instruction 4012 to the server 2200a.

In response to the resource release instruction 4012, the server 2200a suspends the data transfer and releases the resource. Then, the server 2200a sends a resource release notification 4004 to the client 2100a.

After this, as in the case shown in FIG. 9, the client 2100a sends the resource release completion notification 4005 to the resource manager 2010 which then updates the resource management DB 2020. Accordingly, a series of operations performed when the valid period of the key information has been expired while the resource is being used.

Figure 11:
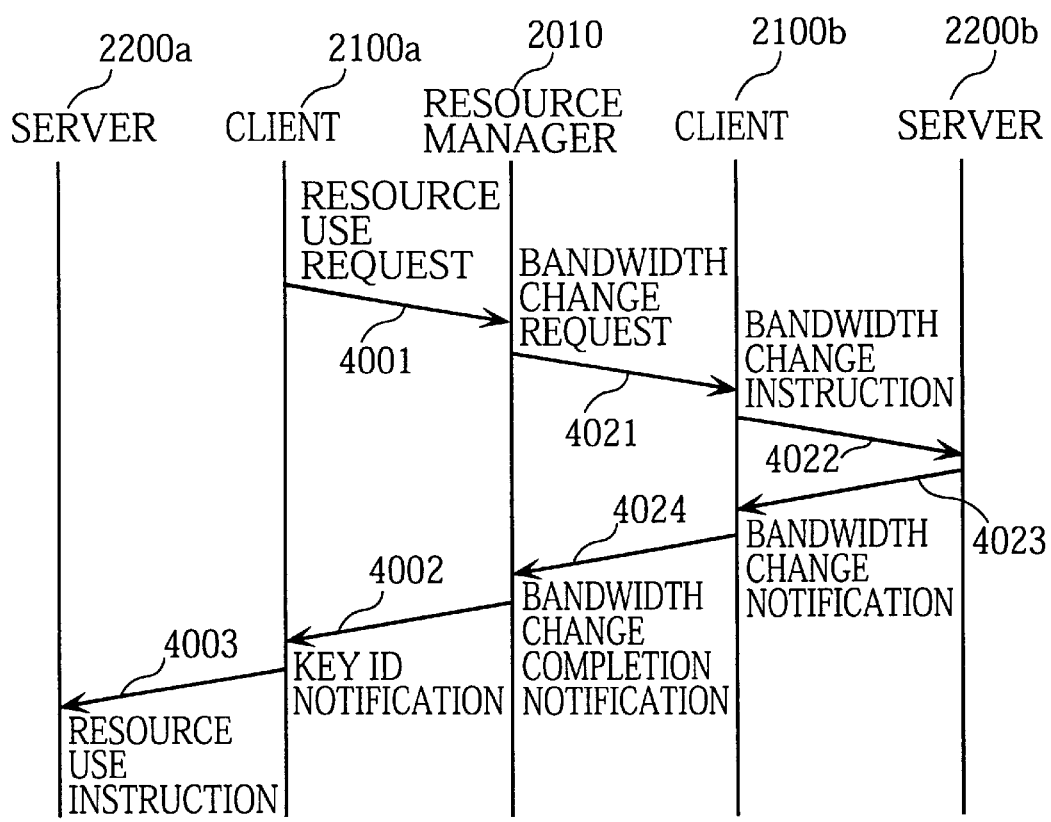
FIG. 11 shows an example of a message sequence followed when the client 2100a issues a request to use a resource while the client 2100b is currently using the resource.

Next, an explanation is given for a case where another client (the client 2100a in the present example) issues a request to use a resource while the client 2100b is currently using the resource, with reference to FIG. 11 and FIG. 8. FIG. 11 shows an example of a message sequence followed when the client 2100a issues a request to use a resource while the client 2100b is currently using the resource.

The client 2100b is an application program that, for example, transfers network data via the server 2200b and is currently using the resource. The total capacity of resource 3102 in the resource management information 3100 related to the resource indicates 100 MB/s. As the key information of the client 2100b, the current volume is 60 MB/s, the minimum volume is 30 MB/s, and the use continuation priority is Level 3. Here, note that the PCI bus 1040 is used as both the resources 2300a and 2300b that are respectively used by the servers 2200a and 2200b.

As shown in FIG. 11, the client 2100a sends the resource use request 4001 to the resource manager 2010. The resource request information 2500 included in the request 4001 has the values shown in FIG. 6.

Upon receipt of the resource use request 4001, the resource manager 2010 starts the resource use request receiving process explained above with reference to FIG. 8. To be more specific about the present case, the resource manager 2010 judges that the resource requested by the client 2100a cannot be used ("no" in step S3501), further judges that the resource can be used by adjusting the use of the resource by the other client ("yes" in step S3502), and accordingly adjusts the use of the resource by the other client (step S3503).

The acquisition priority in the resource request information sent from the client 2100a is Level 3, and the use continuation priority in the key information related to the client 2100b is Level 3. As such, the resource manager 2010 reduces the current volume in the key information related to the client 2100b from 60 MB/s to 30 MB/s, extends the valid period in the key information, and so updates the resource management DB 2020. Following this, the resource manager 2010 sends a request 4021 to the client 2100b, requesting to change the data transfer bandwidth. This message is referred to as the "bandwidth change request" 4021 hereinafter. The extension of the valid period in the key information is described later in this specification.

In response to the bandwidth change request 4021, the client 2100b sends a bandwidth change instruction 4022 to the server 2200b.

Upon receipt of the bandwidth change instruction 4022, the server 2200b refers to the current volume in the key information in the resource management DB 2020 that the server 2200b referred to on the start of the data transfer. In accordance with the current volume, the server 2200b reduces the data transfer bandwidth by changing, for example, the data transfer timing. After this, the server 2200b sends a bandwidth change notification 4023 to the client 2100b.

Upon receiving the notification 4023, the client 2100b sends a bandwidth change completion notification 4024 to the resource manager 2010.

In response to the notification 4024 from the client 2100b, the resource manager 2010 sets the current volume at 70 MB/s, and generates key information based on the resource request information having been received from the client 2100a. The resource manager 2010 then links the generated key information with the resource management information (step S3504 in FIG. 8), and sends the key ID notification 4002 including the key ID to the client 2100a (step S3505).

Upon receipt of the key ID notification 4002, the client 2100a sends the resource use instruction 4003 to the server 2200a, and performs the data transfer using the resource via the server 2200a thereafter.

As described up to this point, the source manager 2010 has the clients use a resource in order of priority, by adjusting the current volume if another client is currently using the resource. In other words, the client that issues the highest-priority request can use the resource.

Figure 12:
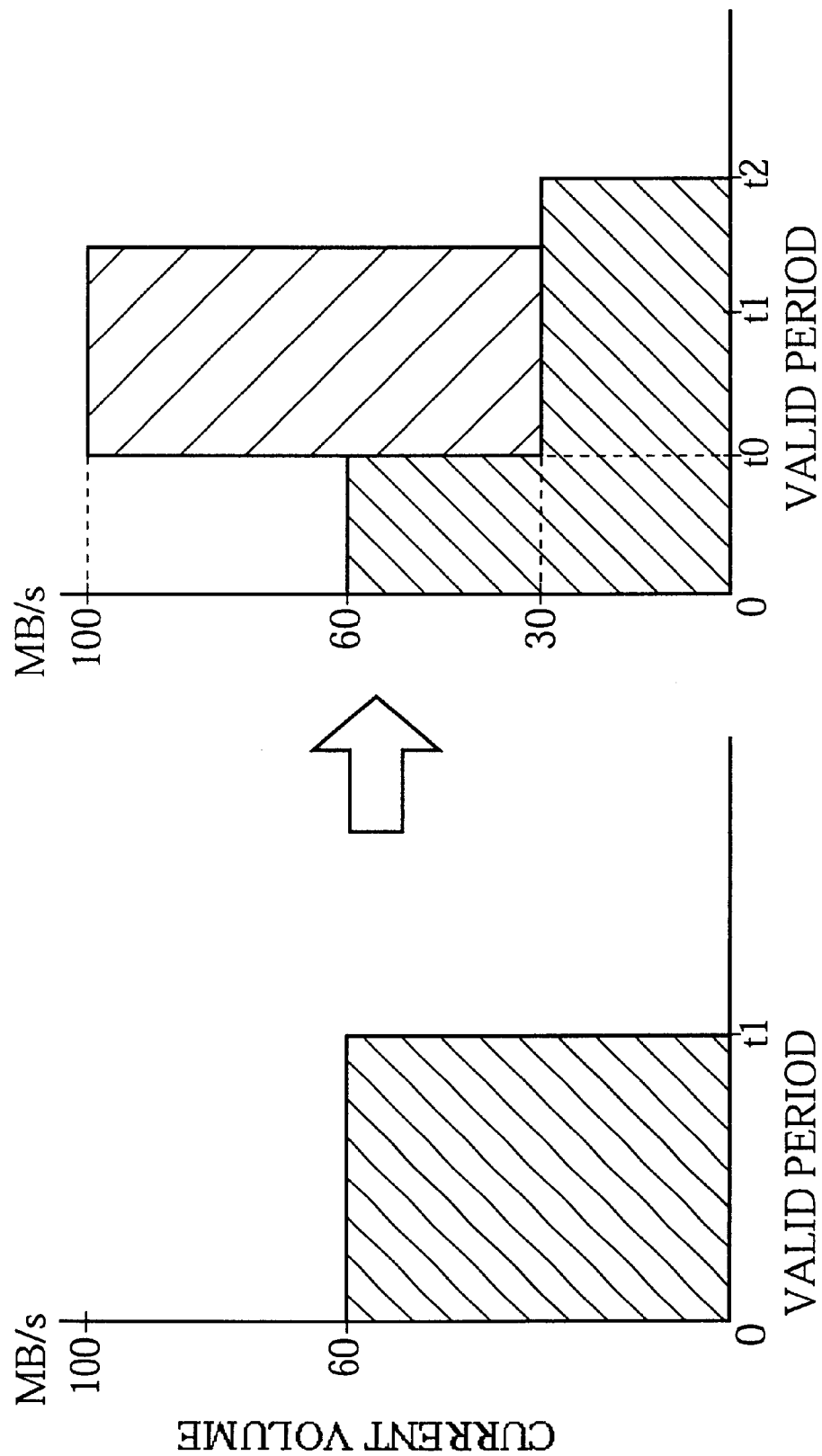
FIG. 12 shows a relation between the current volume and the valid period before and after the valid period of the key information related to the client 2100b is extended.

The following is an explanation for the extension of a valid period that is included in the key information related to the client 2100b, the extension being executed by the resource manager 2010. FIG. 12 shows a relation between the current volume and the valid period before and after the valid period of the key information related to the client 2100b is extended.

At first, the client 2100b was using the resource, with the valid period being t1 and the data transfer bandwidth being 60 MB/s. At the time t0, the resource manager 2010 reduces the data transfer bandwidth set for the client 2100b from 60 MB/s to 30 MB/s so as to have the client 2100a use the resource. The resource manager 2010 then divides the product of (t1−t0) and 60 MB/s by 30 MB/s, and sets the calculated quotient, i.e., (t2−t0), as a new remaining valid period for the client 2100b. The resource manager 2010 extends the valid period of the client 2100b, thereby enabling the data transfer that the client 2100b needs to perform.

Figure 13:
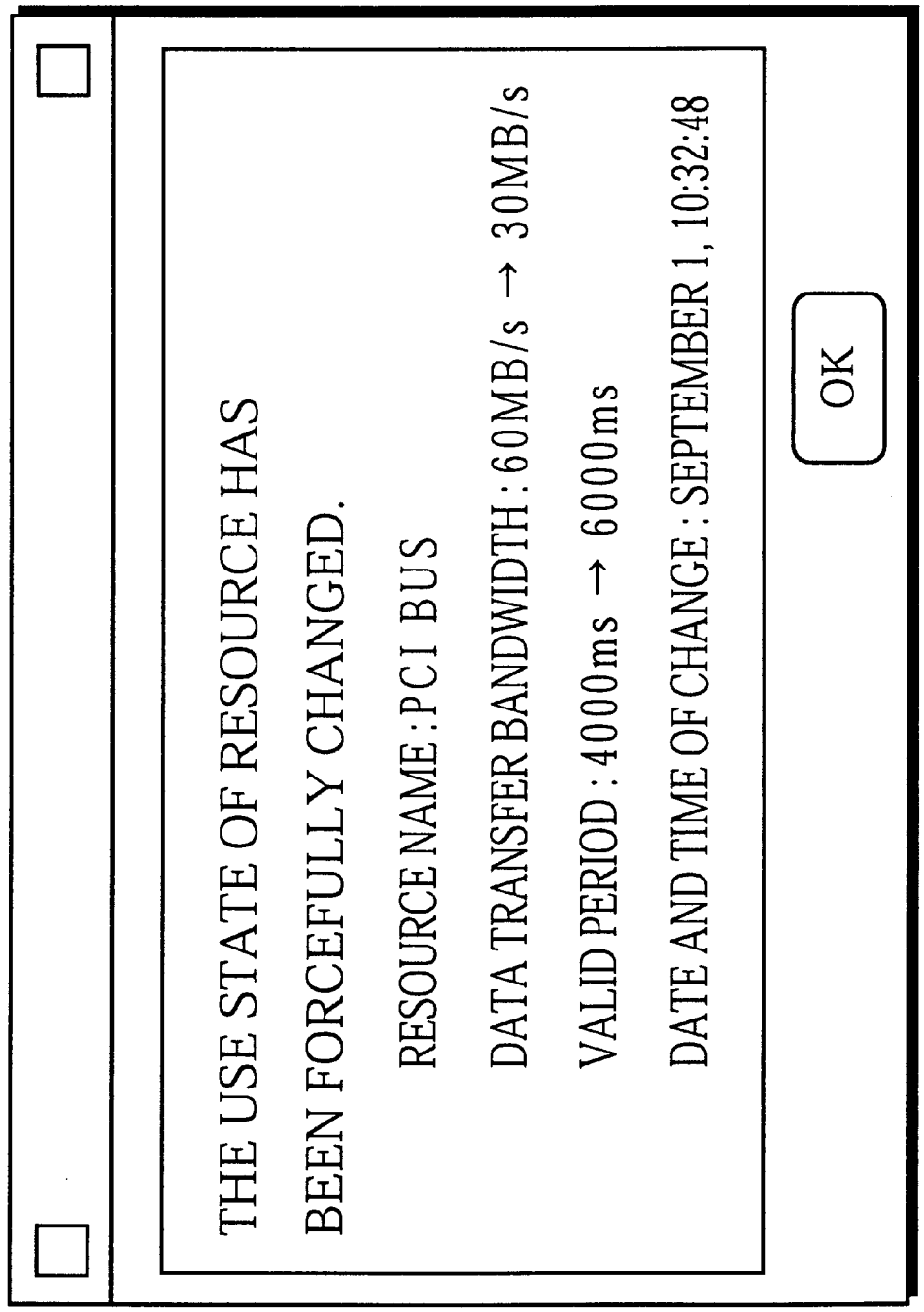
FIG. 13 shows an example of a GUI screen that notifies the user of the changes having been made to the data transfer bandwidth and the valid period regarding the use of resource.

When receiving the bandwidth change request 4021 from the resource manager 2010, the client 2100b can refer to the resource management DB 2020 in order to confirm the changes in the data transfer bandwidth and the valid period. Thus, a GUI (Graphical User Interface) screen as shown in FIG. 13 may be displayed on the monitor 1052. FIG. 13 shows an example of a GUI screen that notifies the user of the changes having been made to the data transfer bandwidth and the valid period.

Figure 14:
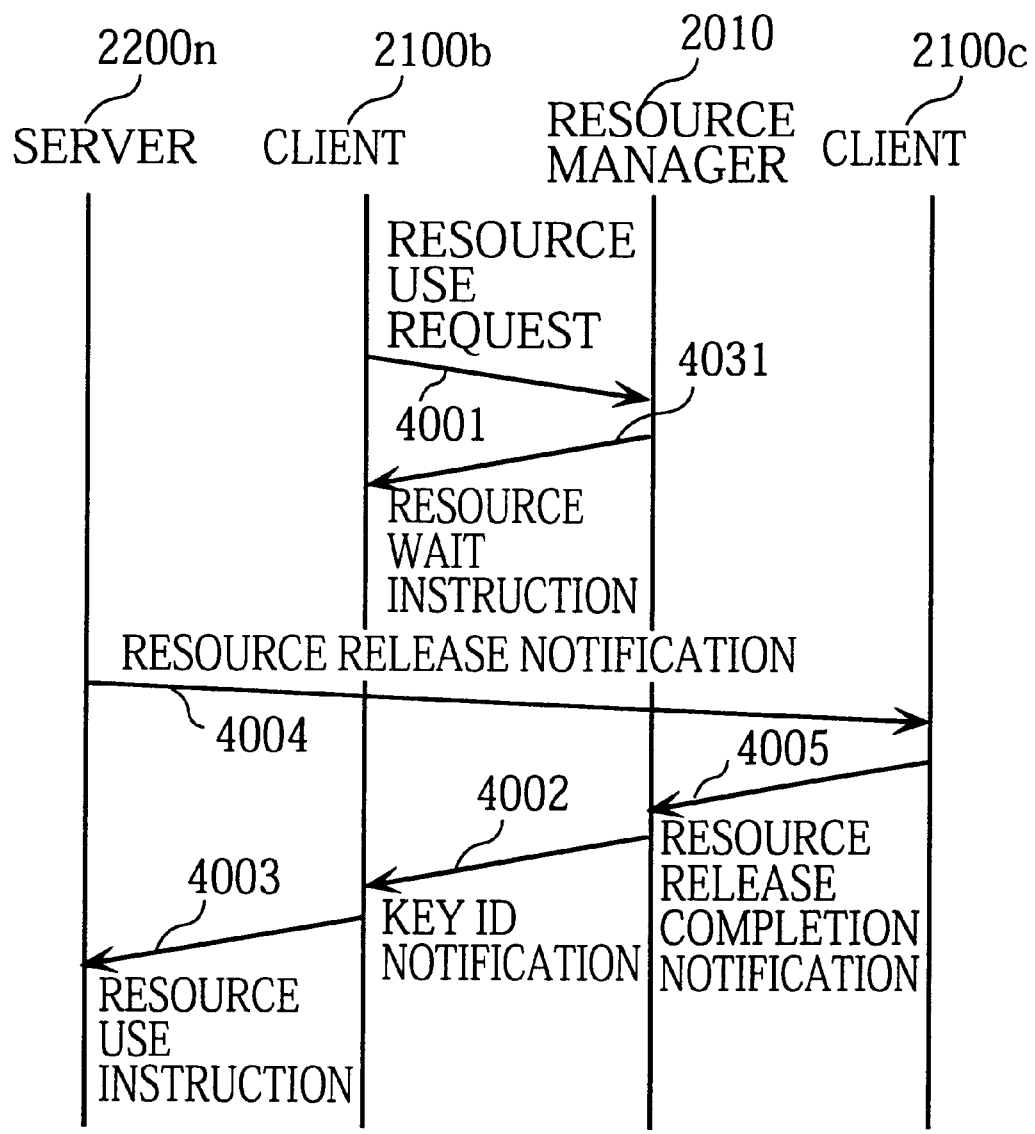
FIG. 14 shows an example of a message sequence followed when the client 2100b issues a request to use a resource while the client 2100c is currently using the resource.

Next, an explanation is given to a case where, in contrast to the stated case described with reference to FIG. 11, a client with a lower acquisition priority issues a request to use a resource to the resource manager 2010 while another client with a higher continuation priority is currently using the resource. The present case is explained with reference to FIG. 14 and FIG. 8. FIG. 14 shows an example of a message sequence followed when the client 2100b issues a request to use a resource while the client 2100c is currently using the resource.

Suppose here that the client 2100b needs to perform the network data transfer via the server 2200n without urgency, and its acquisition priority is Level 2. Meanwhile, the client 2100c needs to continue the data transfer at a high speed and has already been using the resource via the server 2200n. The use continuation priority of the client 2100c is Level 4.

As shown in FIG. 14, the client 2100b sends the resource use request 4001 to the resource manager 2010 while the client 2100c is currently using the resource.

In response to the request 4001, the resource manager 2010 starts the resource use request receiving process shown in FIG. 8. In the present case, the judgements are made to be "no" in steps S3501, S3502, and S3506. The resource manager 2010 sends a resource wait instruction 4031 to the client 2100b and waits for the resource to become available (step S3507).

On completion of the data transfer by the client 2100c via the server 2200n, the server 2200n sends the resource release notification 4004 to the client 2100c. In response to the notification 4004, the client 2100c sends the resource release completion notification 4005 to the resource manager 2010.

Upon receipt of the notification 4005, the resource manager 2010 updates the resource management DB 2020, meaning that the associated sets of key information are deleted from the resource management DB 2020. Following this, the resource manager 2010 proceeds to step S3501 where it judges that the resource can be used, and generates key information based on the resource use request issued by the client 2100b (step S3504). Then, the resource manager 2010 sends the key ID notification 4002 to the client 2100b (step S3505).

Figure 15:
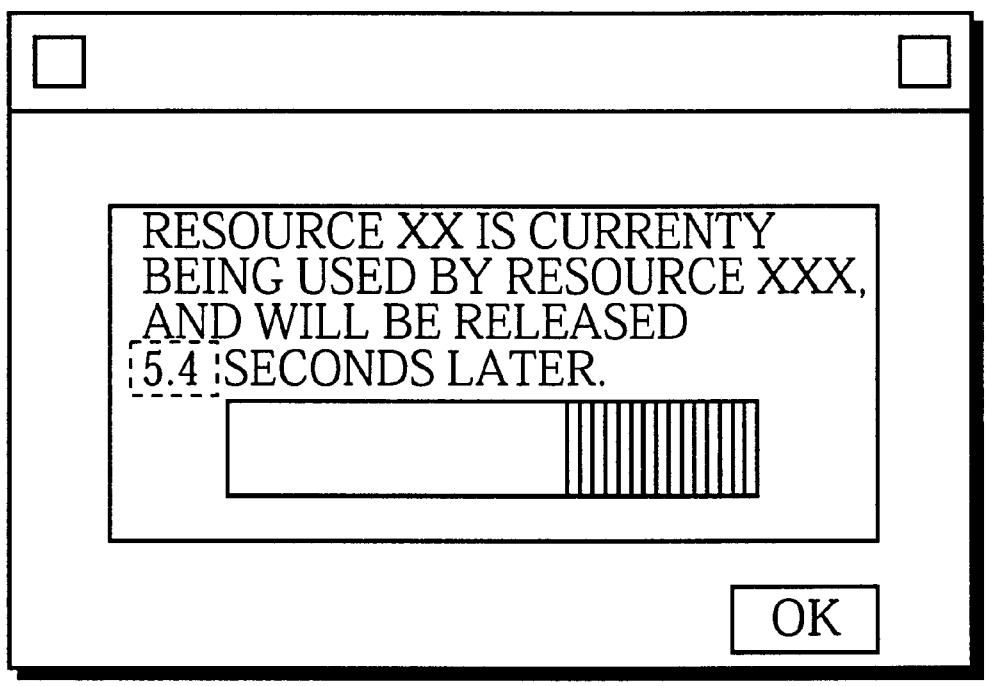
FIG. 15 shows an example of a GUI screen displayed so as to provide the user with the information regarding the time to be taken before the resource is released.

It should be noted here that, the resource wait instruction 4031 that is sent from the resource manager 2010 to the client 2100b in the present case includes the client ID and the valid period of the key information concerning the use of resource by the client 2100c. Therefore, by referring to the instruction 4031, the client 2100b that is to wait for the resource to be available can predict the time when the resource will become available. Also, a GUI screen as shown in FIG. 15 may be displayed on the monitor 1052, providing the user with information regarding the time to be taken before the resource is released. FIG. 15 shows an example of a GUI screen displayed so as to provide the user with the information regarding the time to be taken before the resource is released.

As described above, a client in the wait state can predict the time when the resource will become available. Thus, the client may stay on standby until the predicted time, without keeping checking whether the resource has been released.

This results in the reduction of load on the CPU 1010.
First Modification

Figure 16:
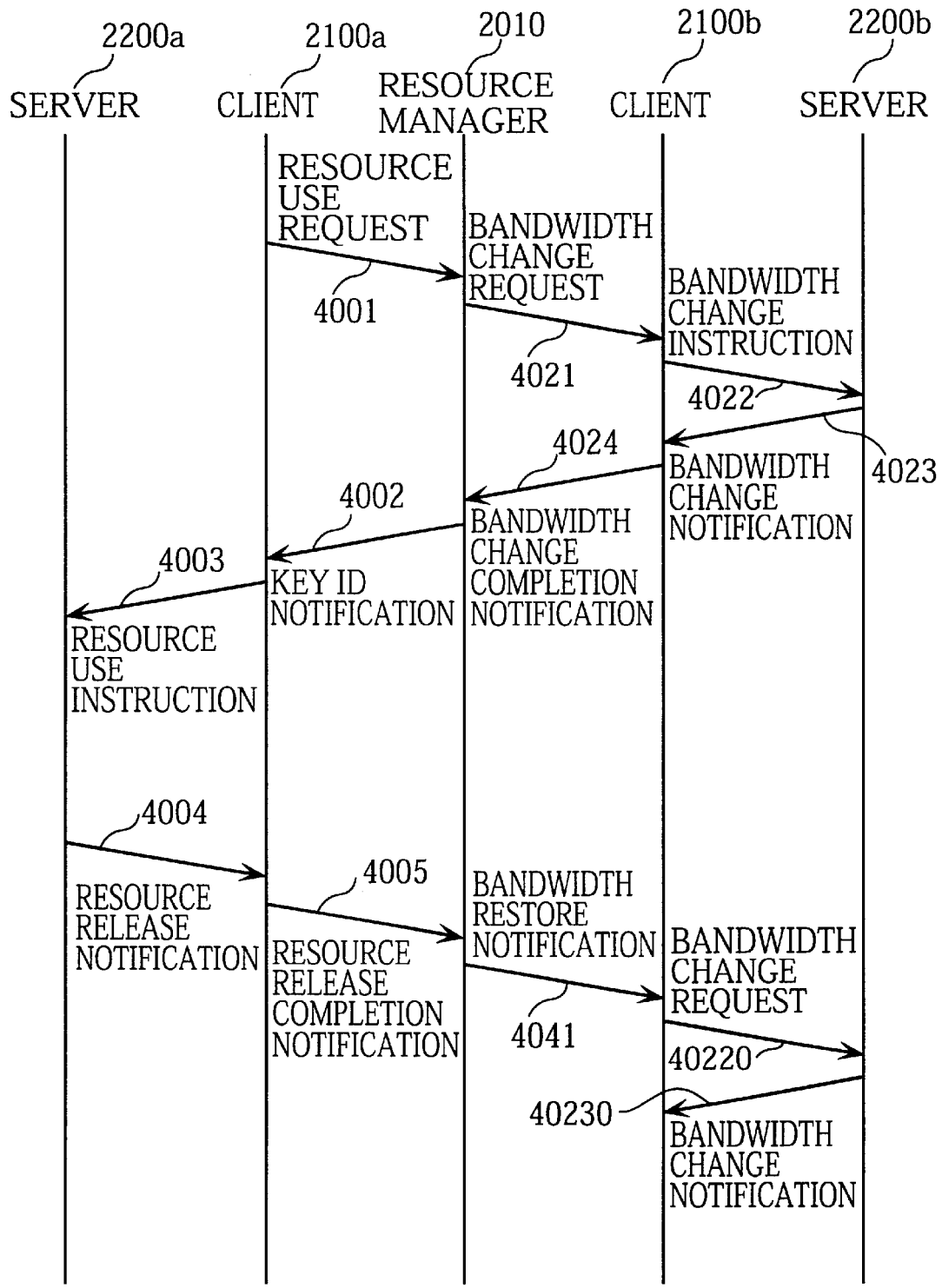
FIG. 16 shows an example of a message sequence followed when the client 2100a issues a request to use a resource while the client 2100b is currently using the resource, in the first modification.
Figure 17:
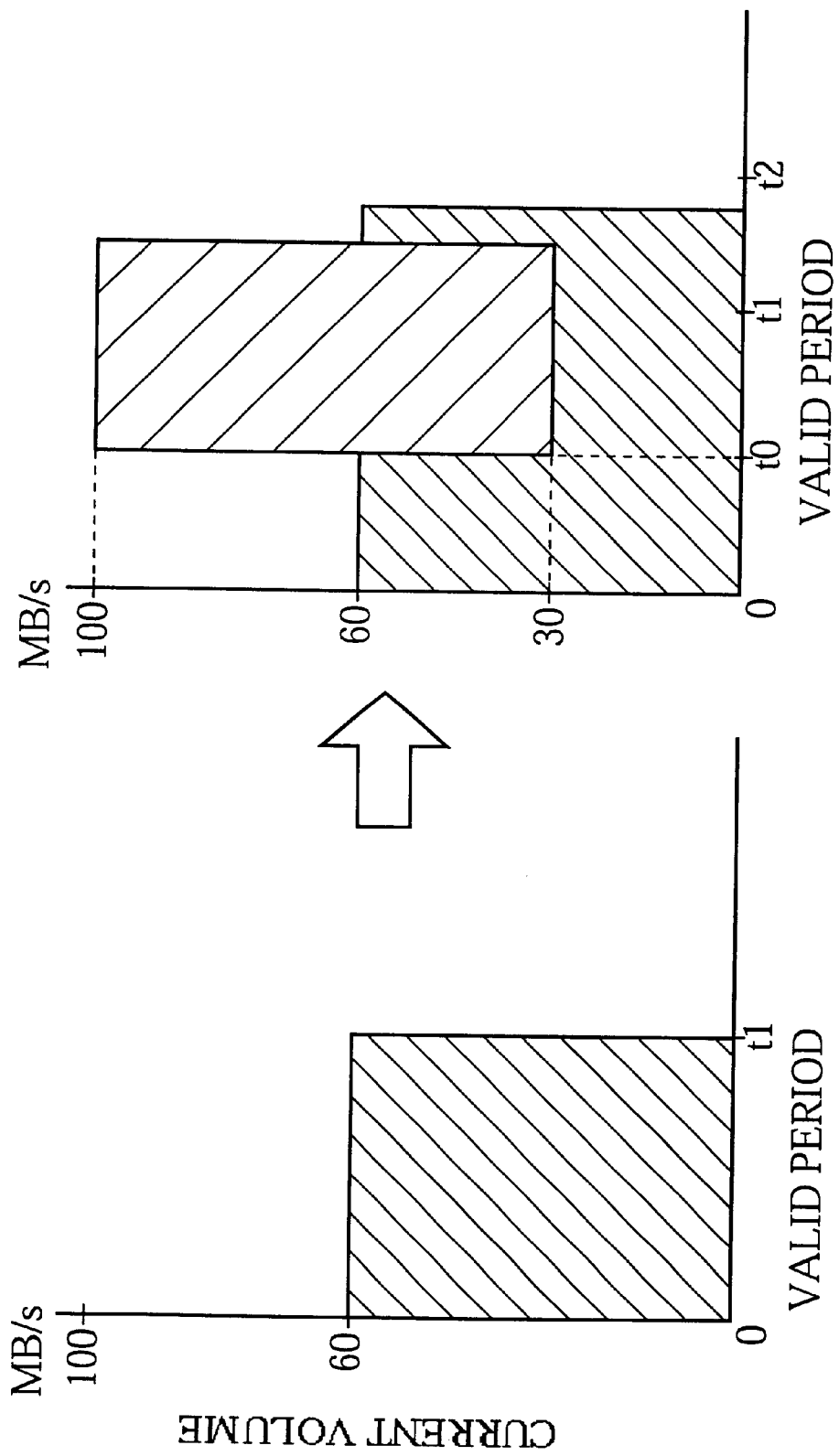
FIG. 17 shows a relation between the current volume used by the client 2100b and the valid period given to the client 2100b.

The following is a description of a first modification of the non-linear editing system 1000, with reference to FIG. 16 and FIG. 17. In the first modification, the data transfer bandwidth that has been once reduced is increased, in addition to the series of operations that is performed following the message sequence shown in FIG. 11.

FIG. 16 shows an example of a message sequence followed when the client 2100*a* issues a request to use a resource while the client 2100*b* is currently using the resource, in the first modification.

As shown in FIG. 16, this message sequence is the same as the one shown in FIG. 11 up to the point where the client 2100*a* sends the resource use instruction 4003 to the server 2200*a*. More specifically, the resource manager 2010 sends the bandwidth change request 4021 to the client 2100*b*, and after reducing the data transfer bandwidth, sends the key ID notification 4002 to the client 2100*a* which then uses the resource because of its priority.

After the client 2100*a* has finished using the resource, the resource manager 2010 receives the resource release completion notification 4005 from the client 2100*a*, and updates the resource management DB 2020, meaning that the sets of the key information associated with the client 2100*a* are deleted. Following the updating of the resource management DB 2020, the resource manager 2010 restores the current volume in the key information related to the client 2100*b*, whose data transfer bandwidth has been reduced, to the state before the reduction and accordingly reduces the valid period in the key information. Note that the resource manager 2010 stores the value of the original current volume when the data transfer bandwidth used by the client 2100*b* is reduced. Thus, the resource manager 2010 can restore the current volume back to the original by referring to the stored value.

After updating the resource management DB 2020, the resource manager 2010 sends a bandwidth restore notification 4041 to the client 2100*b*.

Upon receipt of the notification 4041, the client 2100*b* sends a bandwidth change request 40220 to the server 2200*b*. In response to the bandwidth change request 40220, the server 2200*b* adjusts the data transfer bandwidth to the current volume by referring to the resource management DB 2020, and sends a bandwidth change notification 40230 to the client 2100*b*. Note that the series of operations performed on the client 2100*b* from receiving the bandwidth restore notification 4041 to receiving the bandwidth change notification 40230 is basically the same as the series of operations performed on the client 2100*b* from receiving the bandwidth change request 4021 to receiving the bandwidth change notification 4023.

Accordingly, the client 2100*b*, whose data transfer bandwidth was reduced so as to have another client use the resource, is now able to use the resource with the original data transfer bandwidth after the other client has finished using the resource.

FIG. 17 shows a relation between the current volume used by the client 2100*b* and the valid period given to the client 2100*b*.

While the client 2100*b* is using the resource, with the valid period being t1 and the data transfer bandwidth being 60 MB/s, the resource manager 2010 controls at the time t0 so that the data transfer bandwidth used by the client 2100*b* is reduced to 30 MB/s in order to allow the client 2100*a* to use the resource. After the client 2100*a* has finished using the resource, the resource manager 2010 restores the bandwidth used by the client 2100*b* to 60 MB/s and also reduces the valid period t2 that was obtained by extending the original valid period (see FIG. 12). Under the control of the resource manager 2010, the current volume and the valid period are changed as shown in FIG. 17.
Second Modification The following is a description of a second modification of the non-linear editing system 1000, with reference to FIG. 18. In the first embodiment and first modification, a client issues a resource use request to the resource manager 2010 immediately before using the resource. In the second modification, meanwhile, a client can make a reservation for using a resource beforehand.

The resource manager 2010 manages a schedule for each resource in the second modification. Thus, the resource management DB 2020 includes a resource management timetable for each resource as information to manage reserved time periods (including the start and end times) for which the clients will be using the resource.

Figure 18:
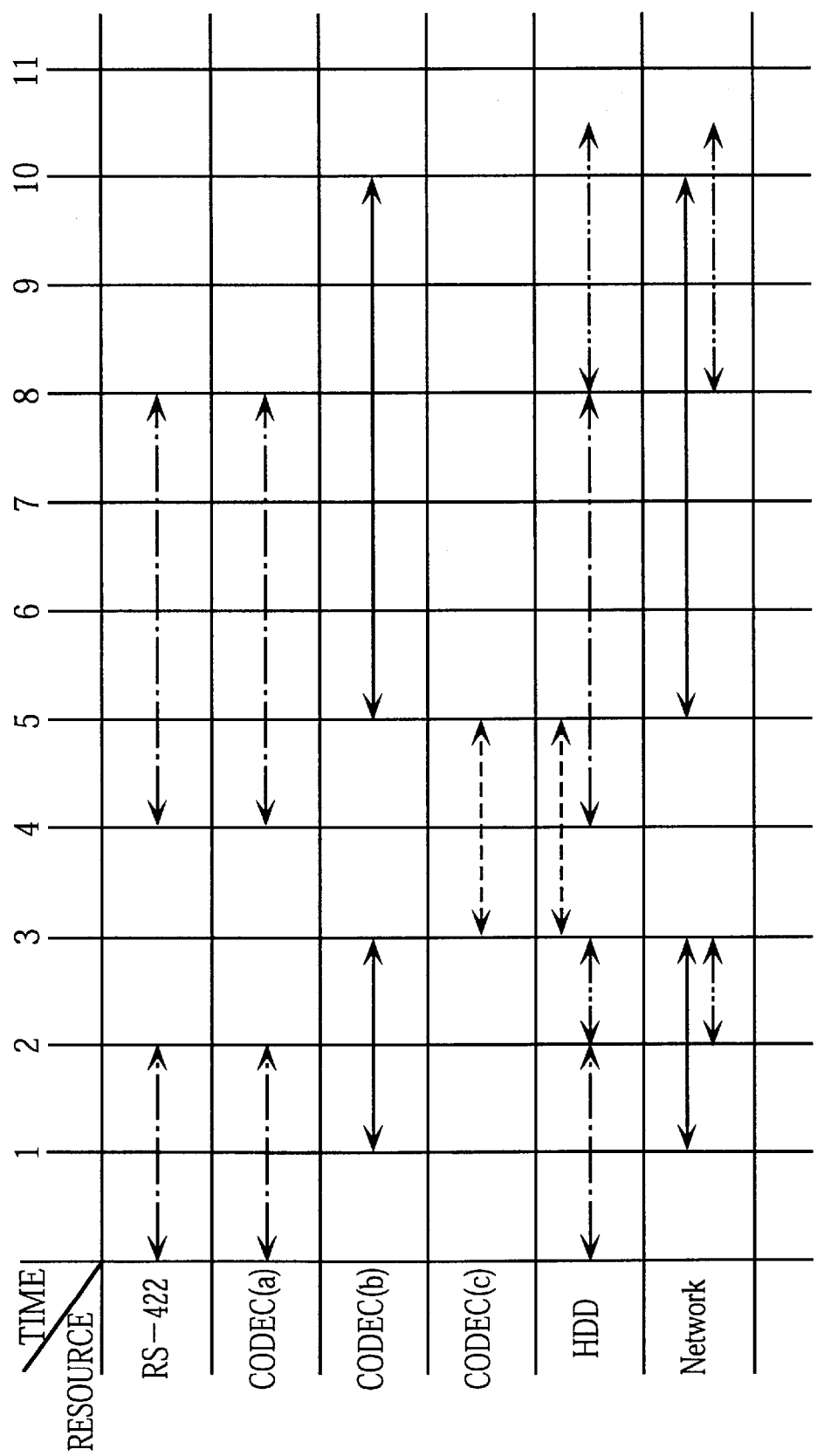
FIG. 18 shows an example of a representation of the resource management timetable included in the resource management DB 2020 in the second modification.

FIG. 18 shows an example of a representation of a resource management timetable included in the resource management DB 2020 in the second modification. The resource management timetable shown in FIG. 18 is used for managing the schedules of an RS-422 communication interface, a CODEC for encoding signals and decoding data, a hard disk drive (HDD), and a network card that are used by the clients. Note that double-headed arrows drawn in solid lines, dashed lines, one-dot chain lines, and two-dot chain lines respectively indicate time periods during which the different clients will use the resource. To be more specific, the type of line specifies the client.

For the management of the schedule of the resource, each client adds information regarding a start time to use the resource to the resource request information 2500 (see FIG. 6) when issuing a resource use request to the resource manager 2010. By referring to the information regarding the start time and the valid period, the period for which the client will be using the resource can be determined. The resource manager 2010 updates the resource management timetable of the resource management DB 2020 every time it receives the resource use request from a client.

When judging, in response to the reservation request from the client, that the client will be able to use the resource during the requested period, the resource manager 2010 generates the key information as stated and sends a message to the client that the reservation has been made. Then, when the start time comes, the resource manager 2010 links the generated key information with the resource management information and notifies the client of the key ID. Accordingly, the client that has issued the reservation request obtains authorization to use the resource when the start time comes.

If the periods requested by the clients happen to coincide with each other, the resource manager 2010 makes an adjustment in accordance with the acquisition priority and the use continuation priority in the resource request information of each client. A detailed explanation is given as follows. Upon receipt of a reservation request from a client, the resource manager 2010 judges whether the requested period coincides, even partially, with the period that has been requested by another client by referring to the resource management timetable of the DB 2020. If so, the resource manager 2010 compares the acquisition priority and use continuation priority between the two clients, and determines which client should use the resource in the requested period according to the predetermined criteria. After the determination, the resource manager 2010 sends a message to the corresponding client that the reservation cannot be accepted or that the reservation has been canceled.

Supplementary Explanation (1) In the present embodiment, the resource manager 2010 is an application program that runs under the multitask OS. However, the resource manager 2010 is not limited to this, and may be a system program serving as a part of the OS. Although a server executes the data transfer using one resource in the present embodiment, the server may use a plurality of resources. Also, a resource may be used by all of the provided servers. Suppose that the data transfer is executed by the plurality of servers using a resource, such as the PCI bus, by adjusting each data transfer bandwidth during the execution. In this case, a common rule is set beforehand regarding the transfer timing, so that the data transfer is controlled according to the common rule. For example, the data transfer may be executed in units of packets each including a predetermined amount of data, and the time sequence may be divided into a plurality of time slots in accordance with synchronous signals. With this, the server selects the corresponding number of time slots to use, so that the data transfer bandwidth can be adjusted.

When a server has a control function of executing the data transfer by means of plurality of channels, the clients may simultaneously use the server.

A client and server are not necessarily independent of each other, and may be combined in one. In this case, sending/receiving of messages between the client and the server may be omitted.

The server itself may refer to the valid period in the key information, and release the resource when the valid period has been expired. With this, when a client and server are independent of each other and they are treated as independent tasks under the control of the multitask OS, the server will release the resource after the expiration of the valid period if an error occurs to the client. Thus, a resource use request from another client is prevented from being refused and the other client can readily use the resource after the release of the resource by the server.

(2) In the present embodiment, the PCI bus 1040 that has a limit to the data transfer bandwidth is used as a main example of resources. For this reason, each of the maximum and minimum volumes in the resource request information is indicated by a value representing the data transfer bandwidth. However, when a resource has a limit simply in number, the maximum and minimum volumes may indicated by the number. Also, when a resource is a single unit, they may be indicated as "no need to specify." In the case of the resource that has a limit in number, the resource manager 2010 sends a number change request to the client instead of the bandwidth change request 4021 described in the present embodiment.

In the present embodiment, when a client issues a request to use a resource while another client is using the resource, the resource manager 2010 reduces the current volume by the client currently using the resource as necessary. However, there may be a case where the resource manager 2010 sends a message to the client using the resource to release the resource in accordance with the acquisition priority and the use continuation priority.

(3) In the present embodiment, the resource manager 2010 sends the key ID of the key information to the client as authorization to use the resource. However, the way of giving authorization to the client according to the present invention is not limited to this. For example, the client may be given authorization when the resource manager 2010 links the key information with the resource management information without sending the key ID to the client. In this case, the server may receive the client ID and then gain access to necessary key information specified by the client ID.

(4) In the present embodiment, the resource manager 2010 judges whether the valid period of the key information has been expired by referring to the resource management DB 2020 and, if it has been expired, sends the period expiration notification 4011 to the client. However, the client itself may comprehend the valid period when receiving the key ID as authorization to use the resource. For doing so, the client may receive information of the valid period together with the key ID from the resource manager 2010. When the valid period has been expired, the client may stop using the resource by controlling the server.

(5) In the present embodiment, a client issuing a resource use request specifies a valid period as a set of information included in the resource request information. The valid period may refer to a period that is valid only when the maximum volume specified together with the valid period is available. In this case, the resource manager 2010 may change the valid period of the key information, i.e., the time period for which the client is given authorization to use the resource, in accordance with the volume that allows the client to use.

Alternatively, the resource manager 2010 may receive information from the client about the total amount of data that the client is to transfer. The resource manager 2010 may set the authorized valid period for the client to use the resource in accordance with this information and the volume judged to be available for the client.

(6) In the present embodiment, a client issuing a resource use request specifies its acquisition priority and use continuation priority as sets of information included in the resource request information. However, the acquisition priority and use continuation priority may be set beforehand for each client. The resource manager 2010 may store these sets of information for each client and refers to them instead of the resource request information.

(7) Although the resource manager 2010 sends a key ID specifying key information generated in the resource management DB 2020 to the client in the present embodiment, the key information itself may be sent to the client. In this case, the client may sends the key information to the server, which then executes data transfer according to the key information.

(8) A description has been given in the present embodiment for a case where the system for managing the resources is connected to one PC. The present invention is not limited to such a system, and may be applied to a system that centralizes the management of resources distributed on a network using one resource manager.

Figure 19:
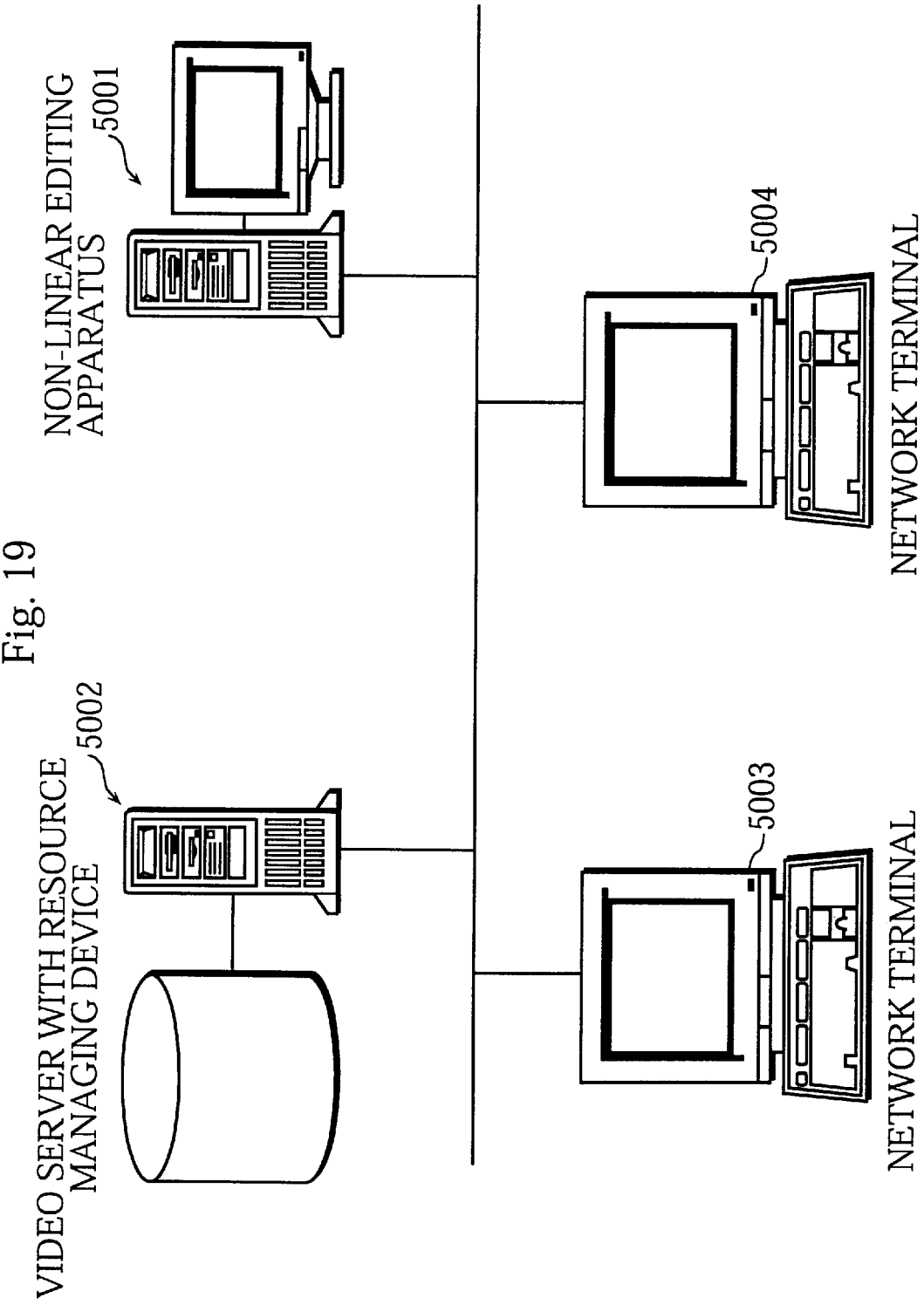
FIG. 19 shows an example of a system that centralizes the management of resources distributed on a network using one resource manager.

FIG. 19 shows an example of a system that centralizes the management of resources distributed on a network using one resource manager. As shown in FIG. 19, network terminals 5003 and 5004 using which the user performs an editing operation, a non-linear editing apparatus 5001, and a video server with resource managing device 5002 are connected to each other on the network. Note that the video server with resource managing device 5002 has a function of the resource manager 2010 described in the present embodiment.

A plurality of systems each having the same construction as the non-linear editing system 1000 described in the present embodiment may be connected on the network. With this network connection, a client belonging to a non-linear editing system may gain access to a resource belonging to another non-linear editing system. The procedures executed in this case is explained below.

A client sends a resource use request together with information about resource acquisition condition, acquisition period, and resource type to a resource manager of the nonlinear editing system to which the client belongs. When receiving this request and information, the resource manager first judges whether any of its own resources is available. If there is no resource available, the resource manager then sends the resource use request to each resource manager of all the other non-linear editing systems, requesting to use a resource. In response to the request, each resource manager judges whether its own resource corresponding to the requested resource type can be used. If judging so, the resource manager generates key information and sends a key ID notification indicating the location of the key information to the resource manager which sent the request to all the other resource managers. When receiving more than one key ID notification, the resource manager sends the first one to the client. In accordance with the received key ID notification, the client requests the server of the other non-linear editing system that has accepted the request for the execution of data transfer via the resource.

Following these procedures, the client can use a necessary resource that belongs to another system on the network.

(9) In the present embodiment, a client issuing a resource use request specifies its acquisition priority and use continuation priority as one of the four levels. However, the number of levels are not limited to four. Alternatively, information about the acquisition priority and use continuation priority may be omitted. In this case, when more than one client issues a resource use request for the same resource, the first client to send the request takes top priority over the other clients. The requests issued by the other clients may be refused or processed in order after the first client has finished using the resource.

(10) Although the messages are sent/received among a client, server, and resource manager, the transfer of messages is not particularly limited to be executed by means of the interprocess communication using addresses or handles. The messages may be sent/received in another way as long as information included in the messages can be reliably transferred.

(11) In the first modification of the present embodiment, when the data transfer bandwidth used a client having been using a resource is reduced since another client has requested for the resource, the bandwidth is restored (i.e., increased) after the other client has finished using the resource. However, the bandwidth used by the previous client may be restored before the other client finishes using the resource. To be more specific, the available bandwidth will be changed with the passage of time and, therefore, when the available bandwidth is judged to be increased, the bandwidth used by the previous client may be restored or increased exceeding the original bandwidth.

Second Embodiment

Figure 20:
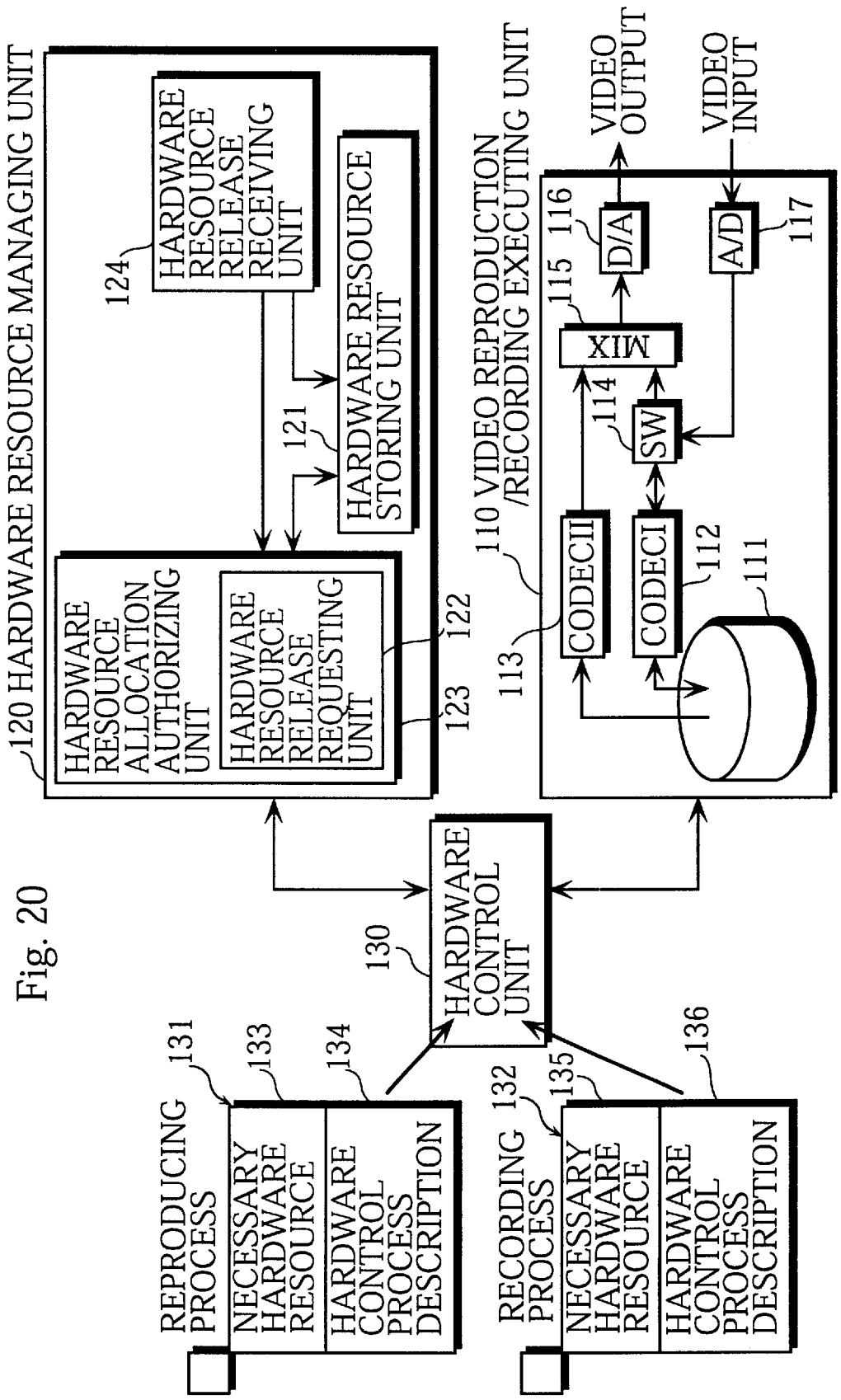
FIG. 20 shows a construction of a digital video reproducing/recording apparatus of a second embodiment of the present invention.

FIG. 20 shows a construction of a digital video reproducing/recording apparatus of a second embodiment of the present invention.

The digital video reproducing/recording apparatus is composed of a video reproduction/recording executing unit 110, a hardware resource managing unit 120, and a hardware controlling unit 130. The video reproduction/recording executing unit 110 is equipped with hardware resources.

The video reproduction/recording executing unit 110 includes a hard disk 111, a CODEC I 112, a CODEC II 113, a switch 114, a MIX circuit 115, a D/A converter 116, and an A/D converter 117.

The hard disk 111 holds video data that has been encoded in the digital format, and has two channels respectively for reading and writing data. The CODEC I 112 encodes or decodes video data, depending on a process to be executed. The CODEC II 113 decodes video data. The switch 114 switches the direction in which signals of video data are transferred. The MIX circuit 115 executes two-channel reproduction whereby a spatial composition is performed on the two sets of video data respectively decoded by the CODEC I 112 and the CODEC II 113, and also executes one-channel reproduction whereby only the video data decoded by the CODEC II 113 is reproduced. The MIX circuit 115 transfers the obtained video data to the D/A converter 116.

The D/A converter 116 converts the digital signals of the video data transferred from the MIX circuit 115 into analog signals, and outputs the analog signals to an external television monitor so that a user can watch the video data as reproduced video images. The A/D converter 117 converts the analog video data that is inputted by an external VTR or the like into digital video data, and then outputs the digital video data to the CODEC II 112 via the switch 114.

The hardware resource managing unit 120 is composed of a hardware resource storing unit 121, a hardware resource allocation authorizing unit 123 including a hardware resource release requesting unit 122, and a hardware resource release receiving unit 124.

The hardware resource storing unit 121 is made up of a RAM or the like, and stores each state of the hardware resources provided for the video reproduction/recording executing unit 110. Here, the hardware resources refer to the two channels of the hard disk 111, the CODEC I 112, and the CODEC II 113.

FIG. 21 shows an initial state of a hardware resource management table 201 stored in the hardware resource storing unit 121.

The hardware resource management table 201 shows a hardware type 202, a hardware resource 203, a flag 204, and a process name 205. The hardware type 202 indicates a device provided for the video reproduction/recording executing unit 110. The hardware resource 203 indicates a hardware resource to be used by the video reproduction/recording executing unit 110. To be more specific, as shown in the table 201, the hard disk 111 can process video data using its two channels, one CODEC as the CODEC I 112 is used both for recording and reproducing the video data, and another CODEC as the CODEC II 113 is used only for reproducing the video data.

The flag 204 indicates "allocated" when the hardware resource shown in the hardware resource 203 is currently being used and "unallocated" when it is not currently being used. The process name 205 indicates, when the hardware resource is currently being used, a process name depending on how the hardware resource is being used, that is, whether it is used in the recording or reproducing process. Note that the hardware resource management table 201 in FIG. 21 shows its initial state and, therefore, each column of the process name 205 is left blank.

The hardware resource allocation authorizing unit 123 stores the process name and the necessary hardware resources when receiving the notification of a process to be executed from the hardware controlling unit 130. The hardware resource allocation authorizing unit 123 then judges whether the hardware resources to be used in the process can be allocated, by referring to the hardware resource management table 201 stored in the hardware resource storing unit 121. As described later, there are maximum and minimum number of resources to be used in each process. More specifically, the maximum number of resources indicates a desirable number of resources used in the process while the minimum number of resources indicates the number of resources that are required for the process at the minimum. Thus, the hardware resource allocation authorizing unit 123 first judges whether the maximum number of resources can be allocated to the requested process and, if not, next judges whether the minimum number of resources can be allocated. If each flag 204 associated with the requested hardware resources is indicated as "unallocated" in the table 201, the hardware resource allocation authorizing unit 123 judges that the maximum or minimum number of resources can be allocated to the requested process.

When receiving the notification from the hardware resource release receiving unit 124 that a change has been made to the hardware resource management table 201, the hardware resource allocation authorizing unit 123 judges once again whether the hardware resources currently requested for the execution of the process can be still allocated.

If judging that the requested hardware resources can be allocated, the hardware resource allocation authorizing unit 123 sets each flag 204 associated with these hardware resources as "allocated" as well as writing the name of process into the process name 205. Following this, the authorizing unit 123 sends an authorization notification to the hardware controlling unit 130. Here, the hardware controlling unit 130 is also notified of whether the authorizing unit 123 has authorized the maximum or minimum number of resources to be allocated to the process.

Meanwhile, if judging that the requested hardware resources cannot be allocated, the authorizing unit 123 first keeps the allocation of the minimum number of resources to the process that is currently being executed and then judges whether the remaining hardware resources (i.e., the resources remaining after subtracting the minimum number from the maximum number of resources allocated to the currently-executed process) can serve the requested process.

If judging that the remaining hardware resources cannot serve the requested process, the authorizing unit 123 notifies the hardware controlling unit 130 that the hardware resources cannot be allocated to the requested process.

If the remaining hardware resources are judged to serve the requested process, the hardware resource release requesting unit 122 notifies the hardware controlling unit 130 of the name of the process that is currently being executed and of the hardware resources that need to be released.

The hardware resource release receiving unit 124 receives the notification that some of the hardware resources used in the currently-executed process have been released or the notification that this process has ended. Upon receipt of the notification, the hardware resource release receiving unit 124 sets each flag 204 associated with the released hardware resources as "unallocated" in the hardware resource management table 201 stored in the hardware resource storing unit 121. Also, the receiving unit 124 deletes the process name 205 corresponding to the flag 204 indicated as "unallocated." After this, the receiving unit 124 sends the hardware resource allocation authorizing unit 123 a notification that the hardware resource management table 201 has been updated.

Upon receiving a request from the user for the execution of a process, the hardware controlling unit 130 sends a notification of the requested process to the hardware resource allocation authorizing unit 123 of the hardware resource managing unit 120. A process referred to here is a reproducing process 131 or a recording process 132.

The reproducing process 131 includes a necessary hardware resource 133 and a hardware control process description 134. The recording process 132 includes a necessary hardware resource 135 and a hardware control process description 136.

FIG. 22A shows a list example of the necessary hardware resource 133 of the reproducing process 131. A list 301 of FIG. 22A shows a maximum number of resources 302 and a minimum number of resources 303 that are required as the necessary hardware resource 133. The maximum number of resources 302 indicates the number of resources that are used at the maximum in the reproducing process 131. In other words, in a case where the reproducing process 131 uses the maximum number of resources, all the resources provided for the video reproduction/recording executing unit 110 and shown in a hardware type 304 are used. Meanwhile, the minimum number of resources 303 indicates the number of resources that are required at the minimum for the reproducing process 131.

As shown in the list 301, when two-channel reproduction is executed in the reproducing process 131, the two channels of the hard disk 111, the CODEC I 112, and the CODEC II 113 are used. Meanwhile, when one-channel reproduction is executed, one channel of the hard disk 111 and the CODEC II 113 are used.

FIG. 22B shows a list example of the hardware control process description 134 of the reproducing process 131. A list 305 of FIG. 22B describes how the hardware controlling unit 130 controls the units 111 to 117 of the video reproduction/recording executing unit 110 so that the reproducing process 131 is normally executed. The list 305 includes descriptions 306 and 307 respectively corresponding to the maximum number of resources 302 and the minimum number of resources 303. Each of the descriptions 306 and 307 describes how to control the units 111 to 117 of the video reproduction/recording executing unit 110.

A detailed explanation is given for a case where the hardware resources are used at the maximum, by referring to the description 306. The two channels of the hard disk 111 are set for the reproducing process 131, and video data is read from the hard disk 111. Each of the CODEC I 112 and the CODEC II 113 is set as a decoder and so decodes the video data outputted from the corresponding channel. The switch 114 is set so as to establish a connection between the CODEC I 112 and the MIX circuit 115. The MIX circuit 115 is set so as to pass the two sets of video data that are respectively outputted from the CODEC I 112 and the CODEC II 113. The D/A converter 116 is set so as to convert the digital video data outputted from the MIX circuit 115 into analog video data. The A/D converter 117 is not required in the present recording process 131 and so indicated as "Don't Care."

Next, a detailed explanation is given for a case where the hardware resources are used at the minimum, by referring to the description 307. One channel of the hard disk 111 is set for the reproducing process 131, and video data is read from the hard disk 111. The CODEC I 112 is not required in the current process and so indicated as "Don't Care." The CODEC II 113 is set as a decoder and so decodes the read video data. The switch 114 and the A/D converter 117 are not required in the present reproducing process 131. The MIX circuit 115 is set so as to pass only the video data outputted from the CODEC II 113. The D/A converter 116 is set so as to convert the digital video data outputted from the MIX circuit 115 into analog video data.

When one-channel reproduction is executed as another reproducing process, the same number as the minimum number of resources 303 in the case of two-channel reproduction is indicated as the maximum number of resources 302 in the list 301 for one-channel reproduction. Therefore, the same descriptions as the description 307 in the case of two-channel reproduction are shown in the description 306 in the list 305 for one-channel reproduction.

FIG. 23A shows a list example of the necessary hardware resource 135 of the recording process 132. A list 401 of FIG. 23A shows a maximum number of resources 402 and a minimum number of resources 403 that are required as the necessary hardware resource 135. The numbers indicated as the maximum and minimum numbers of resources 402 and 403 are the same for each hardware resource. For the recording process 132, one channel of the hard disk 111 and the CODEC I 112 of the video reproduction/recording executing unit 110 are absolutely necessary. This is to say, the recording process 132 cannot be executed without any of these hardware resources. However, the recording process 132 does not require any more channel of the hard disk 111.

FIG. 23B shows a list example of the hardware control process description 136 of the recording process 132. A list 405 of FIG. 23B describes how the hardware controlling unit 130 controls the units 111 to 117 of the video reproduction/recording executing unit 110 during the execution of the recording process 132. The list 405 includes descriptions respectively corresponding to the maximum number of resources 402 and the minimum number of resources 403. As stated above, since the maximum and minimum numbers of the resources 402 and 403 are the same, the descriptions are also the same for each case.

A detailed explanation is given for the case of the recording process 132, with reference to the descriptions. The A/D converter 117 is set operational so as to receive video data from an external device and converts the analog signals into digital signals. The switch 114 is set so as to establish a connection between the CODEC I 112 and the A/D converter 117, so that the video data from the A/D converter 117 is inputted into the CODEC I 112. The CODEC I 112 is set as an encoder and so encodes the video data outputted from the A/D converter 117. One channel of the hard disk 111 is set for the recording process 132 and the video data outputted from the CODEC I 112 is written into the hard disk 111.

Upon receipt of an authorization notification from the hardware resource allocation authorizing unit 123 that the requested hardware resources can be allocated, the hardware controlling unit 130 controls the units 111 to 117 of the video reproduction/recording executing unit 110 according to the hardware control process description 134 or 136 in order to execute the reproducing process 131 or the recording process 132 that is requested by the user. The number of hardware resources (the maximum or minimum number) to be used is notified in the authorization notification from the hardware resource allocation authorizing unit 123.

On completion of the reproducing process 131 or the recording process 132 by the video reproduction/recording executing unit 110, the hardware controlling unit 130 notifies the hardware resource release receiving unit 124 of the name of the process that has completed.

When receiving the notification that the currently-executed process should be suspended and some of the resources having been allocated to this process should be released, the hardware controlling unit 130 suspends the execution of the process and also stops the use of the notified hardware resources. Then, the hardware controlling unit 130 resumes the suspended process by controlling the remaining hardware resources.

Meanwhile, when receiving the notification from the hardware resource allocation authorizing unit 123 that the requested hardware resources cannot be allocated, the hardware controlling unit 130 has a display unit (not illustrated) display a message to notify the user that the requested process cannot be executed.

Next, a detailed operation to be performed by the hardware resource managing unit 120 for allocating the hardware resources is explained with reference to the contents stored in the hardware resource storing unit 121.

Suppose that the hardware resource management table 201 as shown in FIG. 21 is stored now in the hardware resource storing unit 121, and that the hardware resource allocation authorizing unit 123 receives a request from the hardware controlling unit 130 for the execution of the reproducing process 131 based on the list 301 (see FIG. 22A). In this case, the maximum number of resources can be allocated as the necessary hardware resources 302 to the reproducing process 131. Thus, the table 201 is updated to a hardware resource management table 501 as shown in FIG. 24, and the hardware controlling unit 130 receives an authorization notification from the authorizing unit 123.

With this state, suppose that the hardware resource allocation authorizing unit 123 receives a request from the hardware controlling unit 130 for the execution of the recording process 132 based on the list 401 (see FIG. 23A). In this case, since each flag of the channels, the CODEC I 112, and the CODEC II 113 is indicated as "allocated," the authorizing unit 123 judges that the hardware resources cannot be allocated to the recording process 132. Then, the authorizing unit 123 refers to the minimum number of resources as the necessary hardware resources used for the reproducing process 131 and judges that the hardware resources can be allocated to the recording process 132 by changing the current number of resources used in the reproducing process 131 to the minimum number. The hardware resource release requesting unit 122 requests the hardware controlling unit 130 to stop using one channel of the hard disk 111 and the CODEC I 112 that are currently being used in the reproducing process 131. In response to this request, the hardware controlling unit 130 stops the use of them and notifies the hardware resource release receiving unit 124 so. Thus, the table 501 is updated to a hardware resource management table 601 as shown in FIG. 25.

With the contents of the hardware resource management table 601, the recording process 132 can be authorized to be executed. Therefore, the hardware resource allocation authorizing unit 123 updates the table 601 to a hardware resource management table 701, and also notifies the hardware controlling unit 130 that the reproducing process 132 can be resumed.

Figure 27:
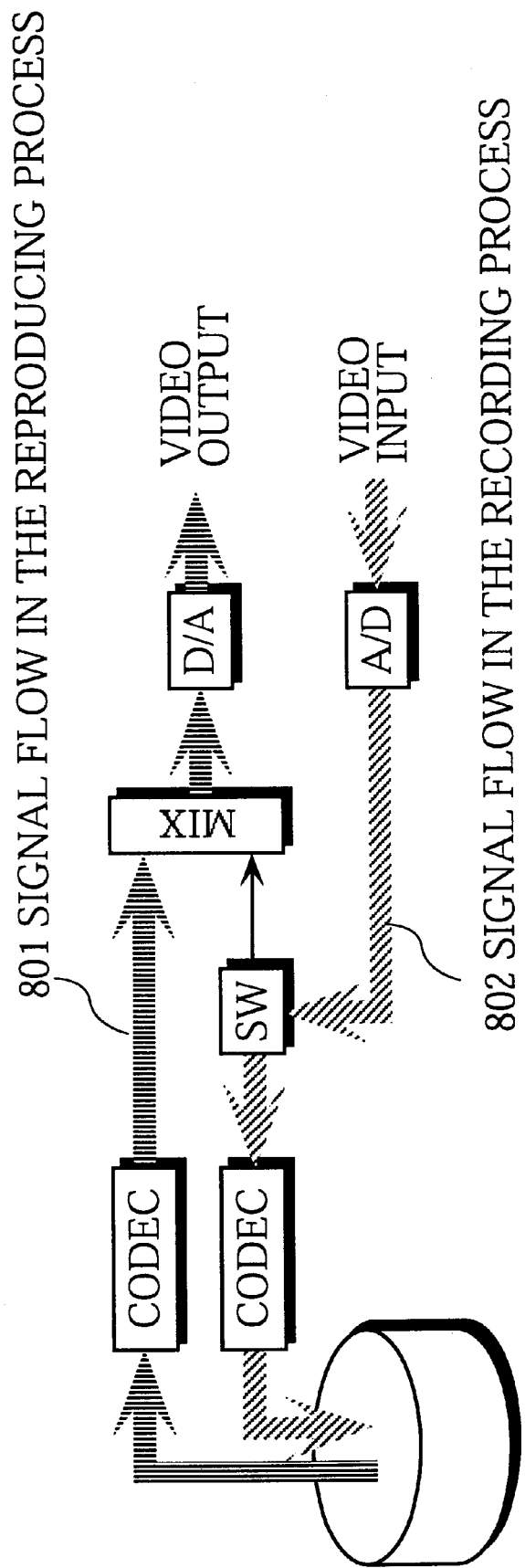
FIG. 27 shows signal flows of the video data among the hardware resources provided for a video reproduction/recording executing unit.

With the operational state of the video reproduction/recording executing unit 110 according to the contents of the table 701, the video signals flow via two separate routes as a signal flow 801 for the reproducing process 131 and a signal flow 802 for the recording process 132, as shown in FIG. 27.

Accordingly, the hardware resource managing unit 120 supervises the state of use of each hardware resource of the video reproduction/recording executing unit 110. As a result, each hardware resource can be effectively used.

The operations performed in the present embodiment are explained with reference to flowcharts shown in FIG. 28, FIG. 29, and FIG. 30.

Figure 28:
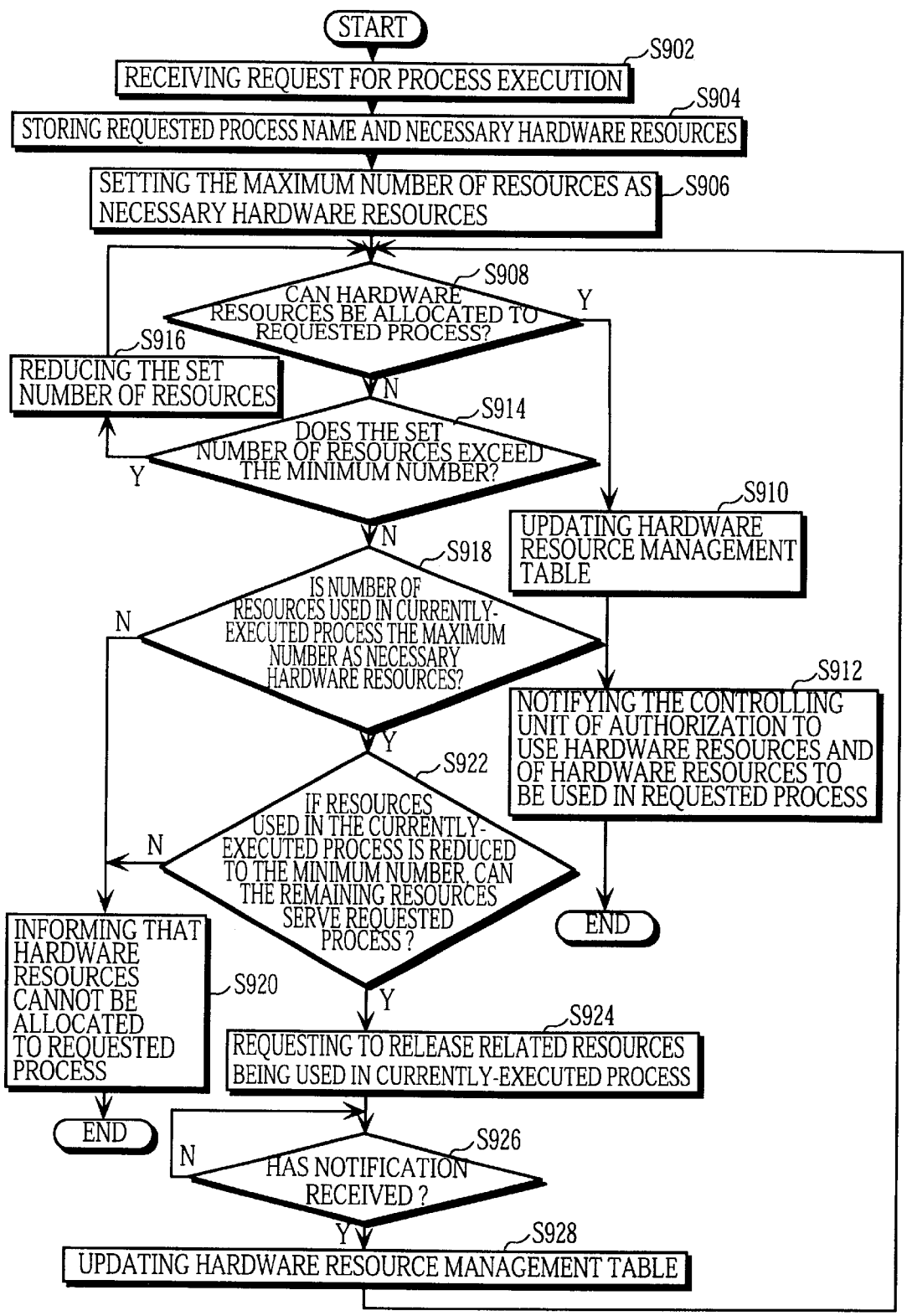
FIG. 28 is a flowchart of an operation performed by a hardware resource managing unit.
Figure 29:
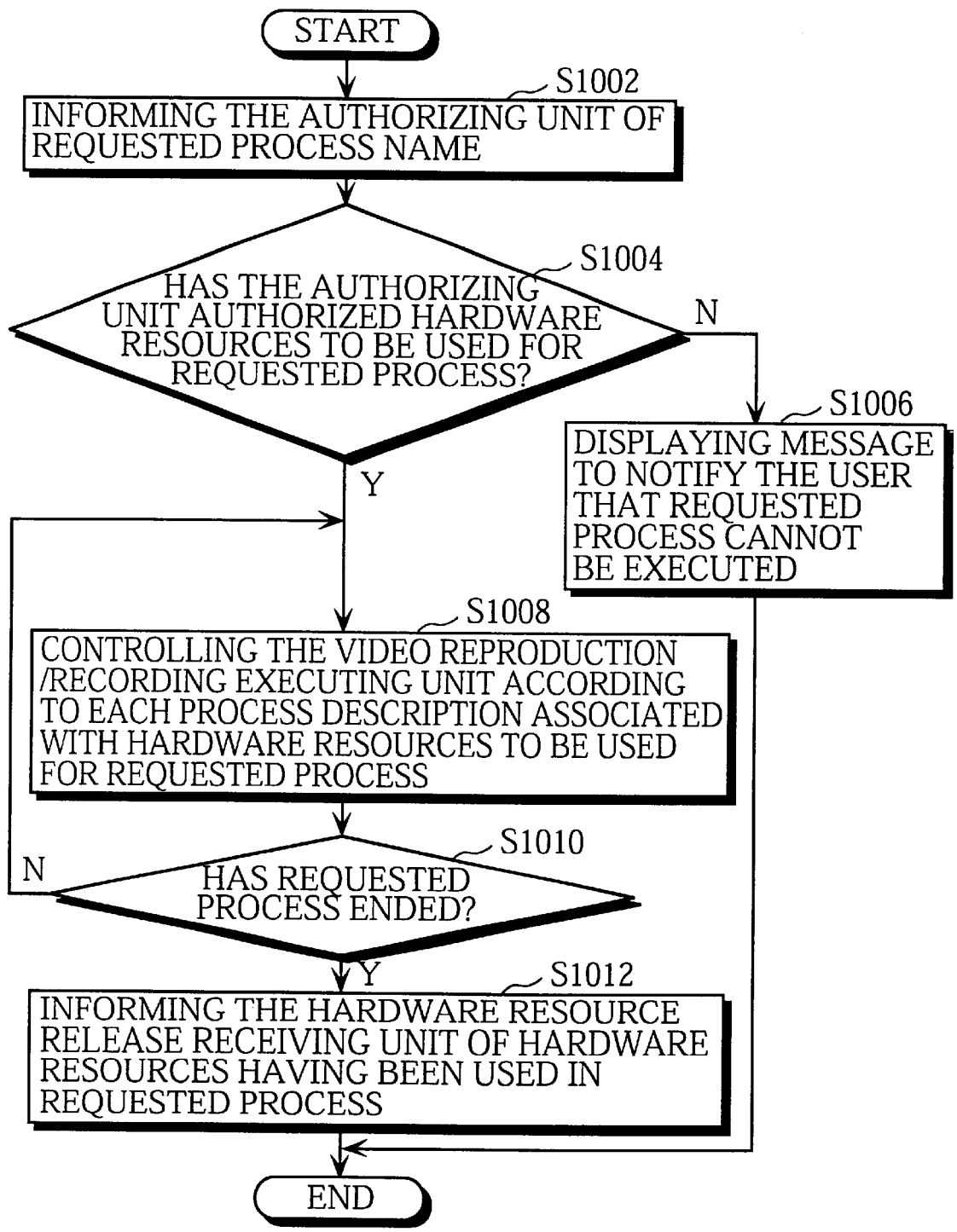
FIG. 29 is a flowchart of an operation performed by a hardware controlling unit for the execution of a process.

FIG. 28 is a flowchart of an operation performed by the hardware resource managing unit 120.

First, the hardware resource allocation authorizing unit 123 receives a request from the hardware controlling unit 130 for the execution of the reproducing process 131 or the recording process 132 together with the corresponding necessary hardware resources 133 or 135 (step S902). The authorizing unit 123 stores the name of the requested process and the necessary hardware resources (step S904). Then, the authorizing unit 123 sets the maximum number of resources as the necessary hardware resources to be used in the requested process (step S906).

The authorizing unit 123 judges whether the maximum number of hardware resources can be allocated to the requested process, by referring to the hardware resource management table stored in the hardware resource storing unit 121 (step S908). If so ("Y" in step S908), each flag of the hardware resources to be used is set as "allocated" and the name of the requested process is written for each hardware resource in the hardware resource management table (step S910). The authorizing unit 123 notifies the hardware controlling unit 130 of authorization to use the hardware resources for the requested process and of the hardware resources to be used in the requested process (step S912). Here, the operation by the hardware resource managing unit 120 is terminated.

Meanwhile, if judging that the necessary hardware resources cannot be allocated to the requested process ("N" in step S908), the authorizing unit 123 next judges whether the number of the hardware resources having been set for the execution of the requested process exceeds the minimum number of resources (step S914). If judging so ("Y" in step S914), the authorizing unit 123 reduces the number of hardware resources to be used in the process (step S916), and then returns to step S908.

When judging that the number of hardware resources having been set is the minimum number in step S914, the authorizing unit 123 next judges whether the number of resources used in the process that is currently being executed is the maximum number as the necessary hardware resources (step S918). If not ("N" in step S918), the authorizing unit 123 informs the hardware controlling unit 130 that the hardware resources cannot be allocated to the requested process. On the other hand, if judging the number of resources used in the currently-executed process is the maximum number ("Y" in step S918), the authorizing unit 132 next judges whether, if the number of resources used in the currently-executed process is reduced to the minimum number, the remaining hardware resources can serve the requested process (step S922).

If not ("N" in step S922), the authorizing unit 132 proceeds to step S920 where it informs the hardware controlling unit 130 that the hardware resources cannot be allocated to the requested process. Here, the operation is terminated. Meanwhile, if the remaining hardware resources are judged to serve the requested process ("Y" in step S922), the hardware resource release requesting unit 122 requests the hardware controlling unit 130 to release the related hardware resources that are being used in the currently-executed process (step S924).

Upon receipt of the notification from the hardware controlling unit 130 that the related hardware resources have been released ("Y" in step S926), the hardware resource release receiving unit 124 updates the hardware resource management table stored in the hardware resource storing unit 121 (step S928). Then, the operation returns to step S908.

Next, an operation performed by the hardware controlling unit 130 is explained with reference to the flowchart of FIG. 29.

Upon receiving a request for the execution of a process from the user, the hardware controlling unit 130 informs the hardware resource allocation authorizing unit 123 of the name of the requested process (step S1002). The hardware controlling unit 130 then judges whether the authorizing unit 123 has authorized the hardware resources to be used for the requested process (step S1004). If receiving a notification that the hardware resources cannot be used ("N" in step S1004), the hardware controlling unit 130 has the display unit (not illustrated) display a message to notify the user that the requested process cannot be executed (step S1006). Here, the present operation is terminated.

If judging that the hardware resources have been authorized by the authorizing unit 123 ("Y" in step S1004), the hardware controlling unit 130 controls the video reproduction/recording executing unit 110 according to each hardware control process description associated with the hardware resources to be used in the requested process (step S1008). The hardware controlling unit 130 controls the executing unit 110 until the end of the present process (step S1010). On completion of the present process, the hardware controlling unit 130 informs the hardware resource release receiving unit 124 of the hardware resources that have been used in that process (step S1012), and terminates the present operation.

Figure 30:
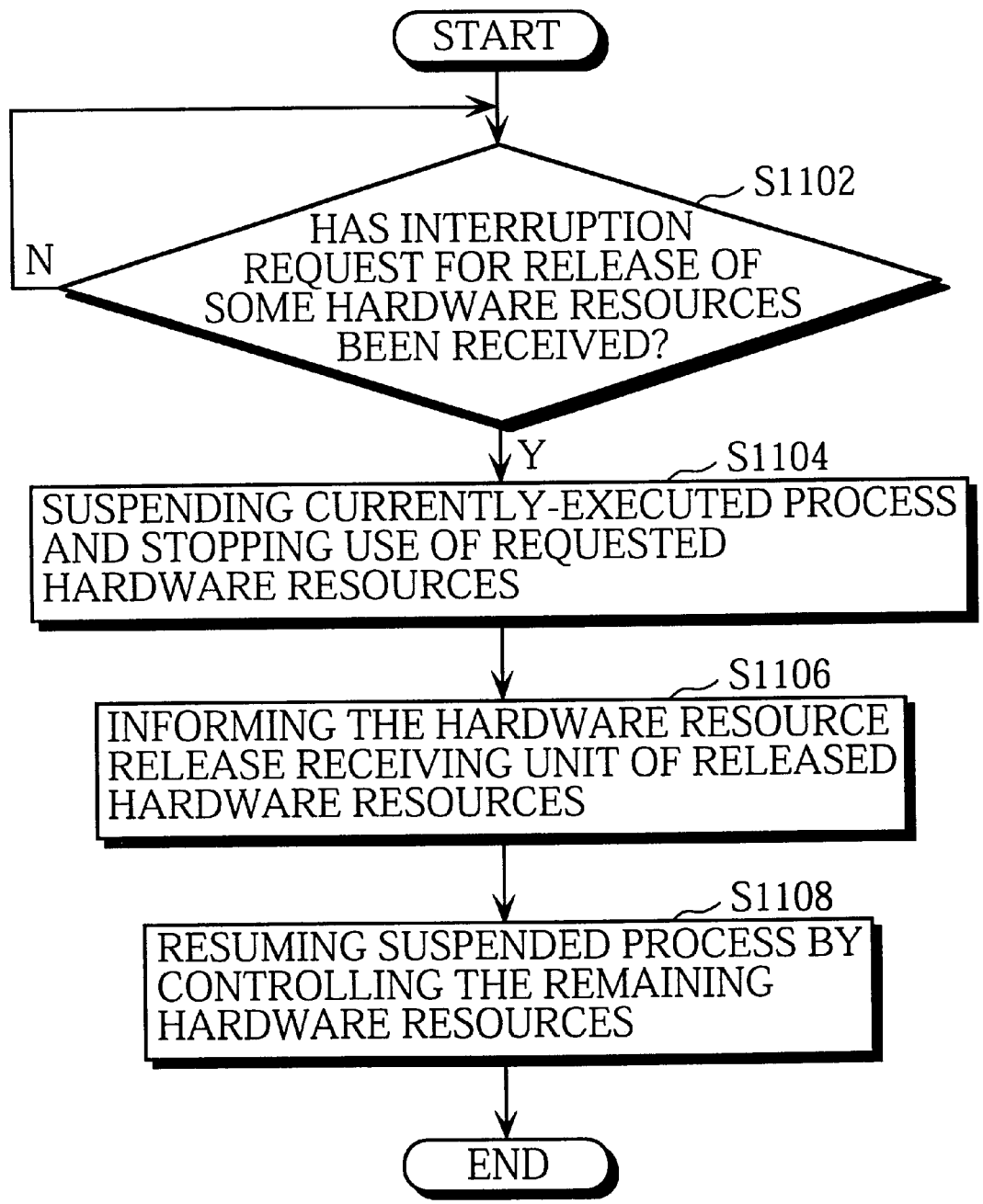
FIG. 30 is a flowchart of an operation performed by the hardware controlling unit when receiving an interruption request from a hardware resource managing unit.

An explanation is next given to an operation performed by the hardware controlling unit 130 when receiving an interruption request to release the hardware resources, with reference to the flowchart of FIG. 30.

Upon receipt of an interruption request from the hardware resource release requesting unit 122 to release the hardware resources ("Y" in step S1102), the hardware controlling unit 130 suspends the currently-executed process and stops using the requested hardware resources (step S1104). Following this, the hardware controlling unit 130 informs the hardware resource release receiving unit 124 of the released hardware resources (step S1106). Then, the hardware controlling unit 130 resumes the suspended process by controlling the remaining hardware resources allocated to the suspended process (step S1108). Accordingly, the operation performed for the interruption request is terminated.

It should be noted here that the video data may be inputted/outputted among the hard disk 111, the CODEC I 112, and the CODEC II 113 via a network, such as a LAN.

Third Embodiment

Figure 31:
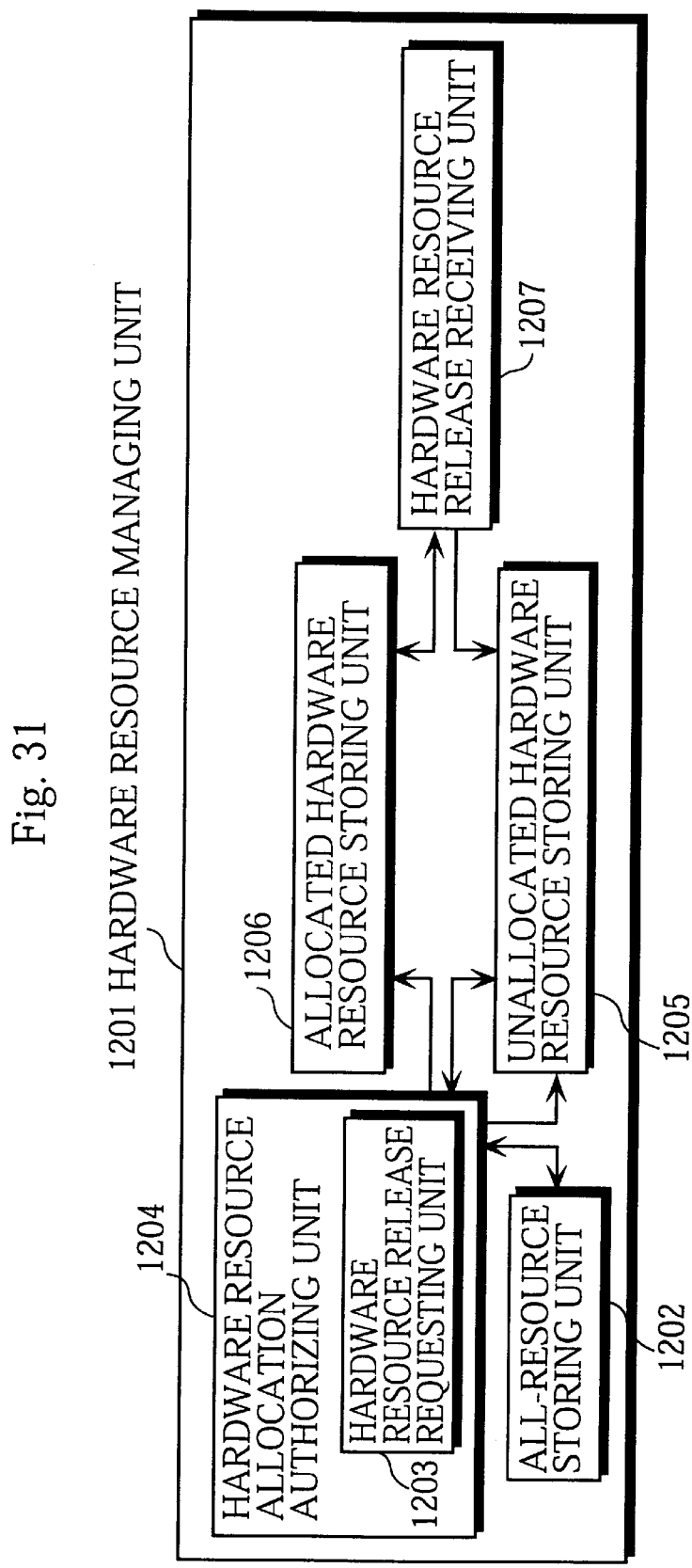
FIG. 31 shows a construction of a hardware resource managing unit of a digital video reproducing/recording apparatus of a third embodiment of the present invention.

FIG. 31 shows a construction of a hardware resource managing unit of a digital video reproducing/recording apparatus of a third embodiment of the present invention.

A hardware resource managing unit 1201 includes storing units that respectively store the contents of the hardware resource management table that is stored in the hardware resource storing unit 121 provided in the hardware resource managing unit 120 of the second embodiment. It should be noted here that a video reproduction/recording executing unit 110 and a hardware controlling unit 130 of the third embodiment are the same as those described in the second embodiment. Therefore, explanations for these units are omitted in the present embodiment.

As shown in FIG. 31, the hardware resource managing unit 1201 is composed of an all-resource storing unit 1202, a hardware resource allocation authorizing unit 1204 that includes a hardware resource release requesting unit 1203, an unallocated hardware resource storing unit 1205, an allocated hardware resource storing unit 1206, and a hardware resource release receiving unit 1207.

The all-resource storing unit 1202 is made up of a ROM or the like, and stores the hardware resources that are provided for the video reproduction/recording executing unit 110 and used in the processes.

FIG. 32 shows contents stored in the all-resource storing unit 1202. A hardware type 1301 indicates a name of a hardware resource while a hardware resource 1302 indicates the number of the hardware resources.

When the digital video reproducing/recording apparatus is activated, the hardware resource allocation authorizing unit 1204 has the unallocated hardware resource storing unit 1205 store the contents stored in the all-resource storing unit 1202.

The hardware resource storing unit 1205 is made up of a RAM or the like, and stores hardware resources that are currently unallocated. Immediately after its own activation, the unallocated hardware resource storing unit 1205 stores the same contents as shown in FIG. 32.

Upon receipt of a notification from the hardware controlling unit 130 of a requested process name and necessary hardware resources, the hardware resource allocation authorizing unit 1204 stores them. Following this, the authorizing unit 1204 judges whether the hardware resources counted in the maximum or minimum number of resources to be used as the necessary hardware resources are stored in the unallocated hardware resource storing unit 1205. If they are, the authorizing unit 1204 deletes the related hardware resources from the unallocated hardware resource storing unit 1205. The authorizing unit 1204 then writes the related hardware resources into the allocated hardware resource storing unit 1206 as well as having the storing unit 1206 store the requested process name. After this, the authorizing unit 1204 informs the hardware controlling unit 130 that the related hardware resources have been authorized to be used in the requested process.

Meanwhile, suppose that the hardware resources counted in the minimum number of resources used as the necessary hardware resources are not stored in the unallocated hardware resource storing unit 1205. In this case, the authorizing unit 1204 judges whether, if the number of hardware resources that are being used for the currently-executed process and stored in the allocated hardware resource storing unit 1206 is reduced, the minimum number of hardware resources required for the requested process can be allocated.

If it is judged that the minimum number of hardware resources cannot be allocated to the requested process, the authorizing unit 1204 notifies the hardware controlling unit 130 that the requested process cannot be executed.

If the minimum number of hardware resources is judged to be allocated, on the other hand, the hardware resource release requesting unit 1203 informs the hardware controlling unit 130 of the hardware resources required for the requested process and also requests the controlling unit 130 to release these hardware resources that are currently being used.

The allocated hardware resource storing unit 1206 is made up of a RAM or the like, and stores a name of the currently-executed process and the hardware resources that are currently being used in that process under the control of the hardware controlling unit 130.

As one example, suppose that one-channel reproduction as a reproducing process is currently being executed by the video reproduction/recording executing unit 110. In this case, the allocated hardware resource storing unit 1206 stores the contents shown in FIG. 33A. Here, the contents stored in the unallocated hardware resource storing unit 1205 has been updated from the contents shown in FIG. 32 to the contents shown in FIG. 33B.

Upon receiving a notification from the hardware controlling unit 130 of a requested process name (in this case, the recording process) and the necessary hardware resources, the authorizing unit 1204 refers to the contents (shown in FIG. 33B) stored in the unallocated hardware resource storing unit 1205 and informs the hardware controlling unit 130 that the recording process can be executed using the hardware resources. Thus, the contents stored in the allocated hardware resource storing unit 1206 are updated to contents shown in FIG. 34A. The contents stored in the unallocated hardware resource storing unit 1205 are updated and blanked as shown in FIG. 34B.

The hardware resource release receiving unit 1207 receives a notification from the hardware controlling unit 130 of the hardware resources that have been released and the name of the suspended process, or a notification of the name of the process that has just ended and the hardware resources that have been accordingly released. On receipt of this notification, the hardware resource release receiving unit 1207 deletes the related hardware resources and the process name from the contents stored in the allocated hardware resource storing unit 1206. The receiving unit 1207 then writes these hardware resources into the unallocated hardware resource storing unit 1205.

When both the reproducing process (one-channel reproduction) and the recording process have been finished by the video reproduction/recording executing unit 110, the contents stored in the allocated hardware resource storing unit 126 are blanked. Simultaneously, the contents stored in the unallocated hardware resource storing unit 1205 returns to the initial state shown in FIG. 32.

In the second embodiment, the hardware resource allocation authorizing unit 123 judges whether a hardware resource is allocated or unallocated by referring to the flag in the hardware resource management table stored in the hardware resource storing unit 121. In the present embodiment, meanwhile, the authorizing unit 1204 can make this judgement by referring to the contents stored in the unallocated hardware resource storing unit 1205. Without using the flags, the hardware resource allocation authorizing unit 1204 and the hardware resource release receiving unit 1207 respectively update the contents stored in the unallocated hardware resource storing unit 1205 and the allocated hardware resource storing unit 1206.

Operations of the present embodiment are basically the same as those of the second embodiment and, therefore, the detailed explanation of the operations are omitted in the present embodiment.

Fourth Embodiment

Figure 35:
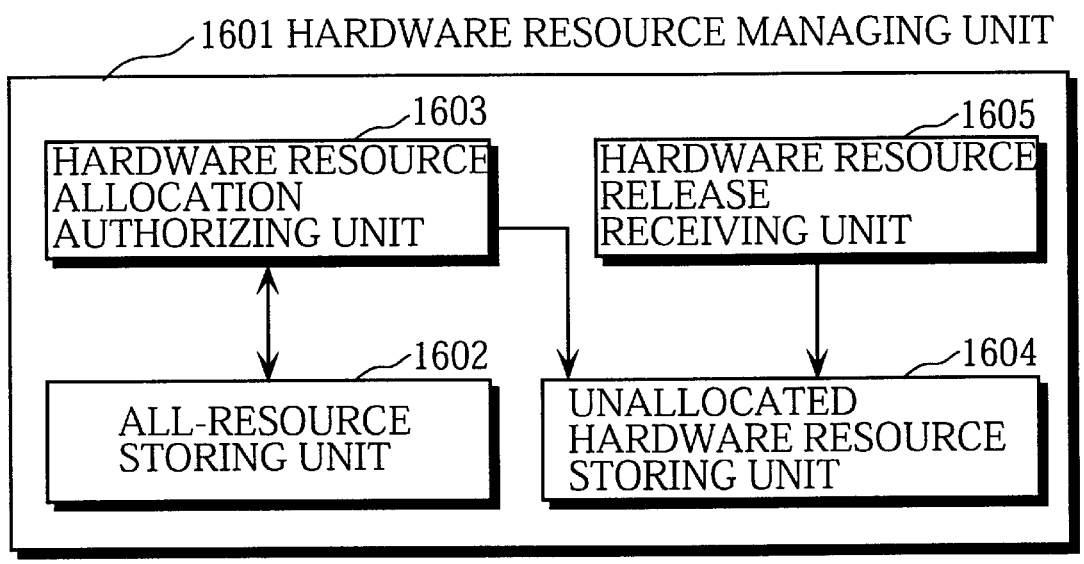
FIG. 35 shows a construction of a hardware resource managing unit of a digital video reproducing/recording apparatus of a fourth embodiment of the present invention.

FIG. 35 shows a construction of a hardware resource managing unit of a digital video reproducing/recording apparatus of a fourth embodiment of the present invention.

As shown in FIG. 35, a hardware resource managing unit 1601 is composed of an all-resource storing unit 1602, a hardware resource allocation authorizing unit 1603, an unallocated hardware resource storing unit 1604, and a hardware resource release receiving unit 1605. As is the case with the third embodiment, a video reproduction/recording executing unit 110 and a hardware controlling unit 130 of the fourth embodiment are almost the same as those described in the second embodiment. Therefore, explanations for these units are omitted in the present embodiment. The all-resource storing unit 1602 is the same as the all-resource storing unit 1202 of the third embodiment.

When the digital video reproducing/recording apparatus is activated, the hardware resource allocation authorizing unit 1603 has the unallocated hardware resource storing unit 1604 store the contents stored in the all-resource storing unit 1602.

Upon receipt of a notification from the hardware controlling unit 130 of a requested process and necessary hardware resources, the authorizing unit 1603 judges whether these hardware resources can be allocated to the requested process. If judging so, meaning that these hardware resources are stored in the unallocated hardware resource storing unit 1604, the authorizing unit 1603 deletes the hardware resources from the contents stored in the unallocated hardware resource storing unit 1604. Thus, the authorizing unit 1603 informs the hardware controlling unit 130 that the requested process can be executed using the necessary hardware resources. On the other hand, if the notified necessary hardware resources are not stored in the unallocated hardware resource storing unit 1604, the authorizing unit 1603 informs the hardware controlling unit 130 that the requested process cannot be executed.

The unallocated hardware resource storing unit 1604 is made up of a RAM or the like, and stores the hardware resources that are not currently being used.

Upon receiving a notification from the hardware controlling unit 130 of the name of the process that has been finished and the hardware resources that have been accordingly released, the hardware resource release receiving unit 1605 writes the notified hardware resources into the unallocated hardware resource storing unit 1604.

Immediately after the digital video reproducing/recording apparatus has been activated, the unallocated hardware resource storing unit 1604 stores the same contents as shown in FIG. 32. With this initial state, suppose that the hardware resource allocation authorizing unit 1603 receives a request from the hardware controlling unit 130 for one channel of the hard disk 111 and the CODEC II 113 (reproduce-only device) to execute one-channel reproduction as a reproducing process. In this case, the authorizing unit 1603 deletes these hardware resources from the contents of the unallocated hardware resource storing unit 1604 and so updates the contents as shown in FIG. 33A. Also, the authorizing unit 1603 informs the hardware controlling unit 130 that one-channel reproduction can be executed using the necessary hardware resources.

With this state, next suppose that the authorizing unit 1603 receives a request from the hardware controlling unit 130 for one channel of the hard disk 111 and the CODEC I 112 (record-only device) so as to execute the recording process. In this case, since these hardware resources are stored in the unallocated hardware resource storing unit 1604, the authorizing unit 1603 deletes these resources from the contents and informs the controlling unit 130 that the recording process can be executed using the necessary hardware resources. Thus, the contents of the unallocated hardware resource storing unit 1604 are blanked as shown in FIG. 34B. After receiving the notification from the hardware controlling unit 130 that the processes have been finished by the video reproduction/recording executing unit 110 and the related hardware resources have been released, the authorizing unit 1603 writes these notified hardware resources into the unallocated hardware resource storing unit 1604. Thus, the contents return to the initial state as shown in FIG. 32.

Figure 36:
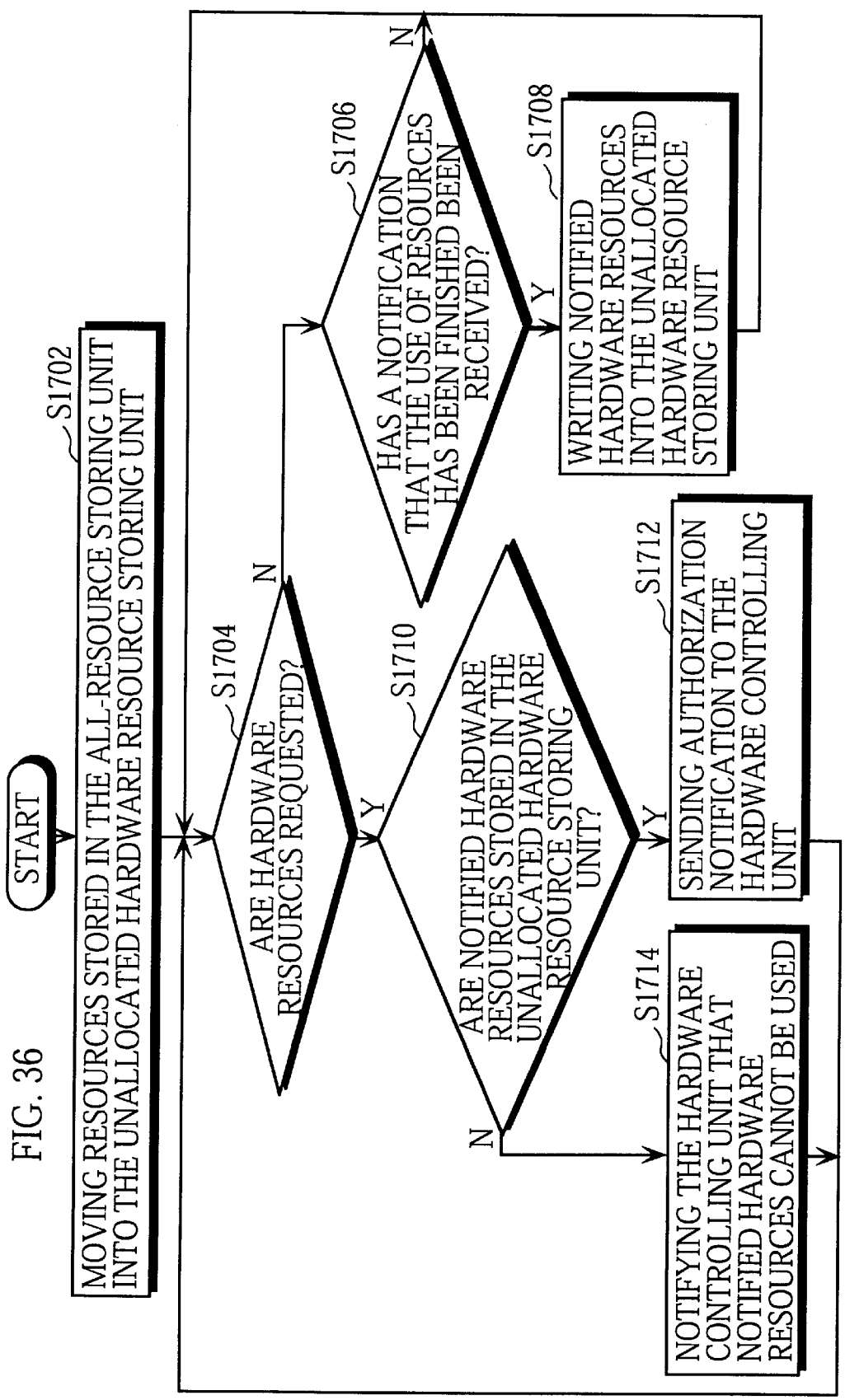
FIG. 36 is a flowchart of an operation performed by a hardware resource managing unit.

Next, an operation performed by the hardware resource managing unit 1601 is explained with reference to the flowchart shown in FIG. 36.

Upon activation of the digital video reproducing/recording apparatus, the hardware resource allocation authorizing unit 1603 writes the hardware resources, that are provided for the video reproduction/recording executing unit 110 and stored in the contents of the all-resource storing unit 1602, into the unallocated hardware resource storing unit 1604 (step S1702).

The authorizing unit 1603 judges whether hardware resources are requested by the hardware controlling unit 130 (step S1704). If not ("IN" in step S1704), the authorizing unit 1603 next judges whether the hardware resource release receiving unit 1605 has received a notification from the hardware controlling unit 130 that the use of the hardware resources has been finished (step S1706). If not ("N" in step S1706), the authorizing unit 1603 returns to step S1704. Meanwhile, if receiving the notification ("Y" in step S1706), the hardware resource release receiving unit 1605 writes the notified hardware resources into the unallocated hardware resource storing unit 1604 (step S1708), and returns to step S1704.

If judging that the hardware resources to be used have been notified in step S1704, the authorizing unit 1603 next judges whether the notified hardware resources are stored in the unallocated hardware resource storing unit 1604 (step S1710). If they are ("Y" in step S1710), the authorizing unit 1603 sends an authorization notification to the hardware controlling unit 130, i.e., notifies that the notified hardware resources can be used (step S1712) and returns to step S1704. If they are not stored in the unallocated hardware resource storing unit 1604 ("N" in step S1710), the authorizing unit 1603 notifies the hardware controlling unit 130 that the notified hardware resources cannot be used (step S1714) and returns to step S1704.

In the second, third, and fourth embodiments, two channels are used to access the hardware resources of the video reproduction/recording executing unit 110 and thus two CODECs are used in correspondence with the two channels. However, the number of channels or the number of CODECs are not limited to two, and three or more channels and the same number of CODECs may be provided. The hardware resource managing unit may manage the state of use (whether it is used or not) for each channel and each CODEC. With this management, not only can the reproducing process and the recording process be executed in parallel as described in the preceding embodiments, but also that two different reproducing processes can be executed in parallel. Moreover, the real-time format conversion process and the reproducing or recording process can be executed in parallel. In this parallel operation, an encoded format is converted into another encoded format in real time using two CODECs in the real-time format conversion process, while the reproducing or recording process is executed using the remaining CODEC. As another possibility, a rendering process and a reproducing process can be executed in parallel. In the rendering process, video data that has been mixed by a plurality of CODECs and the MIX circuit is re-recorded in real time using another CODEC. Alternatively, two processes out of the rendering, reproducing, and recording processes can be executed in parallel with efficiency.

The construction of the digital video reproducing/recording apparatus is shown in FIG. 20 of the second embodiment, in FIG. 31 of the third embodiment, and in FIG. 35 of the fourth embodiment. However, a program having the functions of the hardware controlling unit and the hardware resource managing unit may be recorded in a computer-readable record medium. This program may used in a digital video reproducing/recording apparatus that cannot dynamically handle reproduction and recording of video data in real time. By means of this program, the same effect can be achieved as in the case of the digital video reproducing/recording apparatus of the present invention.

Fifth Embodiment

The following is a description of an example of a resource management system. For this resource management system, the resource manager 2010 and the resource management DB 2020 (see FIG. 5) of the resource management system of the first embodiment are applied to the digital video reproducing/recording apparatus as described in the second to fourth embodiments (see FIG. 20, FIG. 31, and FIG. 35).

Note that the resource management system of the fifth embodiment is different from that of the first embodiment. More specifically, using the system of the fifth embodiment, a client can acquire different types of resources at one time and can release some of the acquired resources and re-acquire the once-released resources. As such, the resource request information that the client sends to the resource manager is reformed so that the client can request for a plurality of resources at one time. Also, new kinds of messages are transferred between the client and the resource manager so as to notify each other of information about the release of some resources and the re-acquisition of the released resources. The following explanation will focus on the differences between the first and fifth embodiments.

Figure 37:
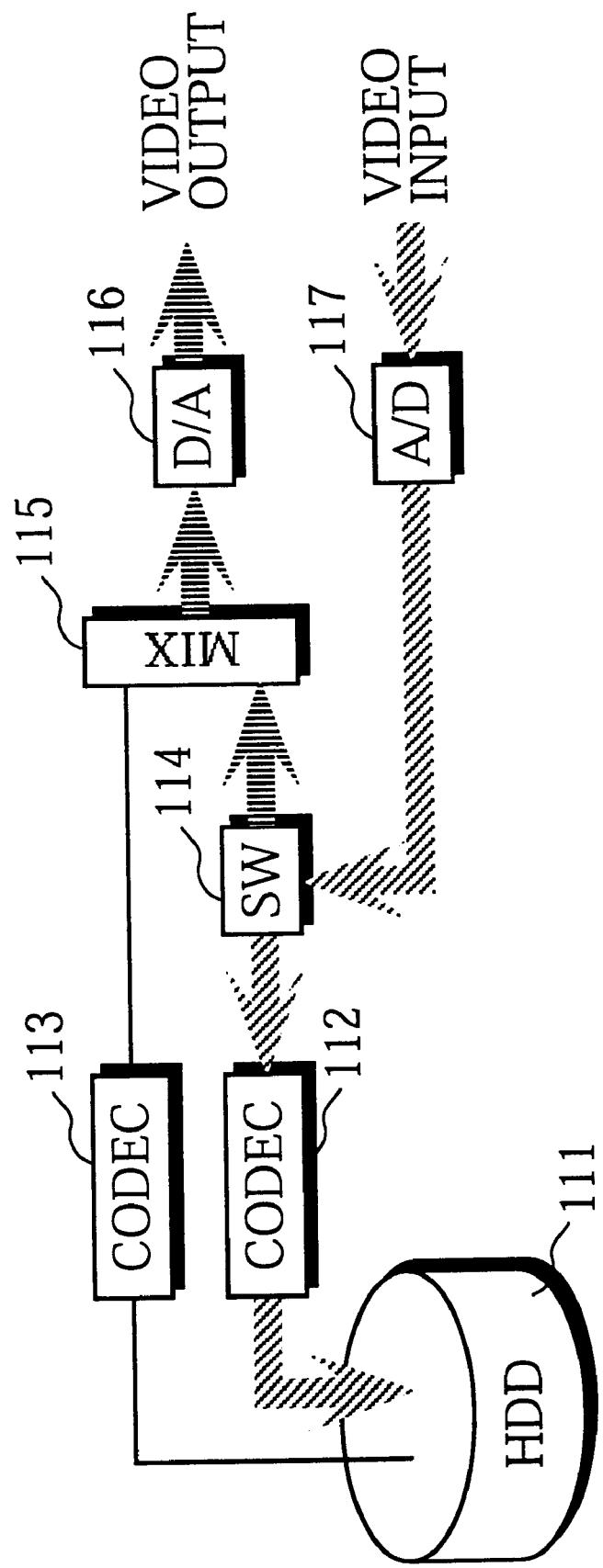
FIG. 37 shows hardware resources provided for the digital video reproducing/recording apparatus of a fifth embodiment and also shows data flow when the hardware resources perform a function of digitizing and recording inputted video.

FIG. 37 shows hardware resources of the digital video reproducing/recording apparatus of the fifth embodiment and also shows a data flow when the hardware resources performs a function of digitizing and recording inputted video. This function is referred to as the "digitizer function-"hereinafter.

The digital video reproducing/recording apparatus is composed of a hard disk drive 111, a CODEC 112, a CODEC 113, a switch 114, a MIX circuit 115, a D/A converter 116, and an A/D converter 117, as its hardware resources. These hardware resources are the same as those in the second embodiment and, therefore, an explanation for these resources is omitted in the present embodiment. It should be noted here that the resource management DB has resource management information for each hardware resource. However, for convenience of explanation, the fifth embodiment is described on the precondition that the hard disk drive 111 can be always shared. Thus, control regarding authorization to use the hard disk drive 111 is not described in the present embodiment.

The digitizer function is realized when an application program stored in a memory of the digital video reproducing/recording apparatus is executed by a CPU of the apparatus. This application program is referred to as the "digitizer AP" hereinafter. The digitizer AP includes a recording process and a preview process. In the recording process, analog video data inputted from an external VTR or the like is digitized and recorded onto the hard disk. In the preview process, inputted video data is outputted to an external television monitor or the like. The digitizer AP corresponds to one client as described in the first embodiment (see FIG. 5). The digitizer AP executes the preview process as required during the execution of the recording process. In accordance with an instruction from the user, the digitizer AP suspends or resumes the preview process.

For the process execution, the digitizer AP requires the hard disk drive 111, the CODEC 112 or 113, the switch 114, the MIX circuit 115, the D/A converter 116, and the A/D converter 117 as seen from the data flow shown in FIG. 37.

Figure 38:
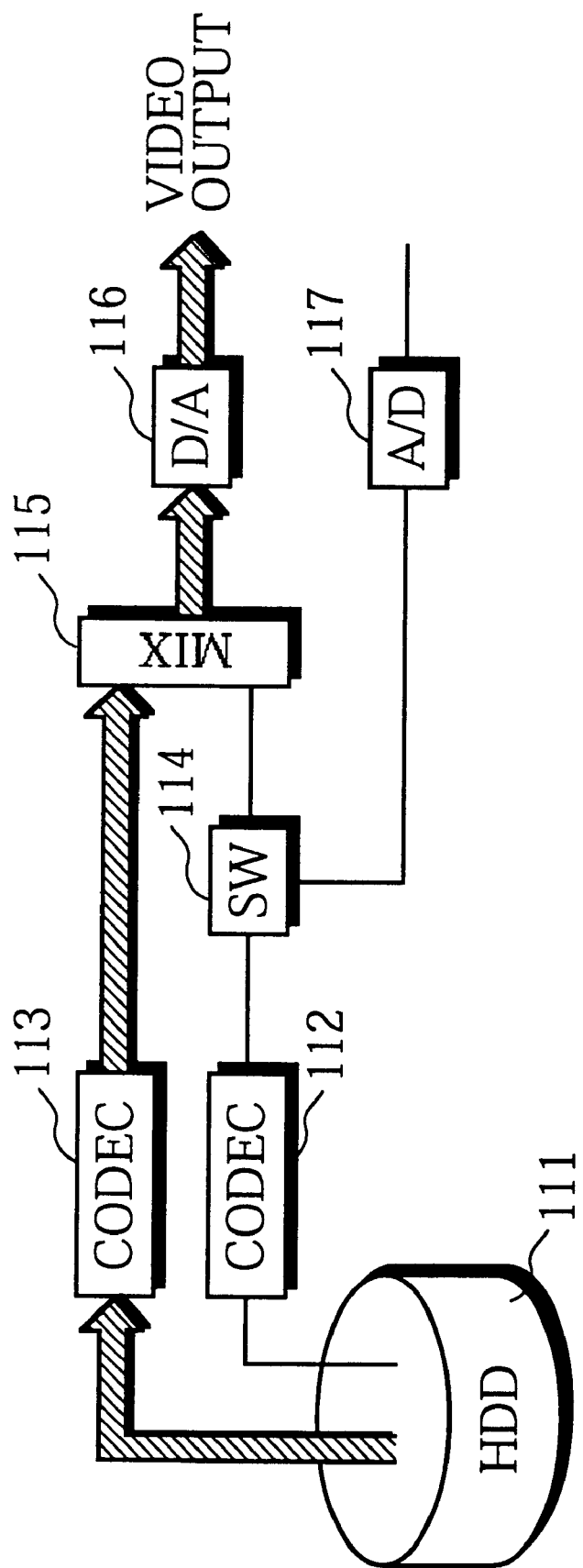

FIG. 38 shows a data flow when the digital video data recorded on the hard disk drive 111 is outputted to the external television monitor or the like so as to execute a function of supporting the video editing by the user. This function is referred to as the "editing function" hereinafter.

The editing function is realized when an application program, different from the digitizer AP, stored in a memory of the digital video reproducing/recording apparatus is executed by a CPU of the apparatus. This application program is referred to as the "editor AP" hereinafter. The editor AP also corresponds to one client as described in the first embodiment (see FIG. 5).

For the process execution, the editor AP requires the hard disk drive 111, the CODEC 112 or 113, the MIX circuit 115, and the D/A converter 116 as seen from the data flow shown in FIG. 38.

Figure 39:
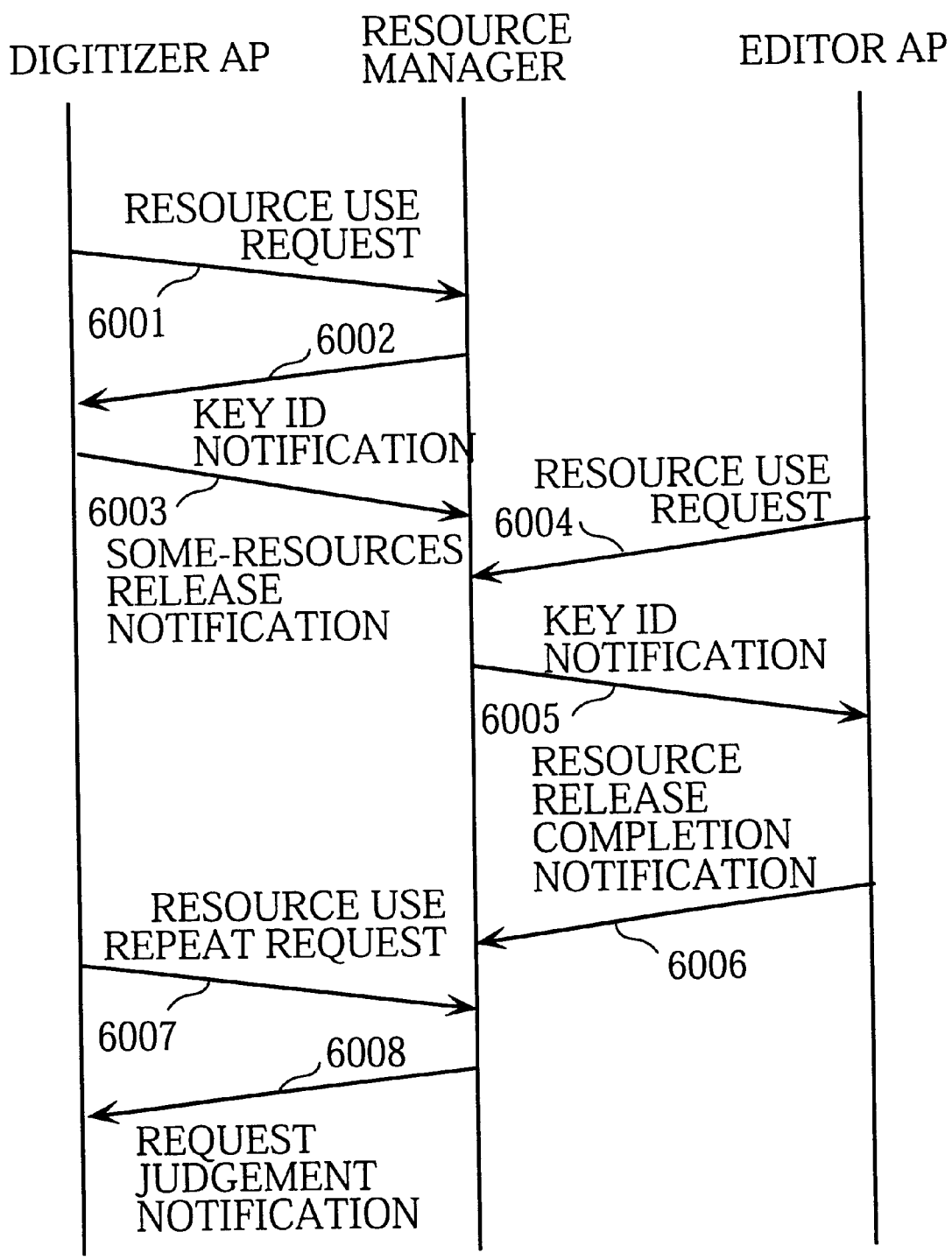
FIG. 39 shows an example of a message sequence followed

An operation performed for the executions of the digitizer AP and the editor AP is explained. Here, suppose that the digitizer AP is first activated before the editor AP. FIG. 39 shows an example of a message sequence followed when the digitizer AP is first activated before the editor AP.

As shown in FIG. 39, the digitizer AP first sends a resource use request 6001 including resource request information 6500 to the resource manager. The resource request information 6500 included in the resource use request 6001 is explained with reference to FIG. 40. FIG. 40 shows an example of a data construction and contents of the resource request information 6500 that is referred to when a plurality of resources are requested at one time.

As shown in this figure, the resource request information 6500 includes a client ID 6501, an object resource ID 6502, a number of resources 6503, an acquisition priority 6504, and a use continuation priority 6505. The resource request information 6500 is different from the resource request information 2500 of the first embodiment mainly in that all the contents except the client ID 6501 provide information for each object resource. Although the information about the valid period is omitted in the resource request information 6500, it may be included as in the case of the first embodiment. The number of resources 6503 is indicated by a number of resources to be used in a requested process and not expressed as the volume used out of the capacity of a resource. The number of resources 6503 replaces the maximum volume 2504 and the minimum volume 2505 in the first embodiment. These two different levels in volume in the first embodiment may be also employed in the present embodiment.

The digitizer AP requires one each of the following: the CODEC; switch; MIX circuit; D/A converter; and A/D converter. Thus, the digitizer AP sends the resource use request 6001 including the resource request information 6500 as shown in FIG. 40 to the resource manager.

Upon receipt of the resource use request 6001, the resource manager refers to the resource request information 6500 and the resource management DB, and performs the resource use request receiving process as described in the first embodiment (see in FIG. 8).

Suppose here that the resource manager judges that the requested resources can be used. As is the case with the first embodiment, the resource manager generates the key information based on the resource request information, and links the key information with the resource management information by adding the key ID of the generated key information to the resource management information. Then, the resource manager sends a key ID notification 6002 to the digitizer AP. Here, the contents stored in the resource management DB are shown in FIG. 41.

Figure 41:
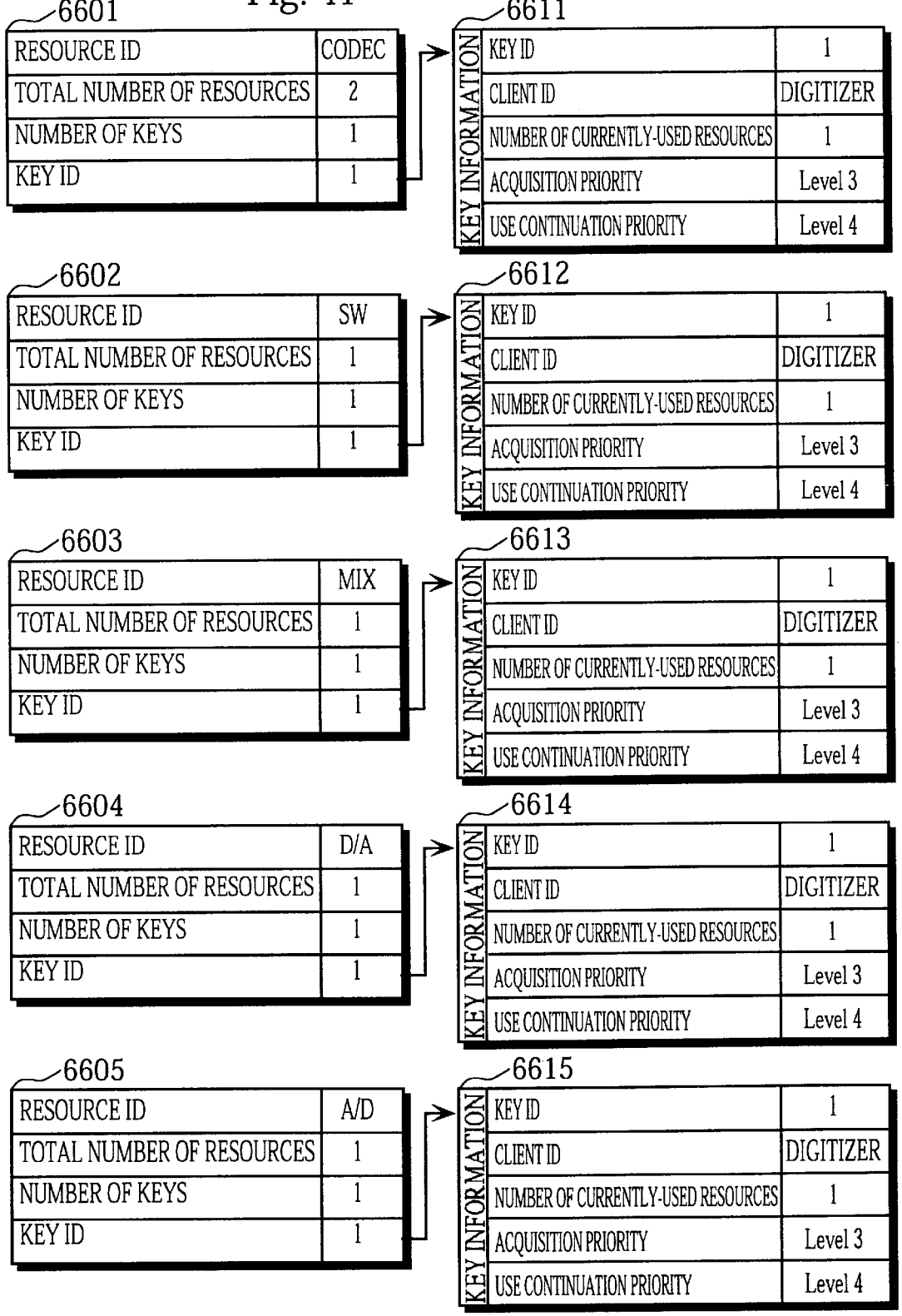
FIG. 41 shows contents stored in the resource management DB immediately after the request for the plurality of resources has been accepted.

FIG. 41 shows contents stored in the resource management DB immediately after the request for the plurality of resources has been accepted. As shown in this figure, sets of resource management information 6601 to 6605 are respectively associated with the CODEC, the switch 114, the MIX circuit 115, the D/A converter 116, and the A/D converter 117. These sets of resource management information 6601 to 6605 are respectively linked with sets of key information 6611 to 6615. As can be understood, the resource management information and the key information linked together have the same key ID.

Upon receiving the key ID notification from the resource manager, the digitizer AP gains access to each of the resources via servers and uses the resources after initializing information necessary for the resources. Accordingly, the digitizer AP executes the recording process and the preview process.

Here, if receiving an instruction from the user to stop the preview process, the digitizer AP releases the MIX circuit 115 and the D/A converter 116 that are needed only for the preview process. The digitizer AP also sends a some-resources release notification 6003 including some-resources release information 6700 to the resource manager.

The some-resources release information 6700 included in the some-resources release notification 6003 is explained with reference to FIG. 42. FIG. 42 shows an example of a data construction and contents of the some-resources release information 6700 that is referred to when some of the resources having been acquired at one time are released.

As shown in this figure, the some-resources release information 6700 includes a client ID 6701, a key ID 6702, an object resource ID 6703, and a number of released resources 6704.

The client ID 6701 indicates an ID of an application program that releases some of the resources that the program acquired at one time. The key ID 6702 indicates the key ID that was notified by the resource manager in response to the resource use request for a plurality of resources. The object resource ID 6703 indicates an ID specifying the released resource. The number of released resources 6704 indicates the number of resources that have been released. The contents of the some-resources release information 6700 shown in FIG. 42 shows that the MIX circuit 115 and the D/A converter 116 have been released.

Upon receipt of the some-resources release notification 6003, the resource manager refers to the some-resources release information 6700 and deletes each set of the key information that is linked with the resource management information related to the released resources, so that the resource management information is updated. As a result, each set of resource management information related to the MIX circuit 115 and the D/A converter 116 is not linked with the corresponding key information.

In the present example case, the user activates the editor AP after the digitizer AP has suspended the preview process.

Note that the digitizer AP continues to be operational after the activation of the editor AP. The activated editor AP sends the resource manager a resource use request 6004 including the resource request information that requests for the CODEC 112 or 113, the MIX circuit 115, and the D/A converter 116.

Upon receiving the resource use request 6004, the resource manager refers to the resource request information and the resource management DB, and performs the resource use request receiving process (see in FIG. 8). The resource manager generates the key information based on the resource request information, and links the key information with the resource management information by adding the key ID of the generated key information to the resource management information. Then, the resource manager sends a key ID notification 6005 to the editor AP. Here, the contents stored in the resource management DB are shown in FIG. 43.

Figure 43:
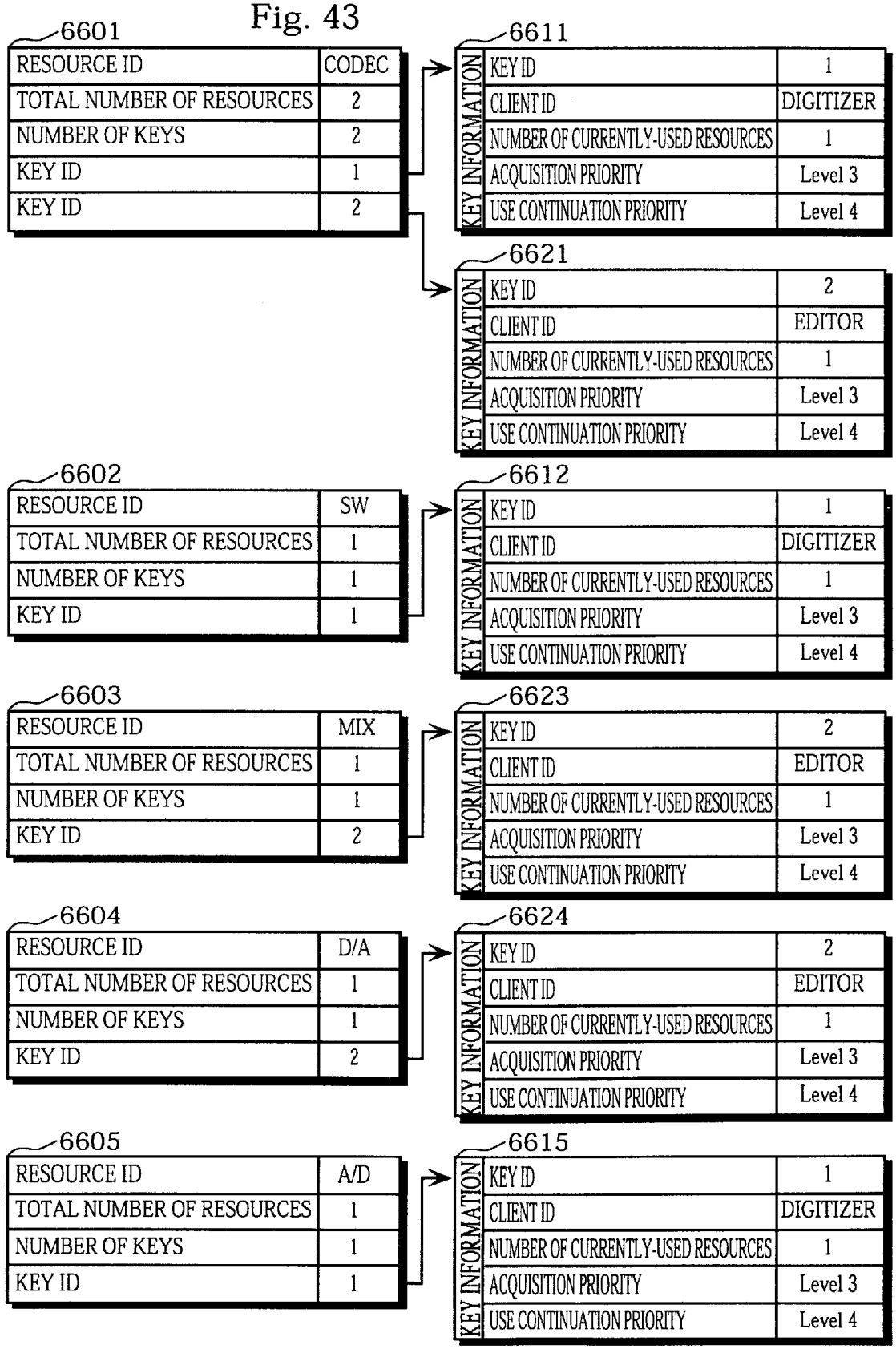
FIG. 43 shows contents stored in the resource management DB in a case where the editor has been activated after the digitizer AP had suspended the preview process.

FIG. 43 shows contents stored in the resource management DB in a case where the editor has been activated after the digitizer AP had suspended the preview process.

With this state, suppose that the user instructs the editor AP to terminate the execution. In response to the instruction from the user, the editor AP releases all the resources that have been used in the execution and sends a resource release completion notification 6006 including the key IDs to the resource manager.

Upon receipt of the notification 6006, the resource manager deletes all sets of the key information specified by the notified key IDs from the resource management information it and so updates the resource management information.

Next suppose here that, after the editor AP has finished its operation, the user instructs the digitizer AP to resume the preview process. The digitizer AP sends a resource use repeat request 6007 including resource repeat request information 6800 to the resource manager. The resource repeat request information 6800 indicates that the digitizer AP requests for the MIX circuit 115 and the D/A converter 116 required for the preview process in addition to the resources currently allocated to the digitizer AP.

FIG. 44 shows an example of a data construction and contents of the resource repeat request information 6800 that is referred to when some resources are needed in addition to the resources having been acquired at one time. As shown in this figure, the resource repeat request information 6800 includes a client ID 6801, a key ID 6802, an object resource ID 6803, and a number of requested resources 6804.

The client ID 6801 indicates an ID of an application program that requests for the resources that were released for the interruption operation. The key ID 6802 indicates the key ID that was notified by the resource manager in response to the resource use request for a plurality of resources. The object resource ID 6803 indicates an ID specifying the requested resource. The number of requested resources 6804 indicates the number of resources that are requested by the present application program.

Upon receiving the resource use repeat request 6007, the resource manager judges whether the requested resources can be allocated, by referring to the resource repeat request information 6800 and the resource management DB. If judging so, the resource manager generates the key information including the key ID that is indicated in the resource repeat request information, and links the key information with the resource management information by adding the key ID of the generated key information to the resource management information. Then, the resource manager sends the digitizer AP a request judgement notification 6008 that the requested resources can be used. If the resource manager judges that the requested resources cannot be allocated, the digitizer AP receives the request judgement notification that indicates so. Here, the contents stored in the resource management DB are as shown in FIG. 43 once again.

By means of the resource management system of the fifth embodiment, an application program can obtain authorization to use a plurality of resources at one time. As a result, deadlock, where the application program has to wait for another application to finish using the resources, can be prevented. Additionally, after obtaining authorization to use resources, the application program can release some of the acquired resources and re-acquire the once-released resources.

Supplementary Explanation

In the first and fifth embodiments, the procedures for sending/receiving messages among the resource manager, the clients, and the servers and the procedures for the resource use request receiving process have been described. However, these procedures may be recorded as computer programs in record media so that the programs can be executed by a general purpose computer or a household electrical appliance that has a function of executing a computer program. Alternatively, these recorded programs may be distributed via, for example, various kinds of communication channels.

The construction of the digital video reproducing/recording apparatus is shown in FIG. 20, FIG. 31, and FIG. 35 in the second to fourth embodiments. However, a computer program that has the same functions as the hardware controlling unit and the hardware resource managing unit may be recorded in a record medium and be distributed via, for example, various kinds of communication channels.

As such a record medium, an IC card, an optical disk, a flexible disk, or a ROM may be used. The distributed computer program may be installed in a household electrical appliance that has a function of executing a computer program or in a personal computer. After the installation, the appliance or the personal computer can execute the computer program so as to realize the function related to the resource management and the function as a digital video reproducing/recording apparatus as described in the preceding embodiments.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital video reproducing/recording apparatus that is capable of executing a digital video reproducing process and a digital video recording process, the digital video reproducing/recording apparatus comprising:

a storing means for storing encoded digital video data;

a first CODEC for performing one of (1) encoding digital video data and storing the encoded digital video data into the storing means and (2) reading the encoded digital video data from the storing means and decoding the read encoded digital video data;

a second CODEC for reading the encoded digital video data from the storing means and decoding the read encoded digital video data;

a retaining means for retaining information that specifies a process that is currently being executed;

a request receiving means for receiving a request for an execution of a process from a user;

a judging means for judging whether the first and second CODECs are available to both the process requested by the user and the process currently being executed, by referring to the information retained in the retaining means; and an execution controlling means for controlling, if the judging means has judged that the first and second CODECs are available to both of the processes, the execution of the process requested by the user.

2. The digital video reproducing/recording apparatus of claim 1, wherein, in the digital video reproducing process, the encoded video data stored in the storing means is decoded either by the first and second CODECs or only by the second CODEC, the decoded video data is mixed by a mixing circuit, and the mixed data is converted into analog video by a D/A converter, wherein, in the digital video recording process, analog video is converted into digital video data by an A/D converter, the digital video data is encoded by the first CODEC, and the encoded digital video is stored in the storing means, wherein the retaining means retains information showing a current use state for each CODEC, each current use state showing whether the corresponding CODEC is being used, and wherein the judging means includes:

a selecting unit for selecting at least one CODEC from the first and second CODECs in accordance with the process requested by the user; and an allocation judging unit for judging whether each CODEC selected by the selecting unit is available to the requested process, by referring to the information retained in the retaining means.

3. The digital video reproducing/recording apparatus of claim 2, wherein the retaining means retains a process name of either the digital video reproducing process or the digital video recording process, for each CODEC that is currently being used, wherein the request receiving means further receives maximum and minimum numbers of CODECs to be used in the requested process, the maximum number indicating a preferred number of CODECs required for the requested process and the minimum number indicating a lowest number of CODECs required for the requested process, and wherein the allocation judging unit includes:

a first notifying unit for notifying, when a number of CODECs equal to the maximum are indicates as being "unallocated" by the retaining means, the execution controlling means that the maximum number of CODECs are available for allocation to the requested process; and a second notifying unit for notifying, when the number of CODECs indicated as being "unallocated" is below the maximum number but at least equal to the minimum number, the execution controlling means that the minimum number of CODECs are available for allocation to the requested process.

4. The digital video reproducing/recording apparatus of claim 3,
  wherein the allocation judging unit includes:
    a release requesting unit for requesting the execution controlling means, when a number of CODECs equal to the minimum are indicated as being "allocated" and this minimum number of CODECs are judged to be available to the requested process if a number of CODECs used in a currently-executed process is changed to the minimum number for the currently-executed process, to release the minimum number of CODECs for the requested process; and
    a third notifying unit for notifying, when the execution controlling means has released the minimum number of CODECs for the requested process, the execution controlling means that the minimum number of CODECs for the requested process is available for allocation to the requested process.

5. The digital video reproducing/recording apparatus of claim 2,
  wherein the retaining means includes:
    an unallocated hardware resource retaining unit for retaining information about each CODEC that is currently unallocated;
    an allocated hardware resource retaining unit for retaining information about each CODEC that is currently allocated;
    a first moving unit for moving the information about each CODEC that is judged by the allocation judging unit to be allocated to the requested process, from the unallocated hardware resource retaining unit into the allocated hardware resource retaining unit; and
    a second moving unit for moving, when receiving a notification that at least one of the first and second CODECs has been released, the CODEC from the allocated hardware resource retaining unit into the unallocated hardware resource retaining unit,
    wherein the allocation judging unit authorizes allocation of each CODEC selected by the selecting unit when the information about the CODEC is retained in the unallocated hardware resource retaining unit.

6. The digital video reproducing/recording apparatus of claim 5,
  wherein the request receiving means further receives maximum and minimum numbers of CODECs to be used in the requested process, the maximum number indicating a preferred number of CODECs required for the requested process and the minimum number indicating a lowest number of CODECs required for the requested process, and
  wherein the allocation judging unit includes:
    a first notifying unit for notifying, when a number of CODECs equal to the maximum are retained in the unallocated hardware resource retaining unit, the execution controlling means that the maximum number of CODECs are available for allocation to the requested process; and
    a second notifying unit for notifying, when the number of CODECs retained in the unallocated hardware resource retaining unit is below the maximum number but a number of CODECs retained in the unallocated hardware resource retaining unit is at least equal to the minimum number, the execution controlling means that the minimum number of CODECs for the requested process are available for allocation.

7. The digital video reproducing/recording apparatus of claim 6,
  wherein the first moving unit writes a name of the requested process into the allocated hardware resource retaining unit when moving each CODEC allocated to the requested process from the unallocated hardware resource retaining unit into the allocated hardware resource retaining unit,
  wherein the allocation judging unit includes:
    a release requesting unit for requesting the execution controlling means, when a number of CODECs equal to the minimum required for the requested process is retained in the allocated hardware resource retaining unit and this minimum number of CODECs are judged to be available for allocation to the requested process if a number of CODECs used in a currently-executed process is changed to the minimum number for the currently-executed process, to release the minimum number for the requested process; and
    a third notifying unit for notifying, when the execution controlling means has released the minimum number of CODECs for the requested process and the second moving unit moves each released CODEC from the allocated hardware resource retaining unit into the unallocated hardware resource retaining unit, the execution controlling means that the minimum number of CODECs for the requested process are available for allocation to the requested process.

8. The digital video reproducing/recording apparatus of claim 2,
  wherein the retaining means includes:
    an unallocated hardware resource retaining unit for retaining information for each CODEC that is currently unallocated;
    a deleting unit for deleting the information about each CODEC that is judged by the allocation judging unit to be available to the requested process, from the unallocated hardware resource retaining unit;
    a writing unit for writing, when receiving a notification that each allocated CODEC has been released, the CODEC into the unallocated hardware resource retaining unit,
    wherein the allocation judging unit authorizes allocation of each CODEC to the requested process when the CODEC is retained in the unallocated hardware resource retaining unit.

9. A digital video reproducing/recording apparatus that is capable of executing a digital video reproducing process and a digital video recording process, the digital video reproducing/recording apparatus comprising:
  a storing means for storing encoded digital video data;
  a plurality of first CODECs that each perform one of (1) encoding digital video data and storing the encoded digital video data into the storing means and (2) reading the encoded digital video data from the storing means and decoding the read encoded digital video data;
  a plurality of second CODECs that each read the encoded digital video data from the storing means and decode the read encoded digital video data;
  a retaining means for retaining information that specifies a process that is currently being executed;
  a request receiving means for receiving a request for an execution of a process from a user;
  a judging means for judging whether the first and second CODECs are available to both the process requested by the user and the process currently being executed, by referring to the information retained in the retaining means; and an execution controlling means for controlling, if the judging means has judged that the first and second CODECs are available to both of the processes, the execution of the process requested by the user.

10. A computer readable record medium used in a digital video reproducing/recording apparatus that comprises:

a storing means for storing encoded digital video data;

a first CODEC for performing one of (1) encoding digital video data and storing the encoded digital video data into the storing means and (2) reading the encoded digital video data from the storing means and decoding the read encoded digital video data; and a second CODEC for reading the encoded digital video data from the storing means and decoding the read encoded digital video data, the computer readable record medium including a program that has a computer perform functions of the following means:

a retaining means for retaining information that specifies a process that is currently being executed;

a request receiving means for receiving a request for an execution of a process from a user;

a judging means for judging whether the first and second CODECs are available to both the process requested by the user and the process currently being executed, by referring to the information retained in the retaining means; and an execution controlling means for controlling, if the judging means has judged that the first and second CODECs are available to both of the processes, the execution of the process requested by the user.

* * * * *